(12) United States Patent
Kawano et al.

(10) Patent No.: US 7,716,368 B2
(45) Date of Patent: May 11, 2010

(54) NETWORK SYSTEM AND COMMUNICATION METHOD, INFORMATION PROCESSING APPARATUS AND METHOD, AND PROGRAM

(75) Inventors: Shinichi Kawano, Kanagawa (JP); Yukihiko Aoki, Tokyo (JP); Tadashi Adachihara, Kanagawa (JP); Shoji Araki, Kanagawa (JP)

(73) Assignee: Sony Corporation (JP)

( * ) Notice: Subject to any disclaimer, the term of this patent is extended or adjusted under 35 U.S.C. 154(b) by 1004 days.

(21) Appl. No.: 10/515,642

(22) PCT Filed: Mar. 12, 2004

(86) PCT No.: PCT/JP2004/003340

§ 371 (c)(1),
(2), (4) Date: Nov. 24, 2004

(87) PCT Pub. No.: WO2004/088941

PCT Pub. Date: Oct. 14, 2004

(65) Prior Publication Data

US 2005/0177646 A1   Aug. 11, 2005

(30) Foreign Application Priority Data

Mar. 28, 2003   (JP) .............................. 2003-092396

(51) Int. Cl.
G06F 15/16   (2006.01)
G06F 15/173   (2006.01)

(52) U.S. Cl. ...................... 709/245; 709/238; 709/244

(58) Field of Classification Search ................ 709/224, 709/226, 238, 245; 370/389
See application file for complete search history.

(56) References Cited

U.S. PATENT DOCUMENTS

| 5,930,477 | A * | 7/1999 | Uchida | 709/236 |
| 6,321,267 | B1 * | 11/2001 | Donaldson | 709/229 |
| 6,343,320 | B1 * | 1/2002 | Fairchild et al. | 709/224 |
| 6,345,276 | B1 * | 2/2002 | Lee | 707/100 |
| 7,039,051 | B2 * | 5/2006 | Ohashi et al. | 370/389 |

(Continued)

FOREIGN PATENT DOCUMENTS

JP   2001-345841 A   12/2001

(Continued)

OTHER PUBLICATIONS

Nikkei Network 2001 Nen 12 Gatsu Go, pp. 66-73, Nov. 22, 2001.

*Primary Examiner*—Joseph Thomas
*Assistant Examiner*—Tae K Kim
(74) *Attorney, Agent, or Firm*—Lerner, David, Littenberg, Krumholz & Mentlik, LLP

(57) ABSTRACT

A network system is provided allowing easy communications with another apparatus via NAPT, as well as a communication method, an information processing apparatus and method, and a program. A local communication apparatus acquires a service providing packet from an apparatus service providing apparatus via a port of a relay apparatus, acquires a service providing packet from another apparatus service providing apparatus via another port of the relay apparatus, calculates a difference value between two pieces of global address information contained in the service providing packets, and predicts that a third port is the port to be used for the next communication. The system, apparatus and methods described can be applied to an instant message service system.

19 Claims, 48 Drawing Sheets

U.S. PATENT DOCUMENTS

| | | | |
|---|---|---|---|
| 7,173,928 B2 * | 2/2007 | Xu et al. | 370/352 |
| 7,243,141 B2 * | 7/2007 | Harris | 709/220 |
| 7,281,036 B1 * | 10/2007 | Lu et al. | 709/220 |
| 2002/0029288 A1 * | 3/2002 | Dobbins et al. | 709/238 |
| 2002/0032797 A1 * | 3/2002 | Xu | 709/238 |
| 2002/0032798 A1 * | 3/2002 | Xu | 709/238 |
| 2003/0115367 A1 * | 6/2003 | Ohara | 709/249 |
| 2004/0139228 A1 * | 7/2004 | Takeda et al. | 709/245 |
| 2004/0177146 A1 * | 9/2004 | Ishiyama et al. | 709/226 |

FOREIGN PATENT DOCUMENTS

| | | |
|---|---|---|
| JP | 2002-290472 A | 10/2002 |
| JP | 2004-180003 | 6/2004 |
| WO | WO-03/101048 A1 | 12/2003 |

* cited by examiner

USER AUTHENTICATION INFORMATION DATABASE

| USER ID | USER PASSWORD |
|---------|---------------|
| AAA-usr | password1 |
| BBB-usr | password2 |
| ⋮ | ⋮ |
| XXX-usr | password! |

177 — USER REGISTRATION INFORMATION DATABASE

| USER ID | PREDICTED COMMUNICATION SOURCE Glo-IP-port (312) | COMMUNICATION DESTINATION Glo-IP-port (313) |
|---|---|---|
| AAA-usr | ppp.qqq.rrr.sss:ttt | PREDICTED COMMUNICATION SOURCE Glo-IP-port OF BBB-usr |
| BBB-usr | eee.fff.ggg.hhh:iii | PREDICTED COMMUNICATION SOURCE Glo-IP-port OF AAA-usr |
| ...... | ...... | ...... |
| XXX-usr | vvv.www.xxx.yyy:zzz | (none) |

311

310

NETWORK SYSTEM AND COMMUNICATION METHOD, INFORMATION PROCESSING APPARATUS AND METHOD, AND PROGRAM

CROSS-REFERENCE TO RELATED APPLICATIONS

The present application claims priority from Japanese Application No. 2003-092396 filed Mar. 28, 2003, the disclosure of which is hereby incorporated by reference herein.

BACKGROUND OF THE INVENTION

The present invention relates to a network system and a communication method, an information processing apparatus and method, and a program, and more particularly to a network system and a communication method, an information processing apparatus and method, and a program, suitable for use with the case wherein communication with another apparatus is performed via NAPT.

In the Internet, an Internet Protocol (hereinafter called IP) is currently used as a routing protocol. The version of the most popular IP is presently "4" (hereinafter called IPv4), and the number of bits of a transmission source address and a transmission destination address used by this version is "32". In a global network, typically the Internet and the like, a 32-bit address (hereinafter called an IPv4 address) is uniquely assigned to each communication terminal so that it is possible to identify a transmission source address and a transmission destination address of communication data of communications among these apparatuses.

However, because of a rapid increase in Internet use, there is a fear that there will be an insufficient number of IPv4 addresses. In order to solve this, the IETF (Internet Engineering Task Force) has proposed an IP version "6" (hereinafter called IPv6) and has started promoting it. However, actually, in order to transfer the routing protocol used by the Internet completely to IPv6, a large amount of time and cost will be required and it is difficult to perfectly solve this problem.

In order to solve this problem, techniques called UPnP (Universal Plug and Play) have been studied. If a router compatible with UPnP is used as a relay means, it is anticipated that a large amount of time and cost will be required. It is also necessary that a number of already existing routers incompatible with UPnP will be required to be replaced with routers compatible with UPnP. Therefore, it is not realistic to perfectly solve the above-described problem by this method.

As an approach to utilizing already existing IPv4 and expanding its addresses, a method has been proposed which uses an address space "private address" having specific properties.

Different from the IPv4 address (hereinafter called a global address) which is uniquely assigned to each terminal apparatus in a global network, the private address is assigned to each terminal in a predetermined limited area (local area). Therefore, when a communication terminal apparatus in a local area communicates with another communication terminal in the Internet having a global address by using its private address, it will be necessary to execute a process of translating the private address into the global address. A method of realizing this may be NAT (Network Address Translation).

If NAT is used, it is necessary to provide a correspondence between one private address and one global address. If there are a plurality of communication terminal apparatuses in a local area, only one of the communication terminal apparatuses can be connected to the Internet.

A method has been considered which utilizes a port which is a subsidiary (auxiliary) address provided under an address. More specifically, if this method is used, a private address assigned to a communication terminal apparatus and a port (i.e., socket) used for communication are translated into a global address and a port. This method is a method called NAPT (Network Address Port Translation) or IP masquerade. By utilizing NAPT, a plurality of communication terminal apparatuses each having a private address and a port can communicate with other communication terminal apparatuses each having a global address and a port.

However, as described above, when a communication apparatus accesses a communication terminal apparatus in a private network using NAPT for communications, from the outside of the private network, the communication apparatus cannot know the private address and port of the communication terminal apparatus before translation by NAPT, and the above-described communication is not possible unless some countermeasure is incorporated.

In contrast with this, there is a method whereby a router is made to identify an identifier of a communication terminal apparatus connected to a private network as a sub-address, and when a communication apparatus outside of the private network accesses the communication terminal apparatus, the communication apparatus specifies the communication terminal apparatus used as the communication partner by using the sub-address (for example, refer to Japanese Laid-open Publication No. 2001-345841 (pp. 9 to 16, FIG. 3 and FIGS. 6 to 8).

However, if the above communication method is used, it is necessary to use a router having the above-described function capable of using the sub-address. This leads to the issue that a communication apparatus cannot access a communication terminal apparatus in a private network via an already existing router not compatible with sub-addresses.

Further, if the above communication method is used, there arises another issue that a communication apparatus cannot access another communication apparatus via a plurality of routers.

Furthermore, if the above communication method is used, there arises a further issue that if a router for relaying communication increments a port, particularly increments a port by two or more, to be used for communication by a communication terminal apparatus, each time the address and port of a communication destination of the communication terminal apparatus change, it is difficult to specify the port of the communication terminal apparatus set by the router and a communication apparatus cannot access the communication terminal apparatus via a router of this kind.

SUMMARY OF THE INVENTION

The present invention has been made in consideration of these circumstances and facilitates communication with another apparatus via NAPT even in already existing facilities which execute NAPT translation of the type that a port to be used for relaying communication of a communication terminal apparatus is incremented two or more each time the address and port of a communication destination of the communication terminal apparatus change.

A network system of the present invention includes a first information processing apparatus connected to a first network and connected to a second network via a first address translation apparatus for translating addresses; a second information processing apparatus connected to a third network and connected to the second network via a second address translation apparatus for translating addresses; a third information processing apparatus connected to the second network and having a first address and a second address; and a fourth information processing apparatus connected to the second network, the fourth information processing apparatus managing addresses of the first information processing apparatus and the second processing apparatus on the second network; the first information processing apparatus being operable to supply first and second packets to the first and second addresses of the third information processing apparatus via the first address translation apparatus to request an address on the second network corresponding to the first information processing apparatus; the third information processing apparatus being operable to acquire the first and second packets, to generate third and fourth packets by using third and fourth addresses on the second network corresponding to the first information processing apparatus, the third and fourth addresses being included in the first and second packets, and to supply the third and fourth packets to the first information processing apparatus; the first information processing apparatus being further operable to acquire the third and fourth packets, to predict a fifth address which is an address on the second network corresponding to the first information processing apparatus by using the third and fourth addresses included in the third and fourth packets, the fifth address being used when the second information processing apparatus is accessed, and to supply the fifth address to the fourth information processing apparatus; the fourth information processing apparatus being operable to store the fifth address in association with a user ID of the first information processing apparatus; the second information processing apparatus being operable to supply fifth and sixth packets to the first and second addresses of the third information processing apparatus via the second address translation apparatus to request addresses on the second network corresponding to the second information processing apparatus; the third information processing apparatus being further operable to acquire the fifth and sixth packets, to generate seventh and eighth packets by using sixth and seventh addresses on the second network corresponding to the second information processing apparatus, the sixth and seventh addresses being included in the fifth and sixth packets, and to supply the seventh and eighth packets to the second information processing apparatus; the second information processing apparatus being further operable to acquire the seventh and eighth packets, to predict an eighth address which is an address on the second network corresponding to the second information processing apparatus by using the sixth and seventh addresses included in the seventh and eighth packets, the eighth address being used when the second information processing apparatus is accessed, and to supply the eighth address to the fourth information processing apparatus; the fourth information processing apparatus being further operable to store the eighth address in association with a user ID of the second information processing apparatus; the first information processing apparatus being further operable to request from the fourth information processing apparatus an address corresponding to a user of the second information processing apparatus as a communication partner, the fourth information processing apparatus being further operable to supply the eighth address to the first information processing apparatus in response to the request the first information processing apparatus being further operable to acquire the eighth address, and to access the second information processing apparatus based on the eighth address; the second information processing apparatus being further operable to request from the fourth information processing apparatus an address corresponding to a user of the first information processing apparatus as a communication partner, the fourth information processing apparatus being further operable to supply the fifth address to the second information processing apparatus in response to the request and the second information processing apparatus being further operable to acquire the fifth address, and to access the first information processing apparatus based on the fifth address.

The third information processing apparatus may include a fifth information processing apparatus connected to the second network and having the first address, and a sixth information processing apparatus connected to the second network and having the second address; the fifth information processing apparatus being operable to acquire the first packet, to generate the third packet by using the third address included in the first packet, to supply the third packet to the first information processing apparatus, to acquire the fifth packet, to generate the seventh packet by using the sixth address included in the fifth packet, and to supply the seventh packet to the second information processing apparatus; and the sixth information processing apparatus being operable to acquire the second packet, to generate the fourth packet by using the fourth address included in the second packet, to supply the fourth packet to the first information processing apparatus, to acquire the sixth packet, to generate the eighth packet by using the seventh address included in the sixth packet, and to supply the eighth packet to the second information processing apparatus.

A communication method of the present invention is for a network system including a first information processing apparatus connected to first network and connected to a second network via a first address translation apparatus for translating addresses; a second information processing apparatus connected to a third network and connected to the second network via a second address translation apparatus for translating addresses; a third information processing apparatus connected to the second network and having a first address and a second address; and a fourth information processing apparatus connected to the second network, the fourth information processing apparatus managing addresses of the first information processing apparatus and the second information processing apparatus on the second network. The communication method includes supplying first and second packets from the first information processing apparatus to the first and second addresses of the third information processing apparatus via the first address translation apparatus to request an address on the second network corresponding to the first information processing apparatus; acquiring the first and second packets in the third information processing apparatus, generating third and fourth packets by using third and fourth addresses on the second network corresponding to the first information processing apparatus, the third and fourth addresses being included in the first and second packets, and supplying the third and fourth packets to the first information processing apparatus; acquiring the third and fourth packets in the first information processing apparatus, predicting a fifth address which is an address on the second network corresponding to the first information processing apparatus by using the third and fourth addresses included in the third and fourth packets, the fifth address being used when the second information processing apparatus is accessed, and supplying the fifth address to the fourth information processing apparatus; storing the fifth address in the fourth information processing apparatus in association with a user ID of the first information processing apparatus; supplying fifth and sixth packets from the second information processing apparatus to the first and second addresses of the third information processing apparatus via the second address translation apparatus to request addresses on the second network corresponding to the second information processing apparatus; acquiring the fifth and sixth packets in the third information processing apparatus, generating seventh and eighth packets by using sixth and seventh addresses on the second network corresponding to the second information processing apparatus, the sixth and seventh addresses being included in the fifth and sixth packets, and supplying the seventh and eighth packets to the second information processing apparatus; acquiring the seventh and eighth packets in the second information processing apparatus, predicting an eighth address which is an address on the second network corresponding to the second information processing apparatus by using the sixth and seventh addresses included in the seventh and eighth packets, the eighth address being used when the first information processing apparatus is accessed, and supplying the eighth address to the fourth information processing apparatus; storing the eighth address in the fourth information processing apparatus in association with a user ID of the second information processing apparatus; requesting by the first information processing apparatus to the fourth information processing apparatus an address corresponding to a user of the second information processing apparatus as a communication partner; supplying the eighth address from the fourth information processing apparatus to the first information processing apparatus in response to the request; acquiring the eighth address in the first information processing apparatus, and accessing the second information processing apparatus based on the eighth address; requesting by the second information processing apparatus to the fourth information processing apparatus an address corresponding to a user of the first information processing apparatus as a communication partner; supplying the fifth address from the fourth information processing apparatus to the second information processing apparatus in response to the request; and acquiring the fifth address in the second information processing apparatus, and accessing the first information processing apparatus based on the fifth address.

A first information processing apparatus of the present invention is connected to a first network, connected to a second network via a first address translation apparatus for address translation, and connected to a third network, the information processing apparatus for performing communication with a first other information processing apparatus connected to the second network via a second address translation apparatus for address translation. The information processing apparatus includes supply means for supplying first and second packets to first and second addresses of a second other information processing apparatus connected to the second network via the first address translation apparatus to request an address on the second network corresponding to the first information processing apparatus; first acquisition means for acquiring third and fourth packets including third and fourth addresses on the second network corresponding to the first information processing apparatus and supplied from the second other information processing apparatus based on the first and second packets supplied from the supply means; and prediction means for predicting a fifth address on the second network corresponding to the first information processing apparatus by using the third and fourth addresses included in the third and fourth packets acquired by the first acquisition means, the fifth address being used when the first other information processing apparatus is accessed.

The supply means may supply the second packet in succession to the first packet.

The second other information processing apparatus may include a third other information processing apparatus connected to the second network and having the first address, and a fourth other information processing apparatus connected to the second network and having the second address, wherein the supply means supplies the first packet to the third other information processing apparatus and supplies the second packet to the fourth other information processing apparatus, and the first acquisition means acquires the third packet from the third other information processing apparatus and the fourth packet from the fourth other information processing apparatus.

The first to fourth addresses may include an IP address and a port number.

The prediction means may predict the fifth address by calculating a difference value between the fourth and third addresses and adding the difference value to the fourth address.

The first information processing apparatus may further include first request means for requesting that a third other information processing apparatus connected to the second network for managing addresses on the second network of the first information processing apparatus and the first other information processing apparatus supply the fifth address predicted by the predicting means and register the fifth address; second request means for requesting a sixth address predicted by the first other information processing apparatus and registered in the third other information processing apparatus, the sixth address being an address on the second network of the first other information processing apparatus; third acquisition means for acquiring the sixth address supplied from the third other information processing apparatus based on the second request means; and third request means for requesting opening of communications to the address on the second network of the first other information processing apparatus, the address of the first other information processing apparatus being set based on the sixth address acquired by the third acquisition means.

The third request means may request the opening of communications by supplying a fifth packet for requesting the opening of communications with the first other information processing apparatus from a plurality of addresses on the first network of the first information processing apparatus to a plurality of addresses of the second address translation apparatus, the plurality of addresses being consecutive starting from the fifth address.

The third request means may request the opening of communications by supplying a fifth packet for requesting the opening of communications with the first other information processing apparatus from a plurality of addresses on the first network of the first information processing apparatus to a plurality of addresses of the second address translation apparatus, the plurality of addresses being every second address and being consecutive from the fifth address.

The third request means may request the opening of communications by supplying a fifth packet for requesting the opening of communications with the first other information processing apparatus from a plurality of addresses on the first network of the first information processing apparatus to each address of mutually different address groups among a plurality of address groups on the second network of the second address translation apparatus, the plurality of address groups each having a plurality of consecutive addresses and one address between each address group, the first address group having the fifth address as a start address.

The third request means may request the opening of communications by supplying a fifth packet for requesting the opening of communications with the first other information processing apparatus from a plurality of addresses on the first network of the first information processing apparatus to each address of mutually different address groups among a plurality of address groups on the second network of the second address translation apparatus, the plurality of address groups each having a plurality of consecutive addresses, the first address group having the fifth address as a start address.

The first information processing apparatus may further include master/slave judging means for determining whether the first information processing apparatus is a master for controlling communications with the first other information processing apparatus or a slave, wherein the third request means requests opening of communications on the basis of an algorithm selected based on the determination by the master/slave judging means.

A first information processing method of the present invention is for a first information processing apparatus connected to a first network, connected to a second network via a first address translation apparatus for address translation, and connected to a third network, the first information processing method for performing communication between the first information processing apparatus and a first other information processing apparatus connected to the second network via a second address translation apparatus for address translation. The first information processing method includes supplying first and second packets to first and second addresses of a second other information processing apparatus connected to the second network via the first address translation apparatus to request an address on the second network corresponding to the first information processing apparatus; acquiring third and fourth packets including third and fourth addresses on the second network corresponding to the first information processing apparatus and supplied from the second other information processing apparatus based on the first and second packets supplied; and predicting a fifth address on the second network corresponding to the first information processing apparatus by using the third and fourth addresses included in the third and fourth packets.

A recording medium is recorded with a computer-executable first program of the present invention for controlling a processing method in a first information processing apparatus connected to a first network, connected to a second network via a first address translation apparatus for address translation, and connected to a third network, the processing method for performing communication between the first information processing apparatus and a first other information processing apparatus connected to the second network via a second address translation apparatus for address translation. The processing method includes supplying first and second packets to first and second addresses of a second other information processing apparatus connected to the second network via the first address translation apparatus to request an address on the second network corresponding to the first information processing apparatus; acquiring third and fourth packets including third and fourth addresses on the second network corresponding to the first information processing apparatus and supplied from the second other information processing apparatus based on the first and second packets supplied; and predicting a fifth address on the second network corresponding to the first information processing apparatus by using the third and fourth addresses included in the acquired third and fourth packets.

A second information processing apparatus of the present invention is connected to a network for performing communications with a first other information processing apparatus connected to the network via a first address translation apparatus for address translation and with a second other information processing apparatus connected to the network via a second address translation apparatus for address translation, the information processing apparatus including acquisition means for acquiring information of an address on the network of the first other information processing apparatus, the address being predicted by the first other information processing apparatus and supplied by the first other information processing apparatus; storage means for storing the acquired information of the address on the network of the first other information processing apparatus; and supply means for supplying the stored information of the address on the network of the first other information processing apparatus to the second other information processing apparatus based on a request from the second other information processing apparatus acting as a communication partner of the first other information processing apparatus.

A second information processing method of the present invention is for an information processing apparatus connected to a network for performing communications with a first other information processing apparatus connected to the network via a first address translation apparatus for address translation and with a second other information processing apparatus connected to the network via a second address translation apparatus for address translation. The information processing method includes acquiring information of an address on the network of the first other information processing apparatus, the address being predicted by the first other information processing apparatus and supplied from the first other information processing apparatus; storing the acquired information of the address on the network of the first other information processing apparatus; and supplying the stored information of the address on the network of the first other information processing apparatus to the second other information processing apparatus based on a request from the second other information processing apparatus acting as a communication partner of the first other information processing apparatus.

A recording medium is recorded with a computer-executable second program of the present invention for controlling a processing method in an information processing apparatus connected to a network for performing communications with a first other information processing apparatus connected to the network via a first address translation apparatus for address translation and with a second other information processing apparatus connected to the network via a second address translation apparatus for address translation. The processing method includes acquiring information of an address on the network of the first other information processing apparatus, the address being predicted by the first other information processing apparatus and supplied from the first other information processing apparatus; storing the acquired information of the address on the network of the first other information processing apparatus; and supplying the stored information of the address on the network of the first other information processing apparatus to the second other information processing apparatus based on a request from the second other information processing apparatus acting as a communication partner of the first other information processing apparatus.

In the network system and the communication method of the present invention, the first information processing apparatus supplies the first and second packets to the first and second addresses of the third information processing apparatus via the first address translation apparatus to request an address on the second network corresponding to the first information processing apparatus; the third information processing apparatus acquires the first and second packets, generates the third and fourth packets by using the third and fourth addresses on the second network corresponding to the first information processing apparatus, the third and fourth addresses being included in the first and second packets, and supplies the generated third and fourth packets to the first information processing apparatus; the first information processing apparatus acquires the third and fourth packets, predicts the fifth address which is the address on the second network corresponding to the first information processing apparatus by using the third and fourth addresses included in the third and fourth packets, the fifth address being used when the second information processing apparatus is accessed, and supplies the predicted fifth address to the fourth information processing apparatus; the fourth information processing apparatus stores the fifth address in association with the user ID of the first information processing apparatus; the second information processing apparatus supplies the fifth and sixth packets to the first and second addresses of the third information processing apparatus via the second address translation apparatus to request addresses on the second network corresponding to the second information processing apparatus; the third information processing apparatus acquires the fifth and sixth packets, generates the seventh and eighth packets by using the sixth and seventh addresses on the second network corresponding to the second information processing apparatus, the sixth and seventh addresses being included in the fifth and sixth packets, and supplies the generated seventh and eighth packets to the second information processing apparatus; the second information processing apparatus acquires the seventh and eighth packets, predicts the eighth address which is the address on the second network corresponding to the second information processing apparatus by using the sixth and seventh addresses included in the seventh and eighth packets, the eighth address being used when the second information processing apparatus is accessed, and supplies the predicted eighth address to the fourth information processing apparatus; the fourth information processing apparatus stores the eighth address in association with the user ID of the second information processing apparatus; the first information processing apparatus requests from the fourth information processing apparatus an address corresponding to a user of the second information processing apparatus as a communication partner, in response to this request, the fourth information processing apparatus supplies the eighth address to the first information processing apparatus; the first information processing apparatus acquires the eighth address, and accesses the second information processing apparatus based on the eighth address; the second information processing apparatus requests from the fourth information processing apparatus an address corresponding to a user of the first information processing apparatus as a communication partner, in response to this request, the fourth information processing apparatus supplies the fifth address to the second information processing apparatus; and the second information processing apparatus acquires the fifth address, and accesses the first information apparatus based on the fifth address.

In the first information processing apparatus and method and the program of the present invention, the first and second packets are supplied to the first and second addresses of the second other information processing apparatus connected to the second network via the first address translation apparatus to request an address on the second network corresponding to the first information processing apparatus; the third and fourth packets including the third and fourth addresses on the second network corresponding to the first information processing apparatus and supplied from the second other information processing apparatus are acquired based on the supplied first and second packets; and the fifth address on the second network corresponding to the first information processing apparatus is predicted by using the third and fourth addresses included in the acquired third and fourth packets, the fifth address being used when the first other information processing apparatus is accessed.

In the second information processing apparatus and method and the program of the present invention, information of the address on the network of the first other information processing apparatus is acquired, the address being predicted by the first other information processing apparatus and supplied from the first other information processing apparatus; the acquired information of the address on the network of the first other information processing apparatus is stored; and responsive to the request from the second other information processing apparatus as a communication partner of the first other information processing apparatus, the second other information processing apparatus is supplied with the stored information of the address on the network of the first other information processing apparatus.

BRIEF DESCRIPTION OF THE DRAWINGS

FIG. 14 is a schematic diagram showing the contents of a user authentication information database shown in FIG. 5.

FIG. 19 is a schematic diagram showing the contents of a user registration database shown in FIG. 5.

DETAILED DESCRIPTION

Figure 1:
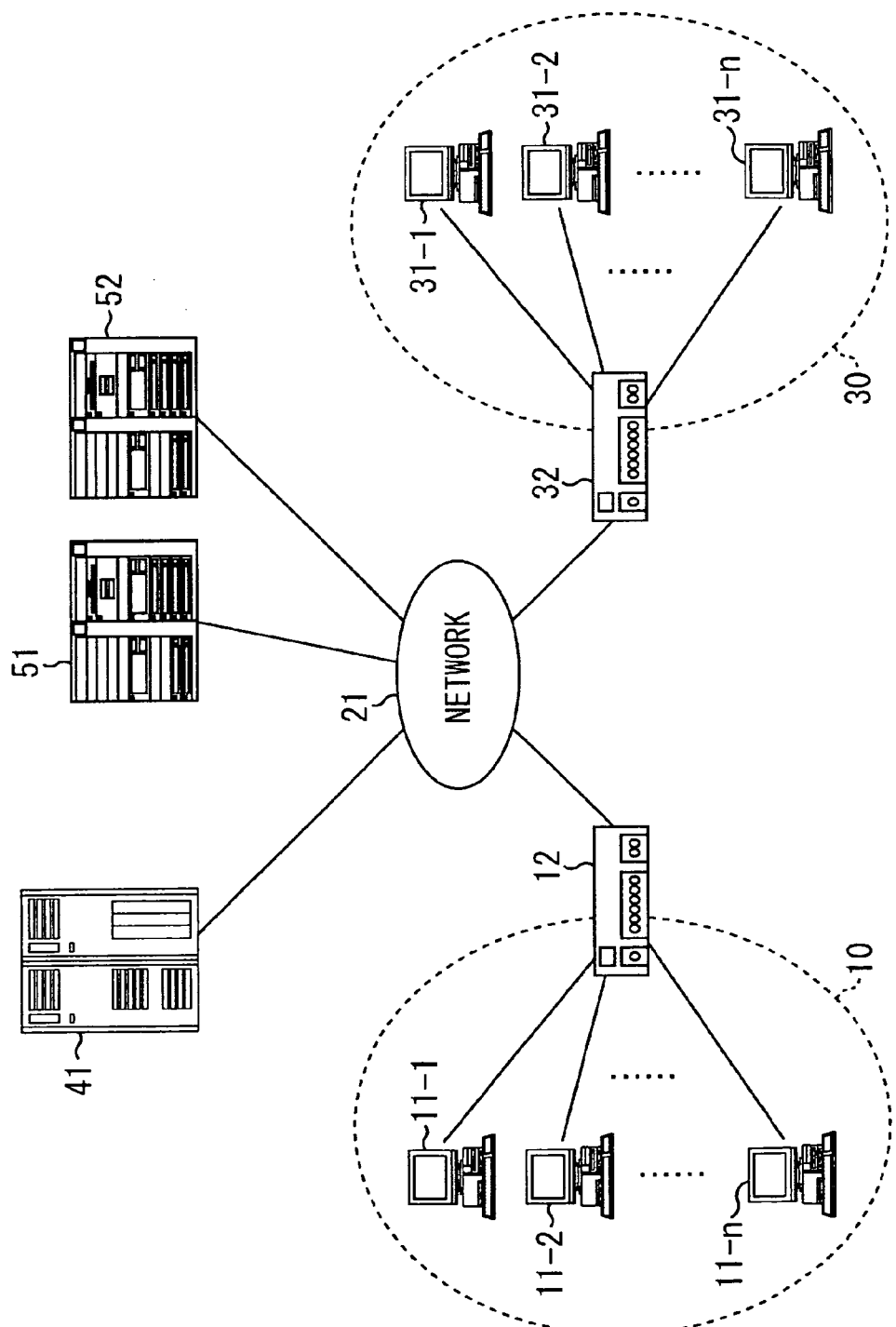
FIG. 1 is a diagram showing an example of the configuration of a network system adopting the present invention.

In the following, preferred embodiments of the present invention will be described and the correspondence between constituent elements described in the claims and particular examples in the preferred embodiments of the present invention will be illustratively shown. This description is made in order to confirm that particular examples which support the inventions described in the claims are described in the preferred embodiments of the present invention. Therefore, even if there are particular examples not described herein which correspond to the constituent elements although the particular examples are described in the preferred embodiments of the present invention, this does not mean that the particular examples do not correspond to the constituent elements. Conversely, even if particular examples corresponding to the constituent elements are described herein, this does not mean that the particular examples do not correspond to constituent elements other than the first-mentioned constituent elements.

Further, this description does not mean that the inventions corresponding to the particular examples described in the preferred embodiments of the present invention are all described in the claims. In other words, this description does not disclaim the existence of inventions corresponding to the particular examples described in the preferred embodiments of the present invention and not described in the claims of this application, i.e., the existence of inventions divisionally filed or added by amendments.

A network system described in claim 1 is characterized by including a first information processing apparatus (e.g., local communication apparatuses 11-1 to 11-*n* of FIG. 1) connected to a first network (e.g., the private network 10 of FIG. 1) and to a second network (e.g., the network 21 of FIG. 1) via a first address translation apparatus (e.g., the relay apparatus 12 of FIG. 1) for address translation, a second information processing apparatus (e.g., local communication apparatuses 31-1 to 31-*n* of FIG. 1) connected to a third network (e.g., the private network 30 of FIG. 1) and to the second network via a second address translation apparatus (e.g., the relay apparatus 32 of FIG. 1) for address translation, a third information processing apparatus (e.g., apparatus service providing apparatuses 51 and 52 of FIG. 1) connected to the second network and having first and second addresses, and a fourth information processing apparatus (e.g., the user service providing apparatus 41 of FIG. 1) connected to the second network and managing addresses on the second network of the first and second information processing apparatuses, wherein the first information processing apparatus supplies (e.g., Steps S4 and S6) first and second packets (e.g., the service request packet 281 of FIG. 17) to the first and second addresses of the third information processing apparatus via the first address translation apparatus to request addresses on the second network corresponding to the first information processing apparatus; the third information processing apparatus acquires (e.g., Steps S61 and S71 of FIG. 8) the first and second packets, generates (e.g., Step S212 of FIG. 20) third and fourth packets (e.g., the service providing packet 321 of FIG. 21) by using third and fourth addresses on the second network corresponding to the first information processing apparatus, the third and fourth addresses being contained in the first and second packets, and supplies (e.g., Steps S63 and S73 of FIG. 8) the generated third and fourth packets to the first information processing apparatus; the first information processing apparatus acquires (e.g., Steps S5 and S7 of FIG. 8) the third and fourth packets, predicts (e.g., Step S8 of FIG. 8) a fifth address which is an address on the second network corresponding to the first information processing apparatus by using the third and fourth addresses contained in the third and fourth packets, the fifth address being used when the second information processing apparatus is accessed, and supplies (e.g., Step S9 of FIG. 9) the predicted fifth address to the fourth information processing apparatus; the fourth information processing apparatus stores (e.g., Step S30 of FIG. 9) the fifth address in association with a user ID (e.g., the user ID 311 of FIG. 19) of the first information processing apparatus; the second information processing apparatus supplies (e.g., Steps S44 and S46) fifth and sixth packets (e.g., the service request packet 281 of FIG. 17) to the first and second addresses of the third information processing apparatus via the second address translation apparatus to request addresses on the second network corresponding to the second information processing apparatus; the third information processing apparatus acquires (e.g., Steps S62 and S72 of FIG. 8) the fifth and sixth packets, generates (e.g., Step S212 of FIG. 20) seventh and eighth packets (e.g., the service providing packet 321 of FIG. 21) by using sixth and seventh addresses on the second network corresponding to the second information processing apparatus, the sixth and seventh addresses being contained in the fifth and sixth packets, and supplies (e.g., Steps S63 and S73 of FIG. 8) the generated seventh and eighth packets to the second information processing apparatus; the second information processing apparatus acquires (e.g., Steps S45 and S47 of FIG. 8) the seventh and eighth packets, predicts (e.g., Step S48 of FIG. 8) an eighth address which is an address on the second network corresponding to the second information processing apparatus by using the sixth and seventh addresses contained in the seventh and eighth packets, the eighth address being used when the second information processing apparatus is accessed, and supplies (e.g., S49 of FIG. 9) the predicted eighth address to the fourth information processing apparatus; the fourth information processing apparatus stores (Step S30 of FIG. 9) the eighth address in association with a user ID (e.g., the user ID 311 of FIG. 19) of the second information processing apparatus; the first information processing apparatus requests (e.g., Step S174 of FIG. 15) from the fourth information processing apparatus an address corresponding to a user of the second information processing apparatus as a communication partner, in response to this request, the fourth information processing apparatus supplies (e.g., Step S31 of FIG. 9) the eighth address to the first information processing apparatus; the first information processing apparatus acquires (Step S10 of FIG. 9) the eighth address, and accesses (e.g., Step S12 of FIG. 10) the second information apparatus based on the eighth address; the second information processing apparatus requests (e.g., Step S174 of FIG. 15) from the fourth information processing apparatus an address corresponding to a user of the first information processing apparatus as a communication partner, in response to this request, the fourth information processing apparatus supplies (e.g., Step S31 of FIG. 9) the fifth address to the second information processing apparatus; and the second information processing apparatus acquires (Step S50 of FIG. 9) the fifth address, and accesses (e.g., Step S52 of FIG. 10) the first information processing apparatus based on the fifth address.

The third information processing apparatus of the network system described in claim 2 is characterized by including a fifth information processing apparatus (e.g., the apparatus service providing apparatus 51 of FIG. 1) connected to the second network and having the first address and a sixth information processing apparatus (e.g., the apparatus service providing apparatus 52 of FIG. 1) connected to the second network and having the second address, wherein the fifth information processing apparatus acquires (e.g., Step S61 of FIG. 8) the first packet, generates (e.g., Step S212 of FIG. 20) the third packet by using the third address contained in the first packet, supplies (e.g., Step S63 of FIG. 8) the third packet to the first information processing apparatus, acquires (e.g., Step S62 of FIG. 8) the fifth packet, generates (e.g., Step S212 of FIG. 20) the seventh packet by using the sixth address contained in the fifth packet, supplies (e.g., Step S63 of FIG. 8) the seventh packet to the second information processing apparatus, and the sixth information processing apparatus acquires (e.g., Step S71 of FIG. 8) the second packet, generates (e.g., Step S212 of FIG. 20) the fourth packet by using the fourth address contained in the second packet, supplies (e.g., Step S73 of FIG. 8) the fourth packet to the first information processing apparatus, acquires (e.g., Step S72 of FIG. 8) the sixth packet, generates (e.g., Step S212 of FIG. 20) the eighth packet by using the seventh address contained in the sixth packet, and supplies the sixth packet to the second information processing apparatus.

A communication method described in claim 3 is characterized by including a first information processing apparatus (e.g., local communication apparatuses 11-1 to 11-n of FIG. 1) connected to a first network (e.g., the private network 10 of FIG. 1) and to a second network (e.g., the network 21 of FIG. 1) via a first address translation apparatus (e.g., the relay apparatus 12 of FIG. 1) for address translation, a second information processing apparatus (e.g., the local communication apparatuses 31-1 to 31-n of FIG. 1) connected to a third network (e.g., the private network 30 of FIG. 1) and to the second network via a second address translation apparatus (e.g., the relay apparatus 32 of FIG. 1) for address translation, a third information processing apparatus (e.g., the apparatus service providing apparatuses 51 and 52 of FIG. 1) connected to the second network and having first and second addresses, and a fourth information processing apparatus (e.g., the user service providing apparatus 41 of FIG. 1) connected to the second network and managing addresses on the second network of the first and second information processing apparatuses, wherein the first information processing apparatus supplies (e.g., Steps S4 and S6 of FIG. 1) first and second packets (e.g., the service request packet 281 of FIG. 17) to the first and second addresses of the third information processing apparatus via the first address translation apparatus to request addresses on the second network corresponding to the first information processing apparatus; the third information processing apparatus acquires (e.g., Steps S61 and S71 of FIG. 8) the first and second packets (e.g., Steps S61 and S71 of FIG. 8), generates (e.g., Step S212 of FIG. 20) third and fourth packets (e.g., the service providing packet 321 of FIG. 21) by using third and fourth addresses on the second network corresponding to the first information processing apparatus, the third and fourth addresses being contained in the first and second packets, and supplies (e.g., Steps S63 and S73 of FIG. 8) the generated third and fourth packets to the first information processing apparatus; the first information processing apparatus acquires (e.g., Steps S5 and S7 of FIG. 8) the third and fourth packets, predicts (e.g., Step S8 of FIG. 8) a fifth address which is an address on the second network corresponding to the first information processing apparatus by using the third and fourth addresses contained in the third and fourth packets, the fifth address being used when the second information processing apparatus is accessed, and supplies (e.g., Step S9 of FIG. 9) the predicted fifth address to the fourth information processing apparatus; the fourth information processing apparatus stores (e.g., Step S30 of FIG. 9) the fifth address in association with a user ID (e.g., the user ID 311 of FIG. 19) of the first information processing apparatus; the second information processing apparatus supplies (e.g., Steps S44 and S46) fifth and sixth packets (e.g., the service request packet 281 of FIG. 17) to the first and second addresses of the third information processing apparatus via the second address translation apparatus to request addresses on the second network corresponding to the second information processing apparatus; the third information processing apparatus acquires (e.g., Steps S62 and S72 of FIG. 8) the fifth and sixth packets, generates (e.g., Step S212 of FIG. 20) seventh and eighth packets (e.g., the service providing packet 321 of FIG. 21) by using sixth and seventh addresses on the second network corresponding to the second information processing apparatus, the sixth and seventh addresses being contained in the fifth and sixth packets, and supplies (e.g., Steps S63 and S73 of FIG. 8) the generated seventh and eighth packets to the second information processing apparatus; the second information processing apparatus acquires (e.g., Steps S45 and S47 of FIG. 8) the seventh and eighth packets, predicts (e.g., Step S48 of FIG. 8) an eighth address which is an address on the second network corresponding to the second information processing apparatus by using the sixth and seventh addresses contained in the seventh and eighth packets, the eighth address being used when the second information processing apparatus is accessed, and supplies (e.g., S49 of FIG. 9) the predicted eighth address to the fourth information processing apparatus; the fourth information processing apparatus stores (Step S30 of FIG. 9) the eighth address in association with a user ID (e.g., the user ID 311 of FIG. 19) of the second information processing apparatus; the first information processing apparatus requests (e.g., Step S174 of FIG. 15) from the fourth information processing apparatus an address corresponding to a user of the second information processing apparatus as a communication partner; in response to this request, the fourth information processing apparatus supplies (e.g., Step S31 of FIG. 9) the eighth address to the first information processing apparatus; the first information processing apparatus acquires (Step S10 of FIG. 9) the eighth address, and accesses (e.g., Step S12 of FIG. 10) the second information apparatus based on the eighth address; the second information processing apparatus requests (e.g., Step S174 of FIG. 15) from the fourth information processing apparatus an address corresponding to a user of the first information processing apparatus as a communication partner, in response to this request, the fourth information processing apparatus supplies (e.g., Step S31 of FIG. 9) the fifth address to the second information processing apparatus; and the second information processing apparatus acquires (Step S50 of FIG. 9) the fifth address, and accesses (e.g., Step S52 of FIG. 10) the first information apparatus based on the fifth address.

Figure 3:
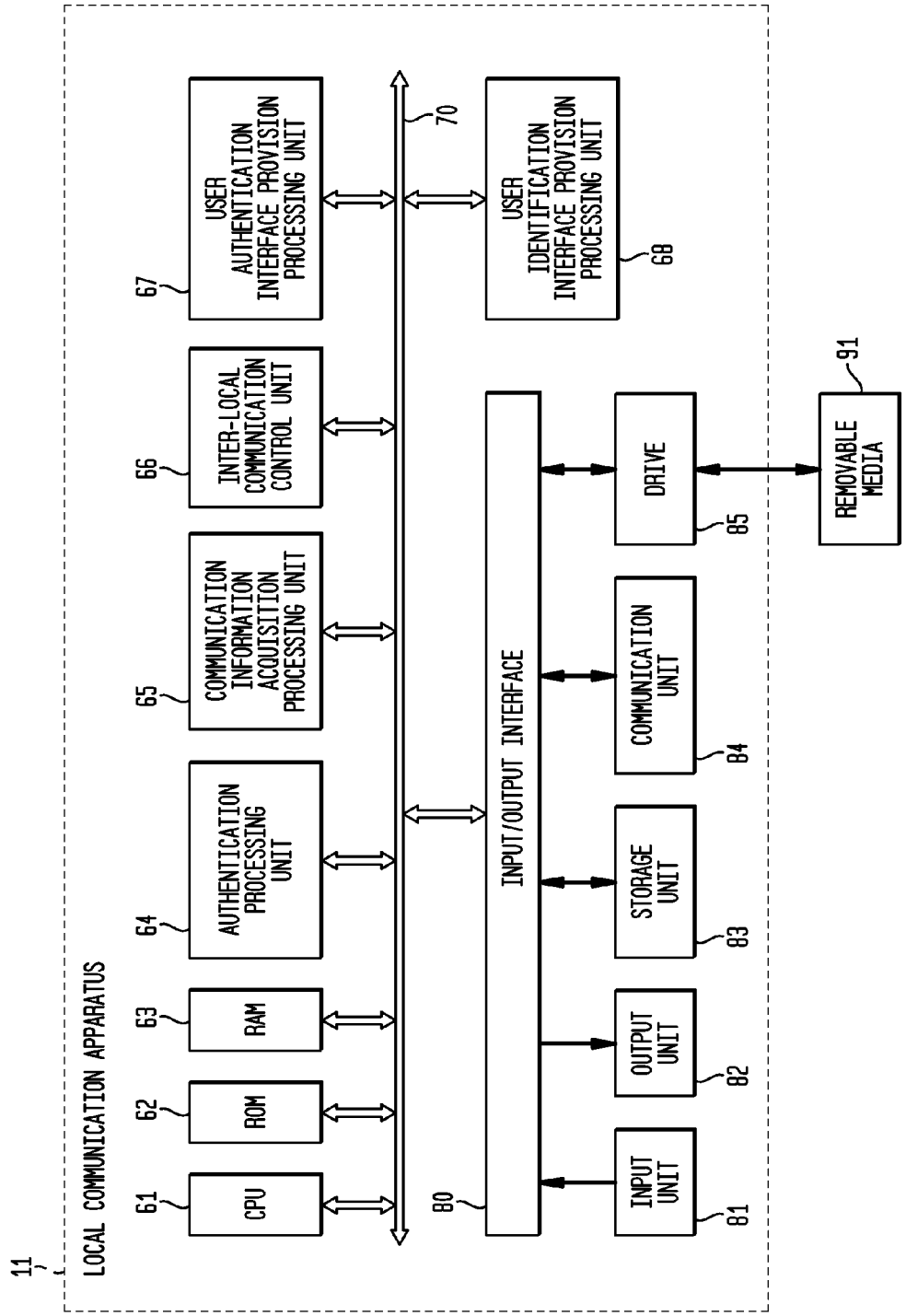
FIG. 3 is a block diagram showing an example of the internal structure of a local communication apparatus shown in FIG. 1.
Figure 15:
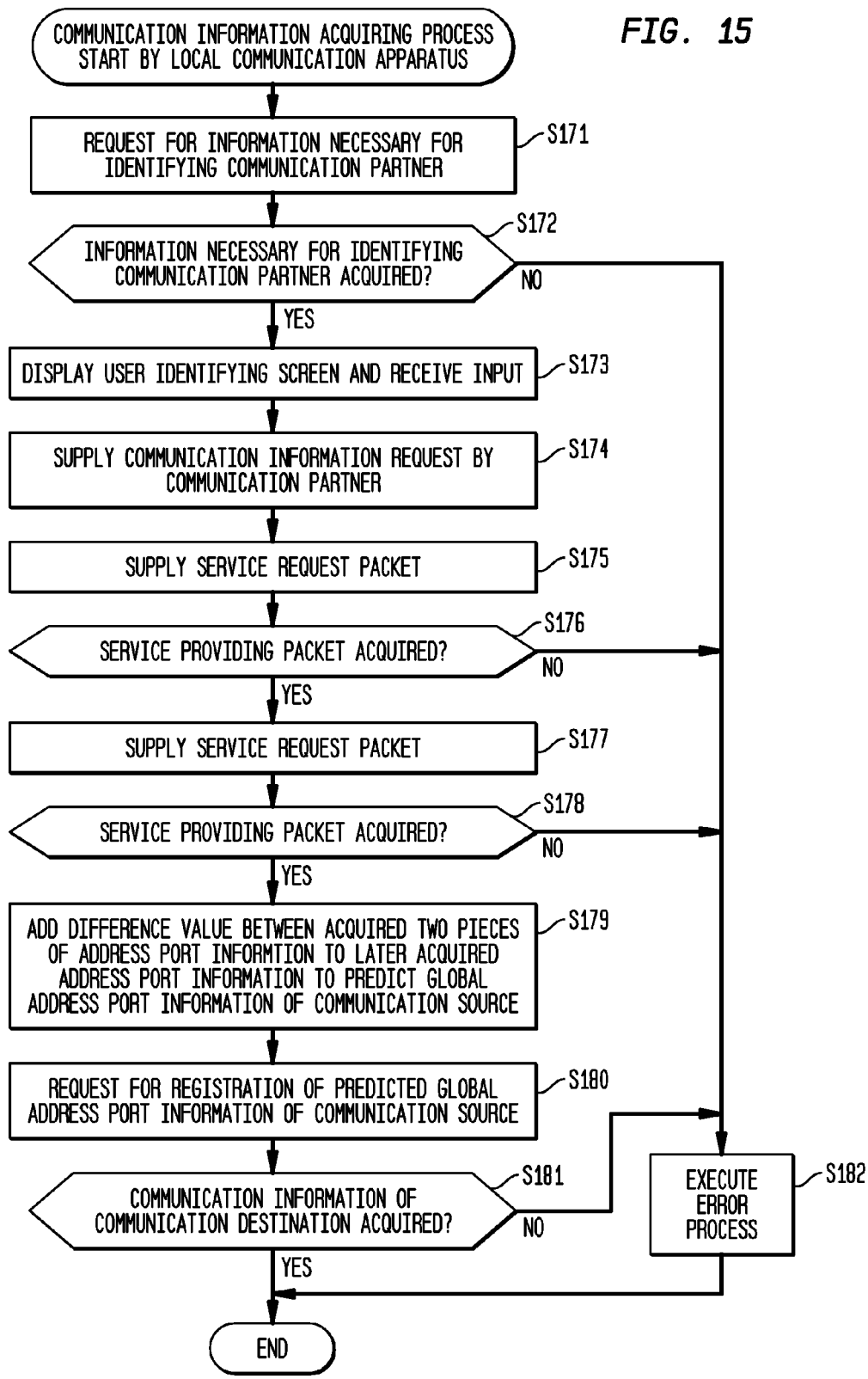
FIG. 15 is a flow chart illustrating a communication information acquiring process by the local communication apparatus shown in FIG. 1.

An information processing apparatus described in claim 4 is characterized by including supply means (e.g., the communication information acquisition processing unit 65 of FIG. 3 for executing the processes at Steps S175 and S177) for supplying first and second packets (e.g., the service request packet 281 of FIG. 17) to the first and second addresses of a second other information processing apparatus (e.g., the apparatus service providing apparatuses 51 and 52 of FIG. 1) connected to the second network (e.g., the network 21 of FIG. 1) via the first address translation apparatus (e.g., the relay apparatus 12 of FIG. 1) to request addresses on the second network corresponding to the information processing apparatus (e.g., the local communication apparatuses 11-1 to 11-$n$ of FIG. 1), first acquisition means (e.g., the communication information acquisition processing unit 65 of FIG. 3 for executing the processes at Steps S176 and S178 of FIG. 15) for acquiring third and fourth packets (e.g., the service providing packet 321 of FIG. 21) containing third and fourth addresses which are addresses on the second network corresponding to the information processing apparatus and supplied from the second other information processing apparatus based on the first and second packets supplied from the supply means, and prediction means (e.g., the communication information acquisition processing unit 65 of FIG. 3 for executing the process at Step S179 of FIG. 15) for predicting a fifth address which is an address on the second network corresponding to the information processing apparatus, by using the third and fourth addresses contained in the third and fourth packets acquired by the first acquisition means, the fifth address being used when a first other information processing apparatus is accessed.

The supply means of the information processing apparatus described in claim 5 is characterized in that the second packet is supplied (Steps S4 and S6 or Steps S44 and S46 of FIG. 8) in succession to the first packet.

The second other information processing apparatus different from the information processing apparatus as described in claim 6 is characterized by including a third other information processing apparatus (e.g., the apparatus service providing apparatus 51) connected to the second network and having the first address and a fourth other information processing apparatus (e.g., the apparatus service providing apparatus 52) connected to the second network and having the second address, wherein the supply means supplies the first packet to the third other information processing apparatus and supplies the second packet to the fourth other information processing apparatus, and the first acquisition means acquires the third packet supplied from the third other information processing apparatus and the fourth packet supplied from the fourth other information processing apparatus.

The first to fourth addresses of the information processing apparatus described in claim 7 are characterized by including an IP address and a port number (e.g., having a structure like the predicted communication source Glo-IP-port of FIG. 19).

The prediction means of the information processing apparatus described in claim 8 is characterized by predicting (Step S179 of FIG. 15) the fifth address by calculating a difference value between the fourth and third addresses and adding the difference value to the fourth address.

Figure 23:
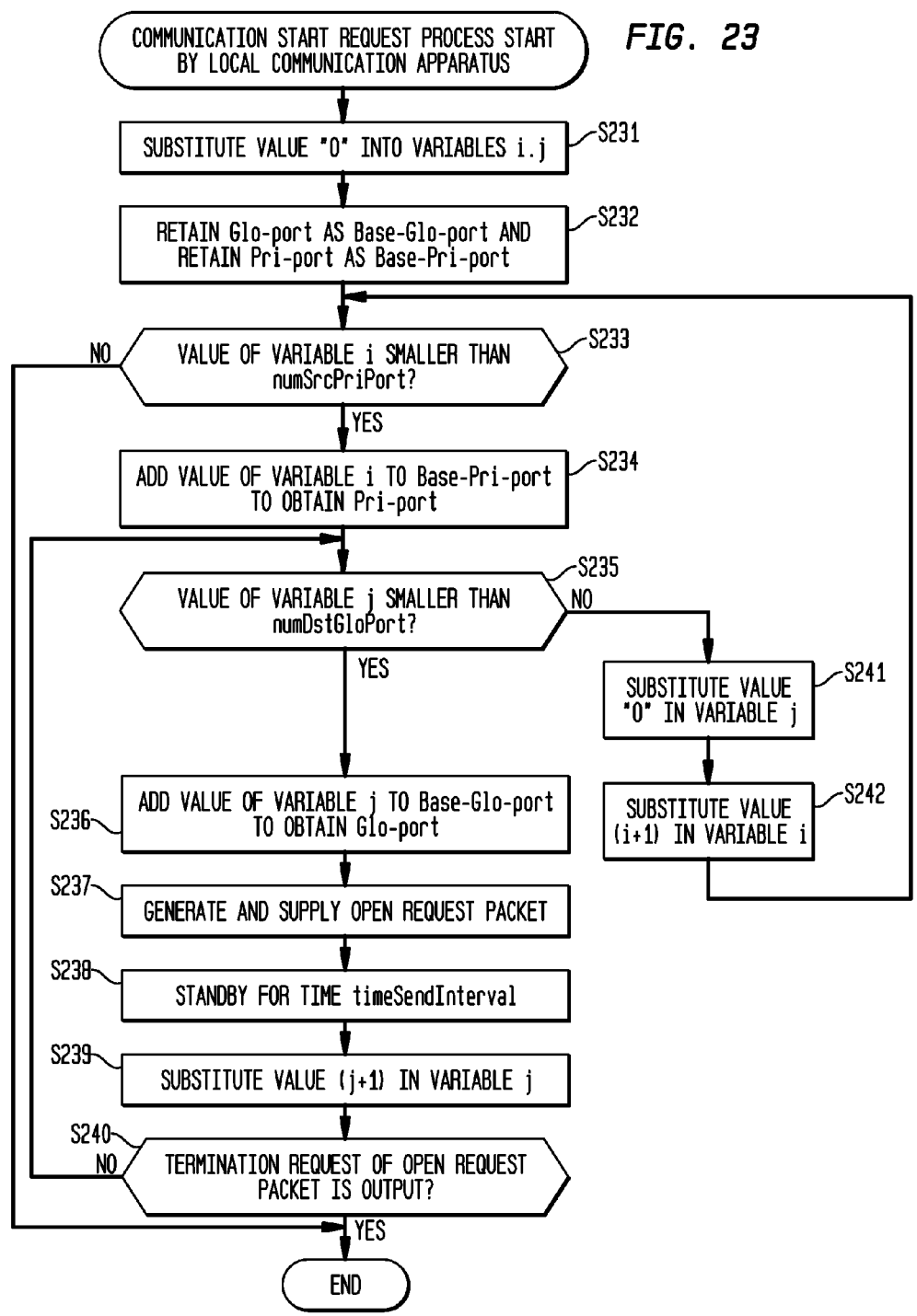
FIG. 23 is a flow chart illustrating a communication start request process by the local communication apparatus.

The information processing apparatus described in claim 9 is characterized by further including first request means (e.g., the communication information acquisition processing unit 65 of FIG. 3 for executing the processes at Step S180 of FIG. 15) for requesting a third other information processing apparatus (e.g., the user service providing apparatus 41 of FIG. 1) connected to the second network for managing addresses on the second network of the information processing apparatus and the first other information processing apparatus, to supply the fifth address predicted by the prediction means and for the registration of the fifth address, second request means (e.g., the communication information acquisition processing unit 65 of FIG. 3 for executing the process at Step S174 of FIG. 15) for requesting a sixth address predicted by the first other information processing apparatus and registered in the third other information processing apparatus, the sixth address being an address on the second network of the first other information processing apparatus, third acquisition means (e.g., the communication information acquisition processing unit 65 of FIG. 3 for executing the process at Step S181 of FIG. 15) for acquiring the sixth address supplied from the third other information processing apparatus based on the second request means, and third request means (e.g., the communication information acquisition processing unit 65 of FIG. 3 for executing the process at Step S237 of FIG. 23) for requesting opening of communications to the address on the second network of the first other information processing apparatus, the address being set based on the sixth address acquired by the third acquisition means.

The third request means of the information processing apparatus described in claim 10 is characterized by requesting (e.g., the communication start request process of FIG. 23) the opening of communications by supplying the fifth packet for requesting the opening of communications with the first other information processing apparatus from a plurality of addresses on the first network of the information processing apparatus to a plurality of addresses of a second address translation apparatus, the addresses being consecutive starting from the fifth address.

The third request means of the information processing apparatus described in claim 11 is characterized by requesting (e.g., the second communication start request process of FIG. 40) the opening of communications by supplying the fifth packet for requesting the opening of communications with the first other information processing apparatus from a plurality of addresses on the first network of the information processing apparatus to a plurality of address of the second address translation apparatus, the addresses being every second address and consecutive from the fifth address.

The third request means of the information processing apparatus described in claim 12 is characterized by requesting (e.g., the third communication start request process of FIG. 44) the opening of communications by supplying the fifth packet for requesting the opening of communications with the first other information processing apparatus from a plurality of addresses on the first network of the information processing apparatus to each address of different address groups among a plurality of address groups each having a plurality of consecutive addresses and one address, the first address group having the fifth address as a start address.

The third request means of the information processing apparatus described in claim 13 is characterized by requesting (e.g., the fourth communication start request process of FIG. 45) the opening of communications by supplying the fifth packet for requesting the opening of communications with the first other information processing apparatus from a plurality of addresses on the first network of the information processing apparatus to each address of different address groups among a plurality of address groups each having a plurality of consecutive addresses, the first address group having the fifth address as a start address.

Figure 39:
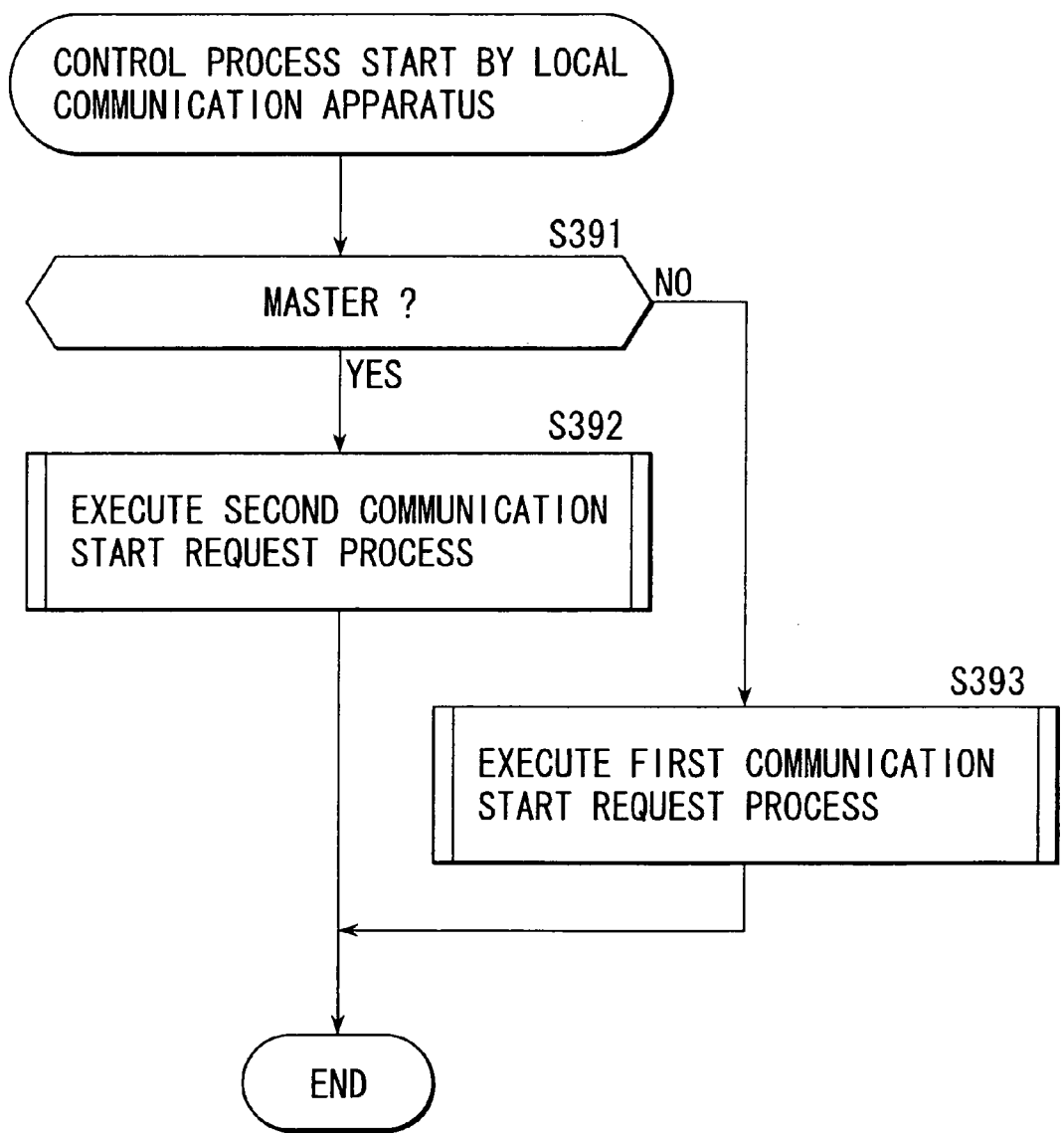
FIG. 39 is a flow chart illustrating a control process by the local communication apparatus shown in FIG. 1.

The information processing apparatus described in claim 14 is characterized by further including master/slave judging means (e.g., the communication information acquisition processing unit 65 of FIG. 3 for executing the process at Step S391 of FIG. 39) for judging whether the information processing apparatus is a master for controlling communications with the first other information processing apparatus or a slave, wherein the third request means requests (e.g., the control process of FIG. 39) the opening of communications based on an algorithm selected by the judgment result by the master/slave judging means.

An information processing method described in claim 15 is characterized by including a supply step (e.g., Steps S175 and S177 of FIG. 15) of supplying first and second packets (e.g., the service request packet 281 of FIG. 17) to first and second addresses of a second other information processing apparatus (e.g., the apparatus service providing apparatuses 51 and 52 of FIG. 1) having the first and second addresses and being connected to a second network (e.g., the network 21 of FIG. 1) via a first address translation apparatus (e.g., the relay apparatus 12 of FIG. 1) in order to request addresses on the second network corresponding to the information processing apparatus (e.g., the local communication apparatuses 11-1 to 11-n of FIG. 1), a first acquisition step (e.g., Steps S176 and S178 of FIG. 15) of acquiring third and fourth packets (e.g., the service providing packet 321 of FIG. 21) containing third and fourth addresses which are addresses on the second network corresponding to the information processing apparatus and supplied from the second other information processing apparatus based on the first and second packets supplied by a process at the supply step, and a prediction step (e.g., Step S179 of FIG. 15) of predicting a fifth address which is an address on the second network corresponding to the information processing apparatus, by using the third and fourth addresses contained in the third and fourth packets acquired by the first acquisition means, the fifth address being used when a first other information processing apparatus is accessed.

A program described in claim 16 is characterized by making a computer execute a supply step (e.g., Steps S175 and 177 of FIG. 15) of supplying first and second packets (e.g., the service request packet 281 of FIG. 17) to first and second addresses of a second other information processing apparatus (e.g., the apparatus service providing apparatuses 51 and 52 of FIG. 1) having the first and second addresses and being connected to a second network (e.g., the network 21 of FIG. 1) via a first address translation apparatus (e.g., the relay apparatus 12 of FIG. 1) in order to request addresses on the second network corresponding to the information processing apparatus (e.g., the local communication apparatuses 11-1 to 11-n of FIG. 1), a first acquisition step (e.g., Steps S176 and S178 of FIG. 15) of acquiring third and fourth packets (e.g., the service providing packet 321 of FIG. 21) containing third and fourth addresses which are addresses on the second network corresponding to the information processing apparatus and supplied from the second other information processing apparatus based on the first and second packets supplied by a process at the supply step, and a prediction step (e.g., Step S179 of FIG. 15) of predicting a fifth address which is an address on the second network corresponding to the information processing apparatus, by using the third and fourth addresses contained in the third and fourth packets acquired by the first acquisition means, the fifth address being used when a first other information processing apparatus is accessed.

Figure 5:
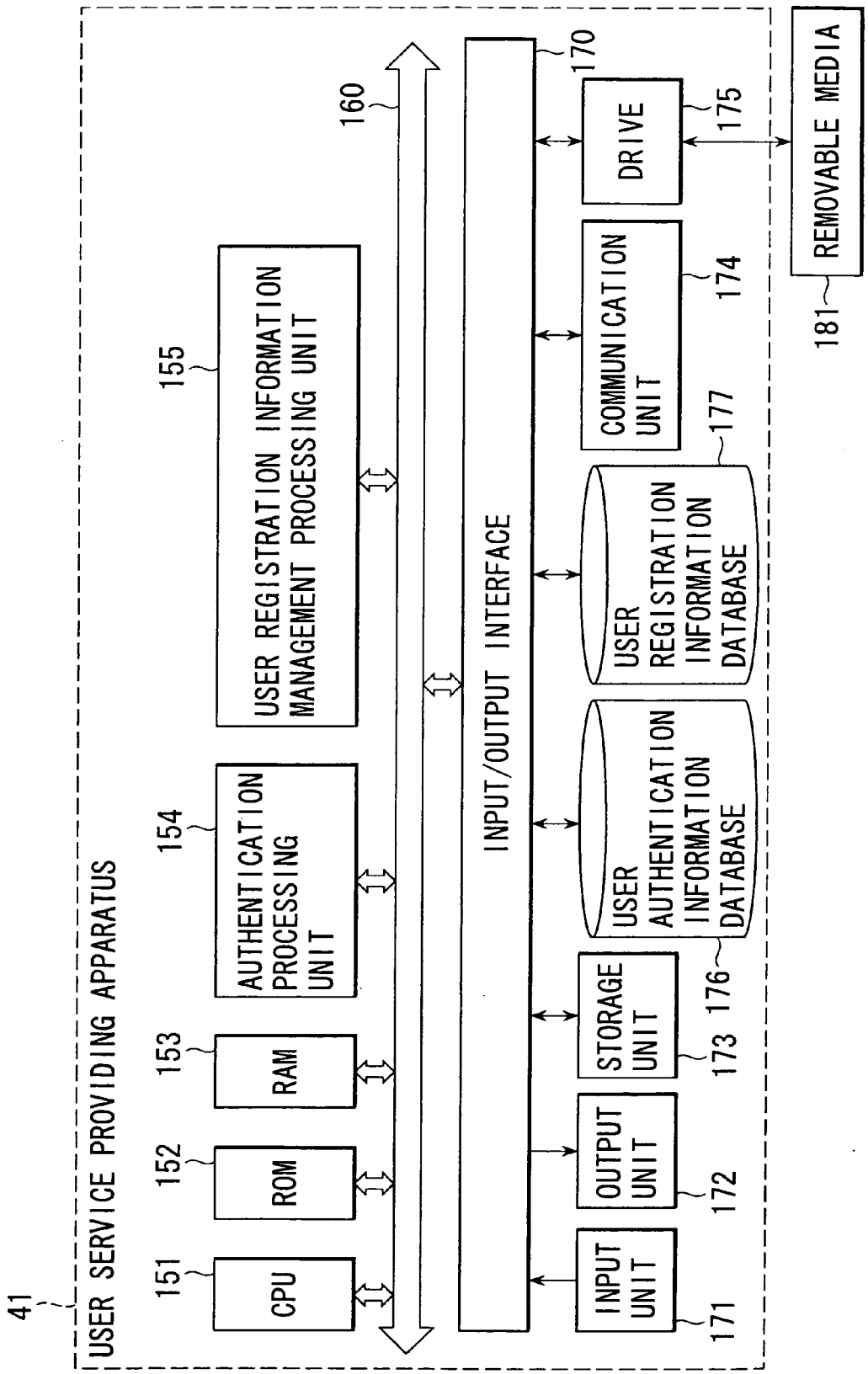
FIG. 5 is a block diagram showing an example of the structure of a user service providing apparatus shown in FIG. 1.
Figure 18:
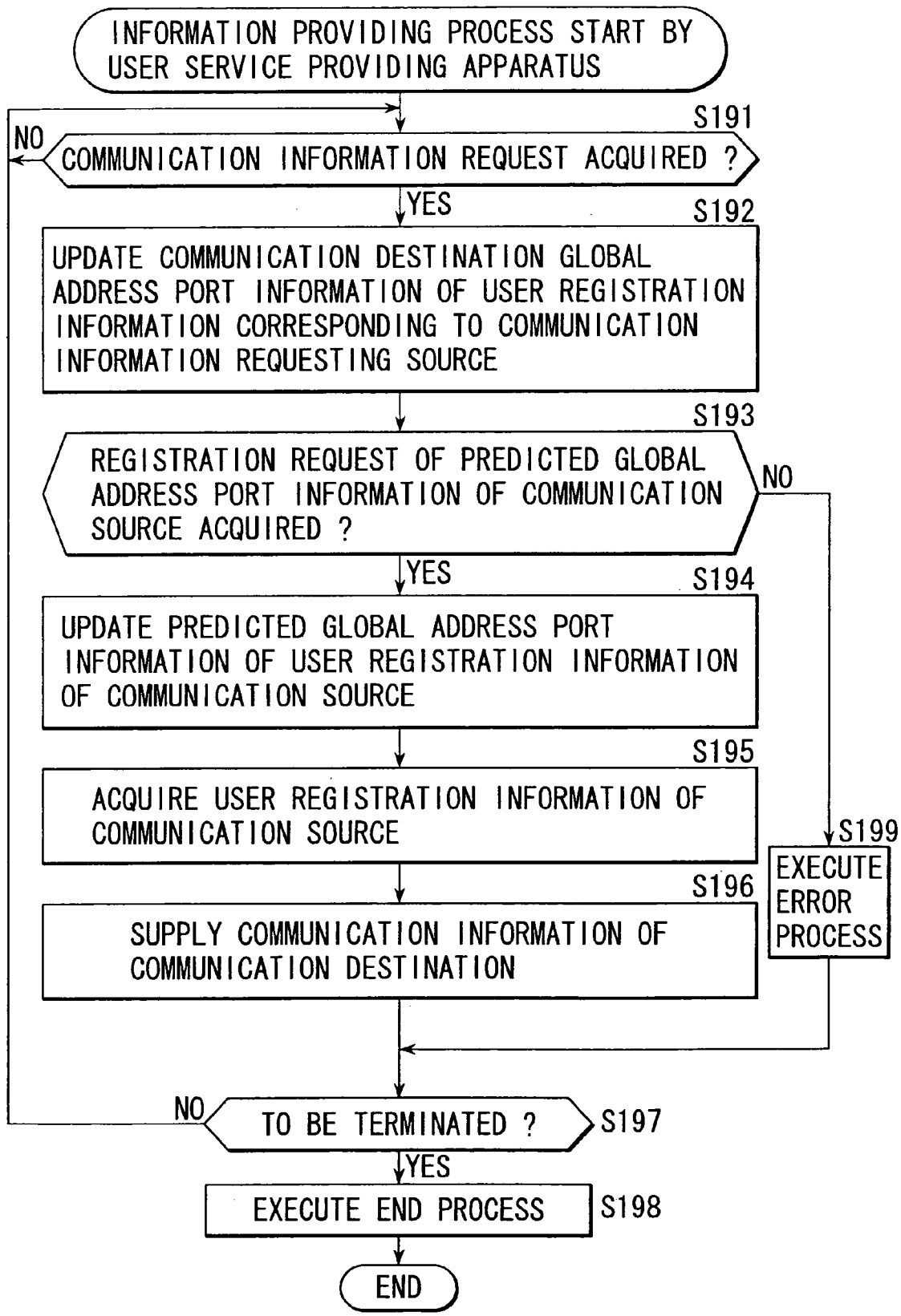
FIG. 18 is a flow chart illustrating an information providing process by the user service providing apparatus shown in FIG. 1.

An information processing apparatus described in claim 17 is characterized by including acquisition means (e.g., the user registration information management processing unit 155 of FIG. 5 for executing the process at Step S193 of FIG. 18) for acquiring information of an address on the network (e.g., the network 21 of FIG. 1) of the first other information processing apparatus, the address being supplied from the first other information processing apparatus (e.g., the local communication apparatuses 11-1 to 11-*n* of FIG. 1) and being predicted by the first other information processing apparatus, storage means (e.g., the user registration information database 177 of FIG. 5) for storing the information of the address on the network of the first other information processing apparatus acquired by the acquisition means, and supply means (e.g., the user registration information management processing unit 155 of FIG. 5 for executing the process at Step S196 of FIG. 18) responsive to a request from the second other information processing apparatus (e.g., the local communication apparatuses 31-1 to 31-*n* of FIG. 1) as a communication partner of the first other information processing apparatus, for supplying the second other information processing apparatus with the information of the address on the network of the first other information processing apparatus stored in the storage means and predicted by the first other information processing apparatus.

An information processing method described in claim 18 is characterized by including an acquisition step (e.g., Step S193 of FIG. 18) of acquiring information of an address on the network (e.g., the network 21 of FIG. 1) of the first other information processing apparatus, the address being supplied from the first other information processing apparatus (e.g., the local communication apparatuses 11-1 to 11-*n* of FIG. 1) and being predicted by the first other information processing apparatus, a storage step (e.g., Step S194 of FIG. 18) of storing the information of the address on the network of the first other information processing apparatus acquired by the process of the acquisition step, and a supply step (e.g., Step S196 of FIG. 18) responsive to a request from the second other information processing apparatus (e.g., the local communication apparatuses 31-1 to 31-*n* of FIG. 1) as a communication partner of the first other information processing apparatus, of supplying the second other information processing apparatus with the information of the address on the network of the first other information processing apparatus stored in the storage means and predicted by the first other information processing apparatus.

A program described in claim 19 is characterized by making a computer execute an acquisition step (e.g., Step S193 of FIG. 18) of acquiring information of an address on the network (e.g., the network 21 of FIG. 1) of the first other information processing apparatus, the address being supplied from the first other information processing apparatus (e.g., the local communication apparatuses 11-1 to 11-*n* of FIG. 1) and being predicted by the first other information processing apparatus, a storage step (e.g., Step S194 of FIG. 18) of storing the information of the address on the network of the first other information processing apparatus acquired by the process of the acquisition step, and a supply step (e.g., Step S196 of FIG. 18) responsive to a request from the second other information processing apparatus (e.g., the local communication apparatuses 31-1 to 31-*n* of FIG. 1) as a communication partner of the first other information processing apparatus, of supplying the second other information processing apparatus with the information of the address on the network of the first other information processing apparatus stored in the storage means and predicted by the first other information processing apparatus.

In the following, preferred embodiments of the present invention will be described with reference to the accompanying drawings.

FIG. 1 shows an example of the configuration of a network system adopting the present invention.

In the network system shown in FIG. 1, n local communication apparatuses 11-1 to 11-*n* as communication terminal apparatuses for instant message service (hereinafter called IM service) are connected to a relay apparatus 12 which is a router having an NAPT function, to constitute a private network 10. The relay apparatus 12 is also connected to a global network 21, typically the Internet, and assigned a global address which is an address globally usable in the network 21. The relay apparatus 12 has a plurality of ports as sub-addresses of the global address.

In the following, if it is not necessary to distinguishably describe the local communication apparatuses 11-1 to 11-*n*, they are collectively called a local communication apparatus 11.

Similarly, n local communication apparatuses 31-1 to 31-*n* as communication terminal apparatuses for instant message service (hereinafter called IM service) are connected to a relay apparatus 32 which is a router having an NAPT function, to constitute a private network 30 different from the private network 10. The relay apparatus 32 is also connected to the network 21 and assigned a global address which is an address globally usable in the network 21. The relay apparatus 32 has a plurality of ports as sub-addresses of the global address.

In the following, if it is not necessary to distinguishably describe the local communication apparatuses 31-1 to 31-*n*, they are collectively called a local communication apparatus 31.

Figure 2:
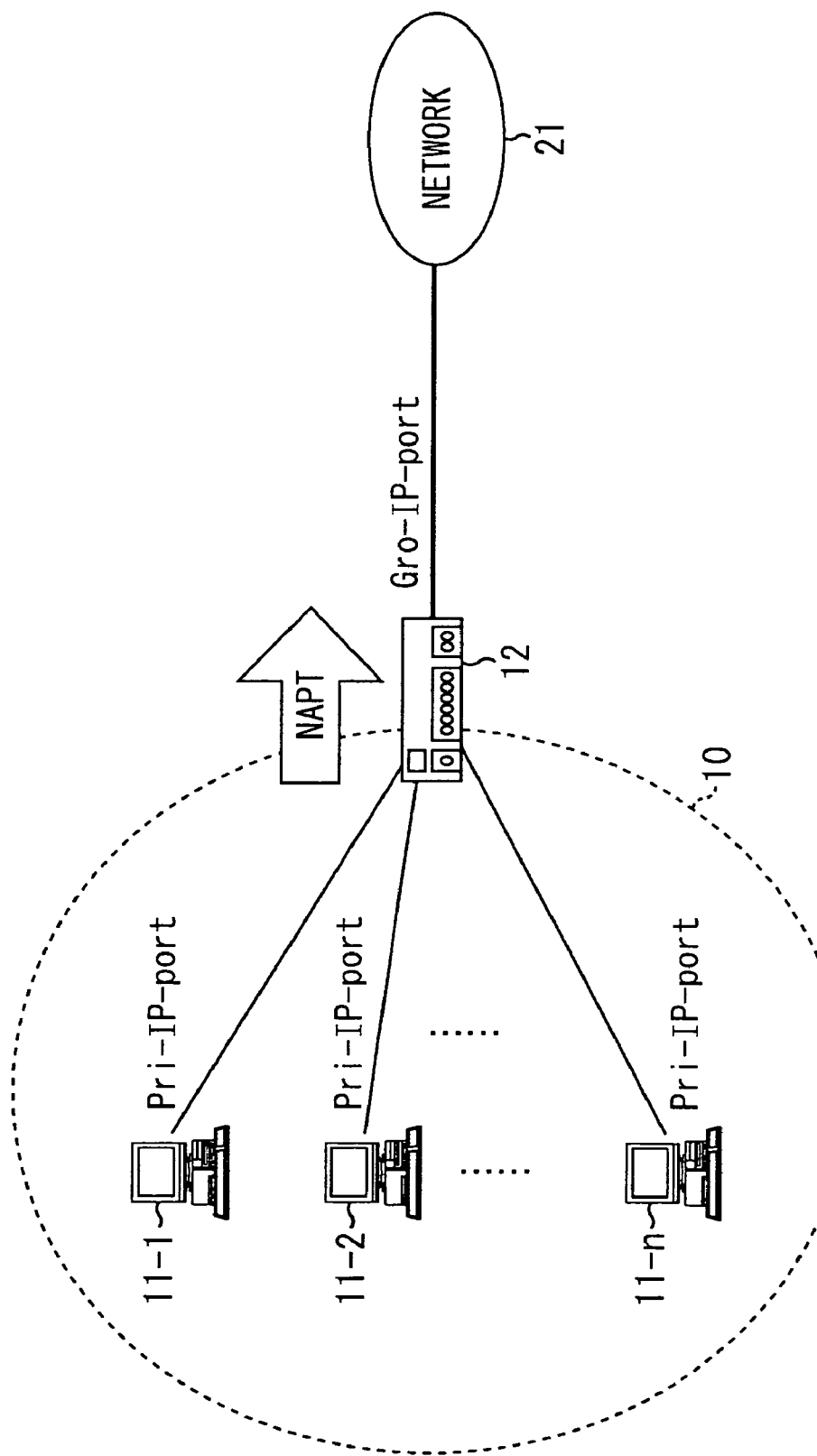
FIG. 2 is a diagram illustrating a NAPT translation by a relay apparatus shown in FIG. 1.

As shown in FIG. 2, the local communication apparatuses 11-1 to 11-*n* of the private network 10 are each assigned a private address in the private network 10. The local communication apparatus 11 has a plurality of ports as sub-addresses of the private address.

For example, when data is transmitted via the network 21, the local communication apparatus 11 supplies the relay apparatus 12 with the data, as well as the assigned private address and port information, as address port information (Pri-IP-port) of the transmission source.

By using the NAPT function, the relay apparatus 12 translates the address port information (Pri-IP-port) (hereinafter called private address port information) in the private network 10 acquired from the local communication apparatus 11, into address port information (Glo-IP-port) (hereinafter called global address port information) in the network 21 consisting of the global address and global port, and supplies the global address port information along with the acquired data to the network 21.

Also in the private network 30, similar processes to those in the private network 10 are performed by the local communication terminal apparatus 31 and relay apparatus 32, and so the description thereof is omitted.

The local communication apparatus 11 and local communication apparatus 31 communicate with each other via the private networks 10 and 30, relay apparatuses 12 and 32 and network 21, by utilizing the IM service provided by a user service providing apparatus 41 and an apparatus service providing apparatus 51.

In the following, when the local communication apparatus 11 communicates with an apparatus on the network 21 side via the relay apparatus 12, the description of the NAPT translation process for the address port information by the relay apparatus 12 is omitted when unnecessary. The translation process by the relay apparatus 32 is similarly omitted when unnecessary.

Reverting to FIG. 1, in addition to the relay apparatuses 12 and 32, the user service providing apparatus 41, the apparatus service providing apparatus 51 and an apparatus service providing apparatus 52 are connected to the network, these apparatuses 41, 51 and 52 being servers for providing the IM service to be used by the local communication apparatuses 11 and 31.

The user service providing apparatus 41 provides, via the network 21, user service which is a portion of the IM service and is service for a user of the local communication apparatus 11 or 31 using the IM service. The user service providing apparatus 41 provides the user service by communicating with the local communication apparatus 11, accessed via the private network 10, relay apparatus 12 and network 21, or by communicating with the local communication apparatus 31, accessed via the private network 30, relay apparatus 32 and network 21.

The apparatus service providing apparatuses 51 and 52 provide, via the network 21, apparatus service which is a portion of the IM service and is service for the local communication apparatus 11 or 31 using the IM service. The apparatus service providing apparatuses 51 and 52 provide apparatus service by communicating with the local communication apparatus 11, accessed via the private network 10, relay apparatus 12 and network 21, or by communicating with the local communication apparatus 31, accessed via the private network 30, relay apparatus 32 and network 21.

FIG. 3 is a block diagram showing an example of the internal structure of the local communication apparatus 11 of FIG. 1.

Referring to FIG. 3, a CPU (Central Processing Unit) 61 of the local communication apparatus 11 executes various processes based on programs stored in a ROM (Read Only Memory) 62. A RAM (Random Access Memory) 63 stores data, programs and the like necessary for executing various processes by CPU 61.

An authentication processing unit 64 has therein a control unit, a calculation unit or a data storage unit (each not shown) and executes a process regarding authentication of a user of the local communication apparatus 11 to be provided with the IM service. A communication information acquisition processing unit 65 has therein a control unit, a calculation unit or a data storage unit (each not shown) and executes a process regarding acquisition of communication information necessary for connection to another local communication apparatus. An inter-local communication control unit 66 has therein a control unit, a calculation unit or a data storage unit (each not shown) and controls communications with another local communication apparatus as a communication partner in the communications using the IM service.

A user authentication interface provision processing unit 67 has therein a control unit, a calculation unit or a data storage unit (each not shown) and provides a GUI (Graphical User Interface) for receiving a user input during user authentication.

A user identification interface provision processing unit 68 has therein a control unit, a calculation unit or a data storage unit (each not shown) and provides a GUI for making a user input information of a communication partner.

CPU 61, ROM 62, RAM 63, authentication processing unit 64, communication information acquisition processing unit 65, inter-local communication control unit 66, user authentication interface provision processing unit 67 and user identification interface provision processing unit 68 are interconnected by a bus 70. An input/output interface 80 is also connected to the bus 70.

The input/output interface 80 is connected to an input unit 81 consisting of a keyboard and a mouse, and outputs a signal input from the input unit 81 to CPU 61. The input/output interface 80 is also connected to an output unit 82 consisting of a display and a speaker.

The input/output interface 80 is also connected to a storage unit 83 consisting of a hard disc, an EEPROM (Electrically Erasable and Programmable Read Only Memory) and the like, and to a communication unit 84 for data communication with another apparatus via a network, such as the private network 10. A drive 85 is used for reading data from and writing data to a removable medium 91 made of a recording medium, such as a magnetic disc, an optical disc, a magneto-optical disc and a semiconductor memory.

An example of the internal structure of the local communication apparatus 12 of FIG. 1 is similar to that of the local communication apparatus 11, the block diagram of FIG. 3 can be applied, and so the description thereof is omitted.

Figure 4:
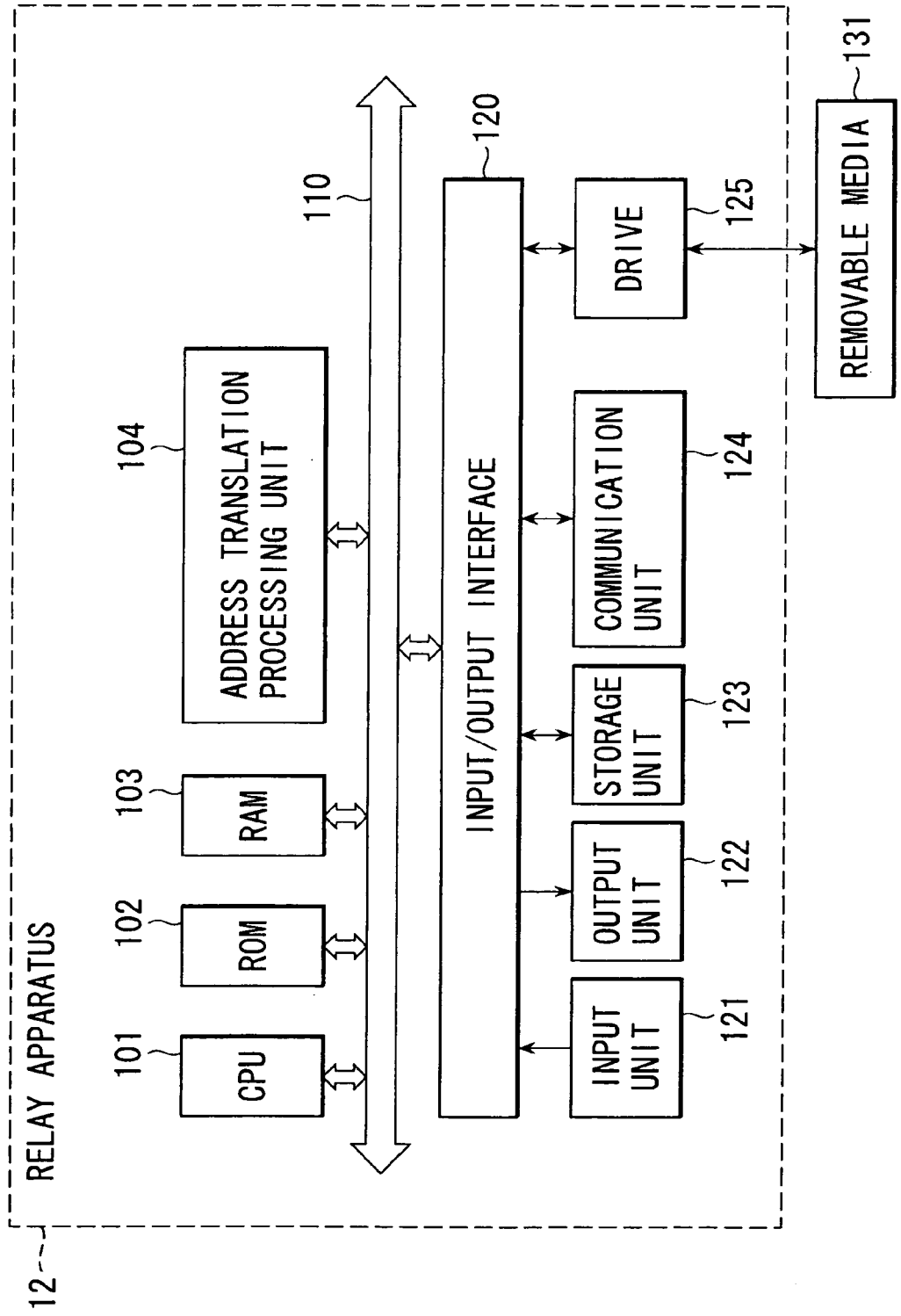
FIG. 4 is a block diagram showing an example of the internal structure of the relay apparatus shown in FIG. 1.

FIG. 4 is a block diagram showing an example of the internal structure of the relay apparatus 12 of FIG. 1.

Referring to FIG. 4, a CPU 101 of the relay apparatus 12 executes various processes based on programs stored in a ROM 102. A RAM 103 stores data, programs and the like necessary for executing various processes by CPU 101.

An address translation processing unit 104 has therein a control unit, a calculation unit or a data storage unit (each not shown) and executes a process of translating the private address port information of the private network 10, supplied from the local communication apparatus 11 via the communication unit 124, into the global address port information of the network 21.

CPU 101, ROM 102, RAM 103, and address translation processing unit 104 are interconnected by a bus 110. An input/output interface 120 is also connected to the bus 110.

The input/output interface 120 is connected to an input unit 121 consisting of a keyboard and a mouse, and outputs a signal input from the input unit 121 to CPU 101. The input/output interface 120 is also connected to an output unit 122 consisting of a display and a speaker.

The input/output interface 120 is also connected to a storage unit 123 consisting of a hard disc, an EEPROM and the like, and to a communication unit 124 for data communication with another apparatus via the private network 10 and network 21. A drive 125 is used for reading data from and writing data to a removable medium 131 made of a recording medium, such as a magnetic disc, an optical disc, a magneto-optical disc and a semiconductor memory.

An example of the internal structure of the relay apparatus 32 of FIG. 1 is similar to that of the relay apparatus 12, the block diagram of FIG. 4 can be applied, and so the description thereof is omitted.

FIG. 5 is a block diagram showing an example of the internal structure of the user service providing apparatus 41 of FIG. 1.

Referring to FIG. 5, a CPU 151 of the user service providing apparatus 41 executes various processes based on programs stored in a ROM 152. A RAM 153 stores data, programs and the like necessary for executing various processes by CPU 151.

An authentication processing unit 154 has therein a control unit, a calculation unit or a data storage unit (each not shown) and executes a process regarding authentication of a user to be provided with the IM service. A user registration information management processing unit 155 has therein a control unit, a calculation unit or a data storage unit (each not shown) and executes a process regarding management of user registration information supplied from the local communication apparatus and registered in a user registration information database 177.

CPU 151, ROM 152, RAM 153, authentication processing unit 154 and user registration information management processing unit 155 are interconnected by a bus 160. An input/output interface 170 is also connected to the bus 160.

The input/output interface 170 is connected to an input unit 171 consisting of a keyboard and a mouse, and outputs a signal input from the input unit 171 to CPU 151. The input/output interface 170 is also connected to an output unit 172 consisting of a display and a speaker.

The input/output interface 170 is also connected to a storage unit 173 consisting of a hard disc, an EEPROM and the like, and to a communication unit 174 for data communication with another apparatus via the network 21 and the like. A drive 175 is used for reading data from and writing data to a removable medium 181 made of a recording medium, such as a magnetic disc, an optical disc, a magneto-optical disc and a semiconductor memory.

The input/output interface 170 is also connected to a user authentication information database 176 and a user registration information database 177, the former storing user authentication information to be used by the authentication process to be executed by the authentication processing unit 154 and the latter storing user registration information which is information of each user regarding the IM service.

Figure 6:
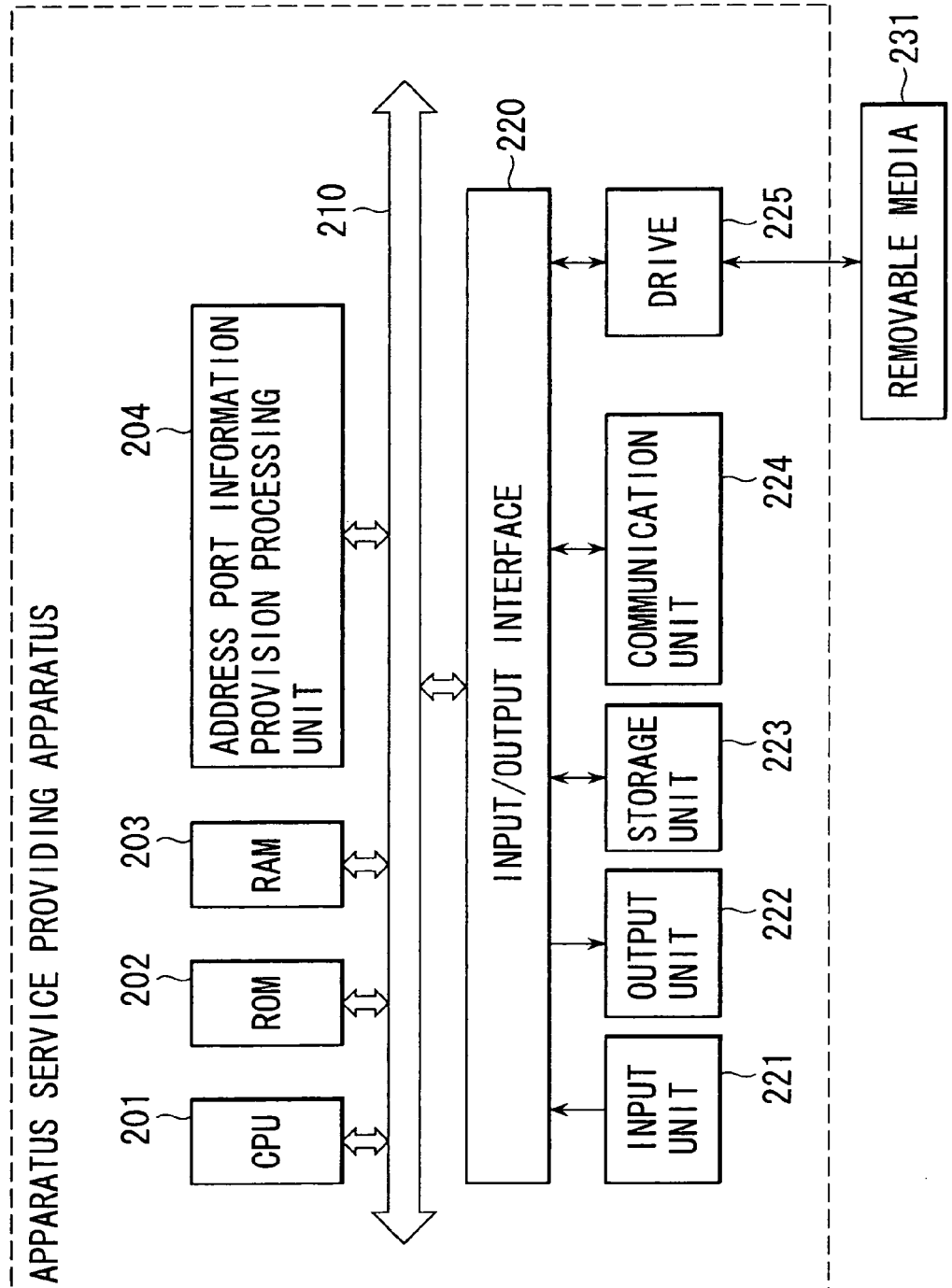
FIG. 6 is a block diagram showing an example of the structure of an apparatus service providing apparatus shown in FIG. 1.

FIG. 6 is a block diagram showing an example of the internal structure of the apparatus service providing apparatus 51 of FIG. 1.

Referring to FIG. 6, a CPU 201 of the apparatus service providing apparatus 51 executes various processes based on programs stored in a ROM 202. A RAM 203 stores data, programs and the like necessary for executing various processes by CPU 201.

An address port information provision processing unit 204 has therein a control unit, a calculation unit or a data storage unit (each not shown) and checks and supplies the global address port information in response to a request from the local communication apparatus 11 or 31.

CPU 201, ROM 202, RAM 203, and address port information provision processing unit 204 are interconnected by a bus 210. An input/output interface 220 is also connected to the bus 210.

The input/output interface 220 is connected to an input unit 221 consisting of a keyboard and a mouse, and outputs a signal input from the input unit 221 to CPU 201. The input/output interface 220 is also connected to an output unit 222 consisting of a display and a speaker.

The input/output interface 220 is also connected to a storage unit 223 consisting of a hard disc, an EEPROM and the like, and to a communication unit 224 for data communication with another apparatus via the network 21 and the like. A drive 225 is used for reading data from and writing data to a removable medium 231 made of a recording medium, such as a magnetic disc, an optical disc, a magneto-optical disc and a semiconductor memory.

The apparatus service providing apparatus 52 of FIG. 1 has a fundamentally similar structure to that of the apparatus service providing apparatus 51 and executes similar processes, the block diagram of FIG. 6 can be applied, and so the description thereof is omitted.

Next, with reference to the flow charts shown in FIGS. 7 to 10, an example of a process flow to be executed by each apparatus of the network system of FIG. 1 will be described. The detailed description will be given when necessary with reference to FIGS. 11 to 29.

A description will be made of a communication between the local communication apparatus 11 and the local communication apparatus 31 using the IM service provided by the user service providing apparatus 41 and the apparatus service providing apparatus 51, i.e., communication between communication apparatuses existing on different private networks via two routers having the NAPT function.

First, in order to use the IM service, at Step S1 the local communication apparatus 11 operated by a user supplies a user authentication process request to the user service providing apparatus 41 via the relay apparatus 12. At Step S21 the user service providing apparatus 41 acquires the supplied authentication request.

Similarly, in order to use the IM service, at Step S41 the local communication apparatus 31 operated by a user supplies a user authentication process request to the user service providing apparatus 41 via the relay apparatus 32. At Step S22 the user service providing apparatus 41 acquires the supplied authentication request.

At Step S23 the user service providing apparatus 41, having acquired the authentication request from the local communication apparatus 11 or 31, executes the authentication process. If the user of the local communication apparatus 11 or 31 is authenticated, at Step S24 the user service providing apparatus 41 supplies an authentication success notice to the local communication apparatus 11 or 31 via the network 21.

At Step S2 the local communication apparatus 11 acquires the authentication success notice to confirm that the user has been authenticated. Similarly, at Step S42 the local communication apparatus 31 acquires the authentication success notice supplied from the user service providing apparatus 41 to confirm that the user has been authenticated.

In the above communications, the local communication apparatuses 11 and 31 and user service providing apparatus 41 process transmission/reception packets based on the TCP/IP (Transmission Control Protocol/Internet Protocol) protocol system using HTTP (HyperText Transfer Protocol), RTP (Real-time Transport Protocol) or the like.

Of the above processes, an example of the authentication process to be executed by the local communication apparatus 11 will be described with reference to the flow chart of FIG. 11. The description will be made when necessary with reference to FIG. 12.

At Step S121 the authentication processing unit 64 of the local communication apparatus 11 operated by a user starts the authentication process by controlling the communication unit 84 to request information regarding user authentication from the user service providing apparatus 41 via the relay apparatus 12.

The user service providing apparatus 41 supplies the information regarding user authentication to the requesting local communication apparatus 11 via the network 21, as will be later described.

The authentication processing unit 64 controls the communication unit 84 to receive the information regarding user authentication, and after a lapse of a predetermined time, executes a process at Step S122 to determine whether the information regarding user authentication has been acquired. If it is determined that the information regarding user authentication has been acquired, the authentication processing unit 64 controls the user authentication interface provision processing unit 67 based on the acquired information regarding user authentication to receive a user authentication GUI, and at Step S123 supplies the GUI to the output unit 82 to display an authentication screen, such as shown in FIG. 12, on the display.

Figure 12:
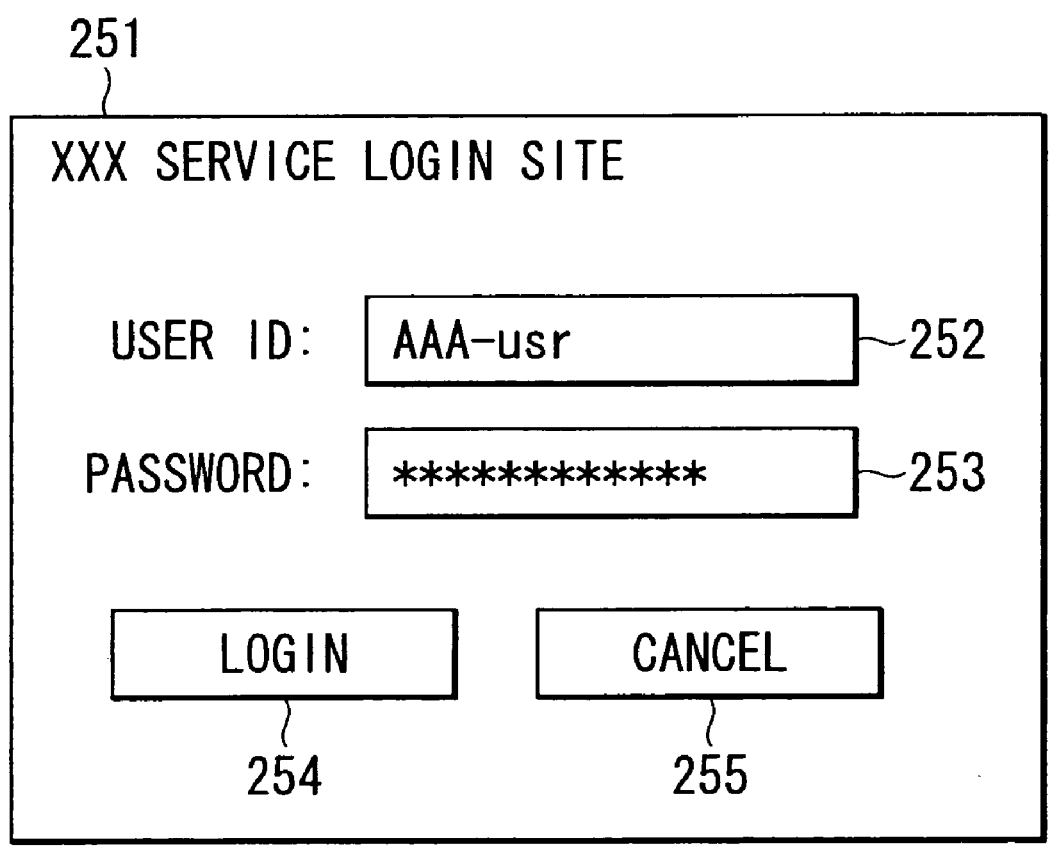
FIG. 12 is a diagram showing an example of the structure of an authentication screen.

As shown in FIG. 12, the authentication screen 251 is provided with a user ID input field 252, a password input field 253, a login button 254 and a cancel button 255, in addition to a message "XXX Service Login Site" indicating that the screen is an IM service authentication screen. The user ID input field is input with a user ID of a user using the service (a user of the local communication apparatus 11). The password input field 253 is input with a password set in association with the user ID. The login button is operated by a user to supply an authentication request to the user service providing apparatus 41. The cancel button is operated by a user to terminate the authentication process.

The user ID and password for the IM service are information assigned to a user of the local communication apparatus 11 using the IM service. When the authentication process is to be performed, the user of the local communication apparatus 11 enters the user ID and password into the user ID field 252 and password input field 253, respectively, and then operates the login button 254.

Figure 11:
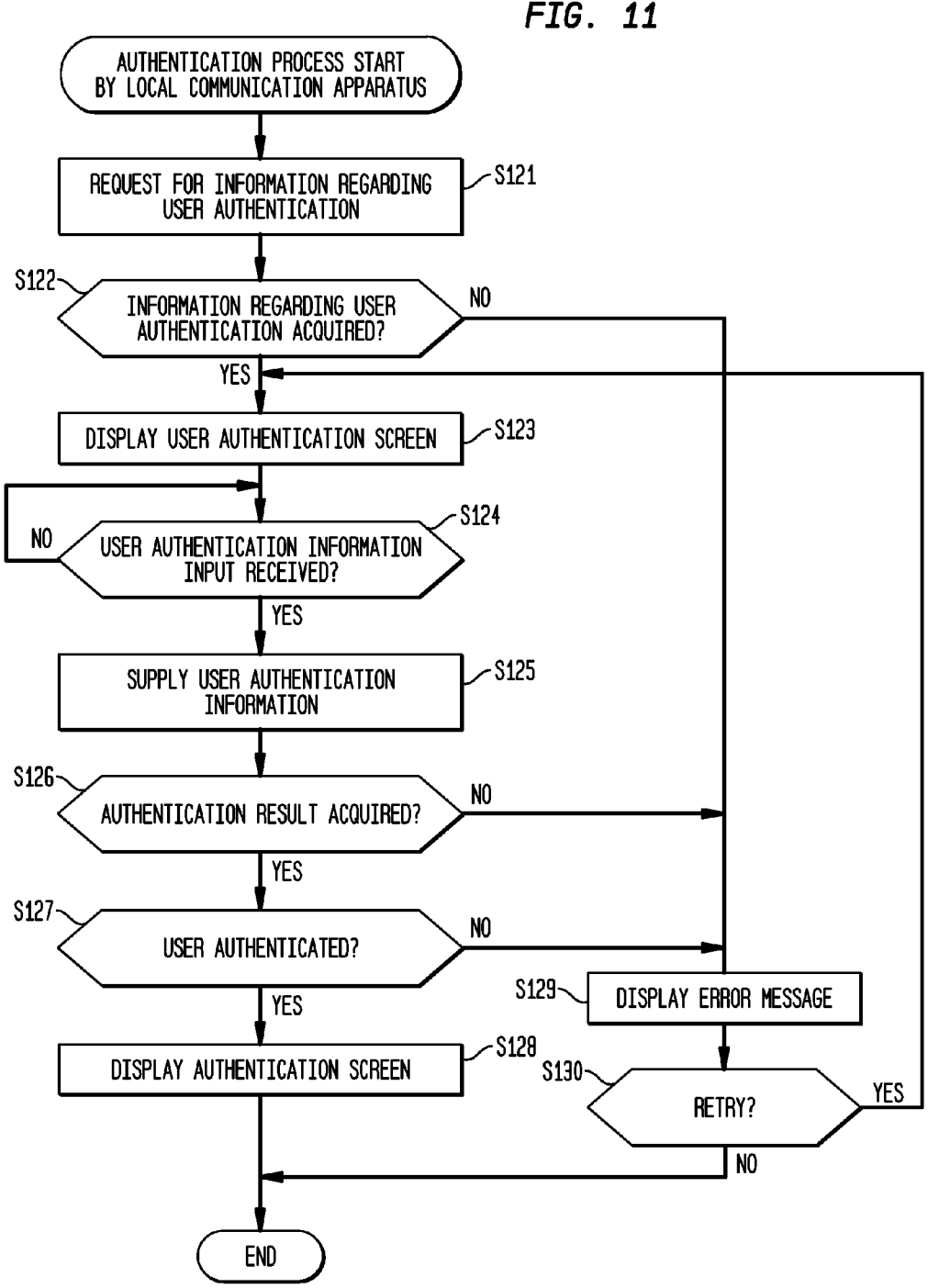
FIG. 11 is a flow chart illustrating an authentication process by the local communication apparatus shown in FIG. 1.

Reverting to FIG. 11, at Step S124 the authentication processing unit 64 controls the input unit 81 to determine whether an input of user authentication information consists of the user ID and password has been received, and stands by until it is determined that the input has been received.

If it is determined that the user operated the input unit 81 and input the user authentication information, the authentication processing unit 64 proceeds to a process at Step S125 whereat it supplies the received user authentication information as an authentication request to the user service providing apparatus 41 via the relay apparatus 12. This process corresponds to the process at Step S1 of FIG. 7.

As the user service providing apparatus 41 acquires the authentication request including the user authentication information, the user service providing apparatus 41 authenticates the user authentication information and supplies an authentication result to the local communication apparatus 11 via the network 21.

The authentication processing unit 64 of the local communication apparatus 11 controls the communication unit 84 to receive the authentication result, and after a lapse of a predetermined time, determines at Step S126 whether the authentication result has been acquired.

Figure 7:
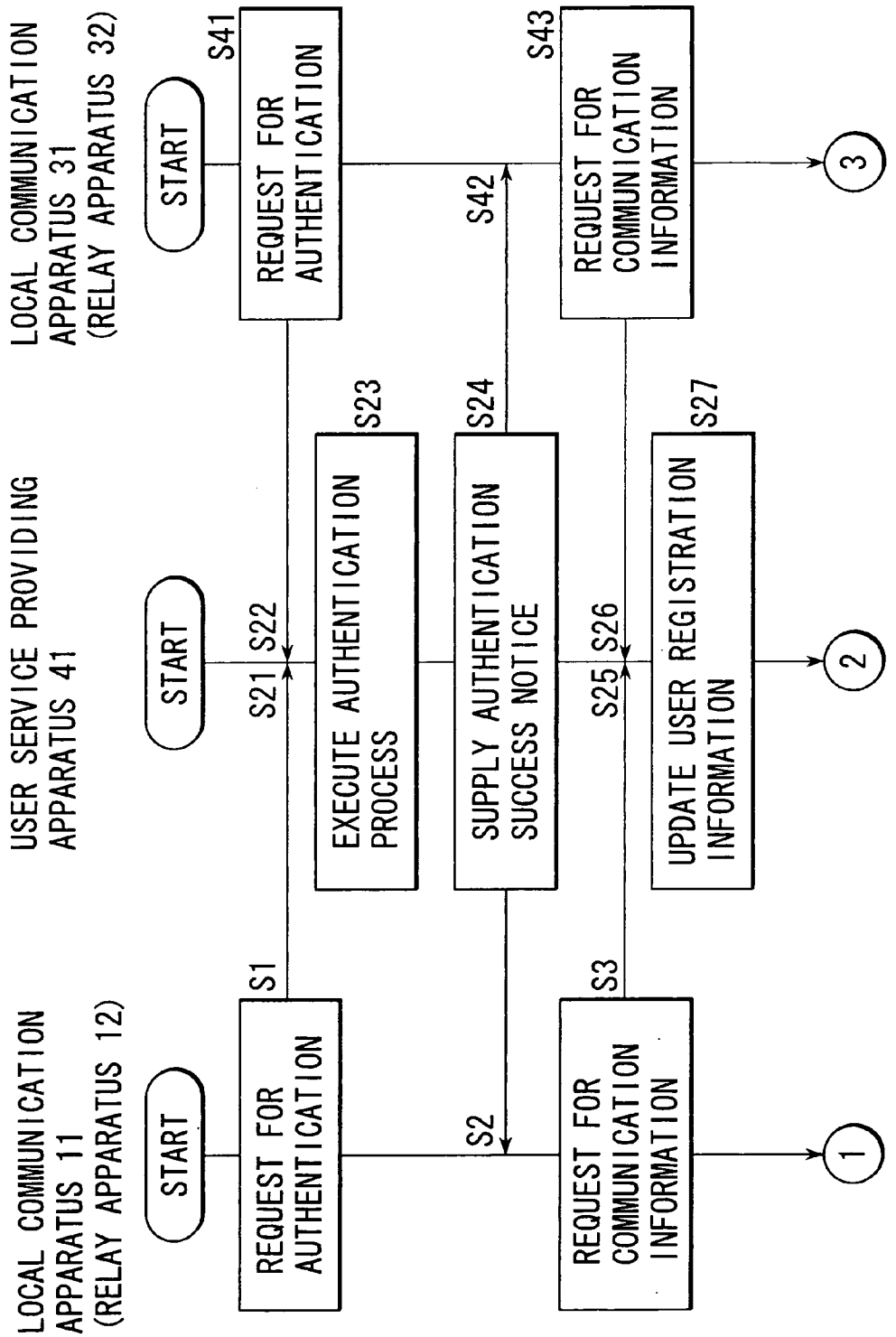
FIG. 7 is a flow chart illustrating the communication contents among apparatuses in the network system shown in FIG. 1.

If it is determined that the authentication result has been acquired like the process at Step S2 of FIG. 7, the authentication processing unit 64 determines at Step S127 from the acquired authentication result whether the user of the local communication apparatus 11 has been authenticated. If it is determined that the user has been authenticated, then at Step S128 the authentication processing unit 64 controls the output unit 82 to display an authentication message indicating that the user has been authenticated on the display and thereafter terminates the authentication process.

If it is determined at Step S122 that the information regarding user authentication has not been acquired, the authentication processing unit 64 proceeds to the process at Step S129 whereat the authentication processing unit 64 controls the output unit 82 to display an error message representative of an authentication failure on the display.

At Step S130 the authentication processing unit 64 determines whether authentication is to be performed again, and if it is determined from a user operation or the like that authentication is to be performed again, the process returns to the process at Step S123 to repeat the succeeding processes.

If it is determined at Step S130 that authentication is not to be performed again and the authentication process is to be terminated, the authentication processing unit 64 terminates the authentication process.

If it is determined at Step S126 that the authentication result supplied from the user service providing apparatus 41 has not been acquired, the authentication processing unit 64 proceeds to the process at Step S129 to execute the above-described process.

If it is determined at Step S127 that the user is not authenticated, the authentication processing unit 64 proceeds to the process at Step S129 to execute the above-described process.

The local communication apparatus 31 using the IM service executes an authentication process similar to the above-described process. Therefore, since the flow chart of FIG. 11 and an example of the authentication screen of FIG. 12 can be applied to the authentication process by the local communication apparatus 31, the description thereof is omitted.

Next, with reference to the flow chart of FIG. 13, a description will be made of an example of the authentication process by the user service providing apparatus 41 to be executed in correspondence with the above-described authentication process. The description will be made when necessary with reference to FIG. 14.

At Step S151 the authentication processing unit 154 of the user service providing apparatus 41 controls the communication unit 174 to determine whether the information regarding user authentication has been requested, and stands by until it is determined that the information has been requested, the information regarding user authentication being supplied from the local communication apparatus 11 or 31 via the network 21 by the process at Step S121 of FIG. 11.

If it is determined that the information regarding user authentication has been requested, at Step S152 the authentication processing unit 154 controls the communication unit 174 to supply the information regarding user authentication to the requesting apparatus.

The authentication processing unit 154 controls the communication unit 174 to receive the user authentication information, and after a lapse of a predetermined time, it is determined at Step S153 whether the user authentication information supplied from the local communication apparatus 11 or 31 by the process at Step S125 of FIG. 11 has been acquired.

If it is determined that the user authentication information has been acquired, the authentication processing unit 154 proceeds to the process at Step S154 whereat it executes the authentication process by referring to the user authentication information database 176. This process corresponds to the process at Step S23 of FIG. 7.

FIG. 14 is a schematic diagram showing the state in which the user authentication information database 176 stores the user authentication information. The user authentication information database 176 registers user authentication information 261 in correspondence with user IDs and user passwords. The authentication processing unit 154 refers to the pre-registered user authentication information 261 and compares the acquired user authentication information to determine whether the user is a rightful user.

Figure 13:
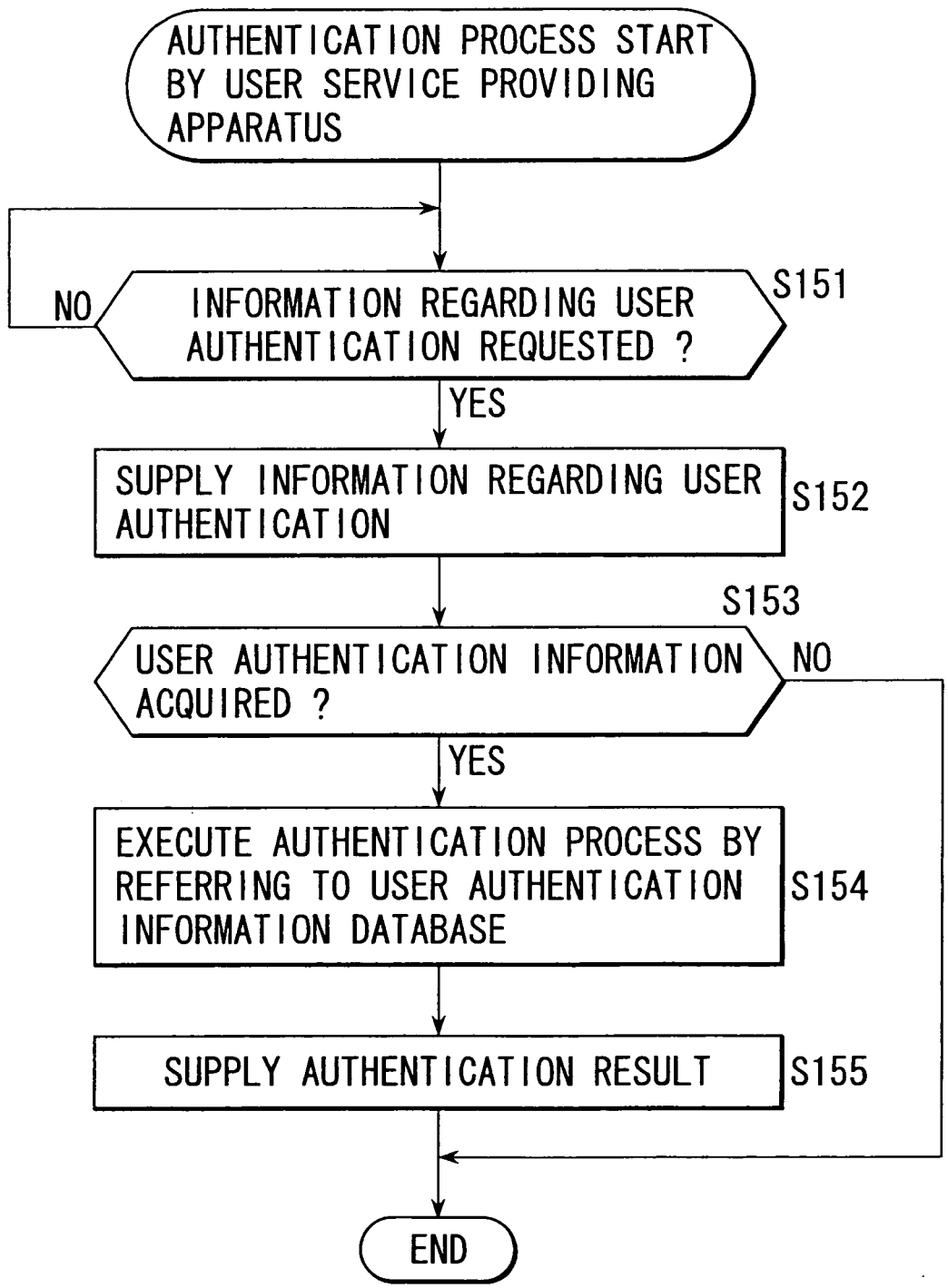
FIG. 13 is a flow chart illustrating an authentication process by the user service providing apparatus shown in FIG. 1.

Reverting to FIG. 13, at Step S155 the authentication unit 154 controls the communication unit 174 to supply the authentication result to the local communication apparatus 11 or 31 via the network 21. This process corresponds to the process at Step S24 of FIG. 7. The authentication processing unit 154 then terminates the authentication process. The authentication processing unit 154 starts a new authentication process similar to the above-described authentication process under the control of CPU 151 or the like.

If it is determined at Step S153 that the user authentication information has not been acquired, the authentication processing unit 154 terminates the authentication process. The authentication processing unit 154 starts a new authentication process similar to the above-described authentication process under the control of CPU 151 or the like.

Reverting to FIG. 7, upon acquisition of the authentication success notice indicating a successful authentication at Step S2, the local communication apparatus 11 displays a GUI screen in a manner to be described later and makes the user designate a communication partner. As the user determines the communication partner, at Step S3 the local communication apparatus 11 supplies a request for communication information, including the global address port information and the like of the communication partner, to the user service providing apparatus 41 via the relay apparatus 12. At Step S25 the user service providing apparatus 41 acquires the supplied communication information request.

The request for the communication information acquired by the user service providing apparatus 41 was supplied via the relay apparatus 12 which executed NAPT translation to add the global address port information of the relay apparatus 12 (corresponding to the local communication apparatus 11).

Similarly, upon acquisition of the authentication success notice indicating a successful authentication at Step S42, the local communication apparatus 31 displays a GUI screen in a manner to be described later and makes the user designate a communication partner. As the user determines the communication partner, at Step S43 the local communication apparatus 31 supplies a request for communication information, including the global address port information and the like of the communication partner, to the user service providing apparatus 41 via the relay apparatus 32. At Step S26 the user service providing apparatus 41 acquires the supplied communication information request.

The request for the communication information acquired by the user service providing apparatus 41 was supplied via the relay apparatus 32 which executed NAPT translation to add the global address port information of the relay apparatus 32 (corresponding to the local communication apparatus 31).

At Step S27 the user service providing apparatus 41 that acquired the communication information request from the local communication apparatus 11 or 31 updates the user registration information registered in the user registration information database 176 by using the global address port information of the relay apparatus 12 or 32 added to the supplied communication information request, as will be later described.

In the above communication, the local communication apparatuses 11 and 31 and the user service providing apparatus 41 process transmission/reception packets based on the TCP/IP protocol system using HTTP, RTP or the like.

The local communication apparatus 11 which supplied the communication information request proceeds to the process at Step S4 of FIG. 8 whereat it supplies a service request packet, such as a packet to be later described, to the apparatus service providing apparatus 51 via the relay apparatus 12. At Step S61 the apparatus service providing apparatus 51 acquires the service request packet.

The service request packet acquired by the apparatus service providing apparatus 51 was supplied via the relay apparatus 12 which executed NAPT translation to add the global address port information of the relay apparatus 12 (corresponding to the local communication apparatus 11).

Similarly, the local communication apparatus 31 which supplied the communication information request proceeds to the process at Step S44 of FIG. 8 whereat it supplies a service request packet, such as a packet to be later described, to the apparatus service providing apparatus 51 via the relay apparatus 32. At Step S62 the apparatus service providing apparatus 51 acquires the service request packet.

The service request packet acquired by the apparatus service providing apparatus 51 was supplied via the relay apparatus 32 which executed NAPT translation to add the global address port information of the relay apparatus 32 (corresponding to the local communication apparatus 31).

At Step S63 the apparatus service providing apparatus 51 generates a service provision packet by using the global address port information of the relay apparatus 12 or 32 added to the acquired service request packet, and supplies it to the local communication apparatus 11 or 31 which is the transmission source of the service request packet, via the network 21.

At Step S5 the local communication apparatus 11 acquires the service provision packet. Similarly, at Step S45 the local communication apparatus 31 acquires the service provision packet.

The local communication apparatus 11 or 31 again executes the above-described process executed for the apparatus service providing apparatus 51, this time for the apparatus service providing apparatus 52.

Namely, the local communication apparatus 11 proceeds to the process at Step S6 of FIG. 8 whereat it supplies a service request packet, such as a packet to be described later, to the apparatus service providing apparatus 52 via the relay apparatus 12. At Step S71 the apparatus service providing apparatus 52 acquires the service request packet.

Similar to the above-described case of the apparatus service providing apparatus 51, the service request packet acquired by the apparatus service providing apparatus 52 was supplied via the relay apparatus 12 which executed NAPT translation to add the global address port information of the relay apparatus 12 (corresponding to the local communication apparatus 11).

Similarly, the local communication apparatus 31 which supplied the communication information request proceeds to the process at Step S46 of FIG. 8 whereat it supplies a service request packet, such as a packet to be described later, to the apparatus service providing apparatus 52 via the relay apparatus 32. At Step S72 the apparatus service providing apparatus 52 acquires the service request packet.

Similar to the above-described case of the apparatus service providing apparatus 51, the service request packet acquired by the apparatus service providing apparatus 52 was supplied via the relay apparatus 32 which executed NAPT translation to add the global address port information of the relay apparatus 32 (corresponding to the local communication apparatus 31).

At Step S73 the apparatus service providing apparatus 52 generates a service provision packet by using the global address port information of the relay apparatus 12 or 32 added to the acquired service request packet, and supplies it to the local communication apparatus 11 or 31 which is the transmission source of the service request packet, via the network 21.

At Step S7 the local communication apparatus 11 acquires the service provision packet. Similarly, at Step S47 the local communication apparatus 31 acquires the service provision packet.

At Step S8 the local communication apparatus 11 which acquired two service provision packets from the apparatus service providing apparatuses 51 and 52 predicts (estimates) the address port information of the relay apparatus at a communication source, i.e., the global address port information of the relay apparatus 12 (corresponding to the local communication apparatus 11), based on the global address port information contained in the two service provision packets.

Although the details will be later described, the relay apparatus 12 changes the port corresponding to the local communication apparatus 11 in some cases, each time the address port information of the communication destination of the local communication apparatus is changed. In the process at Step S8, the local communication apparatus 11 predicts (estimates) the address port information (latest global address port information) corresponding to the local communication apparatus for the next communication by using the two service provision packets acquired from the apparatus service providing apparatuses 51 and 52.

Similarly, at Step S48 the local communication apparatus 31 which acquired two service provision packets from the apparatus service providing apparatuses 51 and 52 predicts (estimates) the address port information of the relay apparatus at a communication source, i.e., the latest global address port information of the relay apparatus 32 (corresponding to the local communication apparatus 31), based on the global address port information contained in the two service provision packets.

In the above communications, the local communication apparatuses 11 and 31 and the apparatus service providing apparatus 51 process transmission/reception service requests and provision packets based on the UDP/IP (User Datagram Protocol/IP) protocol system using STUN (Simple Traversal of UDP through NATs), RTP, RTCP (RTP Control Protocol) or the like.

Figure 9:
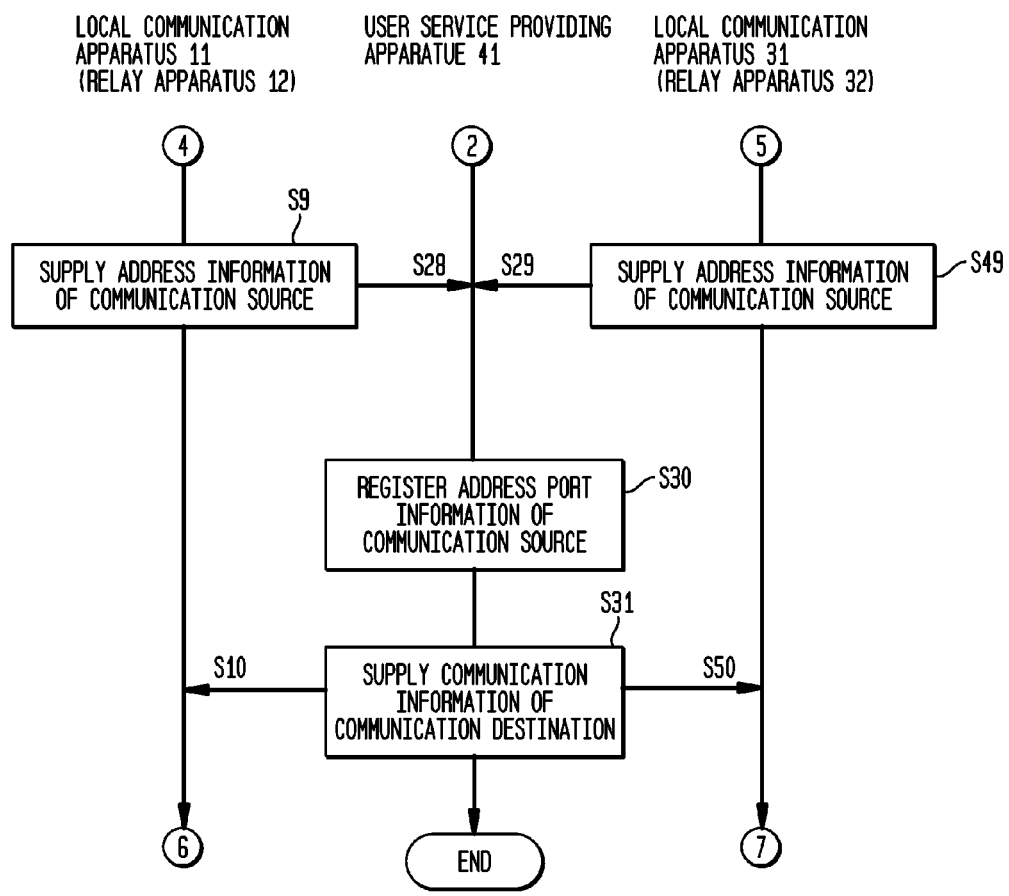
FIG. 9 is a flow chart illustrating the communication contents among apparatuses in the network system shown in FIG. 1, following the flow chart shown in FIG. 8.

After the local communication apparatus 11 predicts (estimates) the global address port information of the relay apparatus 12 by using the global address port information contained in the two acquired service provision packets at Step S8, the local communication apparatus 11 proceeds to the process at Step S9 of FIG. 9 whereat the local communication apparatus 11 supplies the predicted global address port information as the communication source address port information to the user service providing apparatus 41 via the relay apparatus 12. At Step S28 of FIG. 9 the user service providing apparatus 41 acquires the communication source address port information.

Similarly, after the local communication apparatus 31 predicts (estimates) the global address port information of the relay apparatus 32 by using the global address port information contained in the two acquired service provision packets at Step S48, the local communication apparatus 31 proceeds to the process at Step S49 of FIG. 9 whereat the local communication apparatus 31 supplies the predicted global address port information as the communication source address port information to the user service providing apparatus 41 via the relay apparatus 32. At Step S29 of FIG. 9 the user service providing apparatus 41 acquires the communication source address port information.

At Step S30 the user service providing apparatus 41 which acquired the communication source address port information from the local communication apparatus 11 or 31 registers the communication source address port information in the user registration information database 177, as will be later described. At Step S31 the user service providing apparatus 41 supplies communication information of a communication destination registered in the user registration information database 177 to the local communication information apparatus 11 or 31 via the network 21.

At Step S10 the local communication apparatus 11 acquires the communication information of the communication destination. Similarly, at Step S50 the local communication apparatus 31 acquires the communication information of the communication destination.

Namely, in this case, the user service providing apparatus 41 supplies the local communication apparatus 31 with the communication source address port information of the local communication apparatus 11 (predicted (estimated) global address port information of the relay apparatus 12) supplied from the local communication apparatus 11 and registered, and supplies the local communication apparatus 11 with the communication source address port information of the local communication apparatus 31 (predicted (estimated) global address port information of the relay apparatus 32) supplied from the local communication apparatus 31 and registered.

In the above communications, the local communication apparatuses 11 and 31 and user service providing apparatus 41 process transmission/reception packets based on the TCP/IP protocol system.

With reference to the flow chart of FIG. 15, a description will be made of an example of a communication information acquiring process to be executed by the local communication apparatus 11 in the above-described processes. The description will be made when necessary with reference to FIGS. 16 and 17.

At Step S171 the communication information acquisition processing unit 65 of the local communication apparatus 11 which started the communication information acquiring process under the control of CPU 61 or the like requests the information necessary for identifying a communication partner from the user service providing apparatus 41 via the relay apparatus 12.

The user service providing apparatus 41 supplies the information necessary for identifying the communication partner to the requesting local communication apparatus 11 via the network 21, as will be later described.

The communication information acquisition processing unit 65 controls the communication unit 84 to receive the information necessary for identifying the communication partner, and after a lapse of a predetermined time, executes the process at Step S172 to determine whether the information necessary for identifying the communication partner has been acquired. If it is determined that the information necessary for identifying the communication partner has been acquired, the communication information acquisition processing unit 65 controls the user identifying interface provision processing unit 68 based on the acquired information necessary for identifying the communication partner to make it supply the user identifying GUI, and at Step S173 supplies the GUI to the output unit 82 to display a user identifying screen, such as shown in FIG. 16, on the display.

Figure 16:
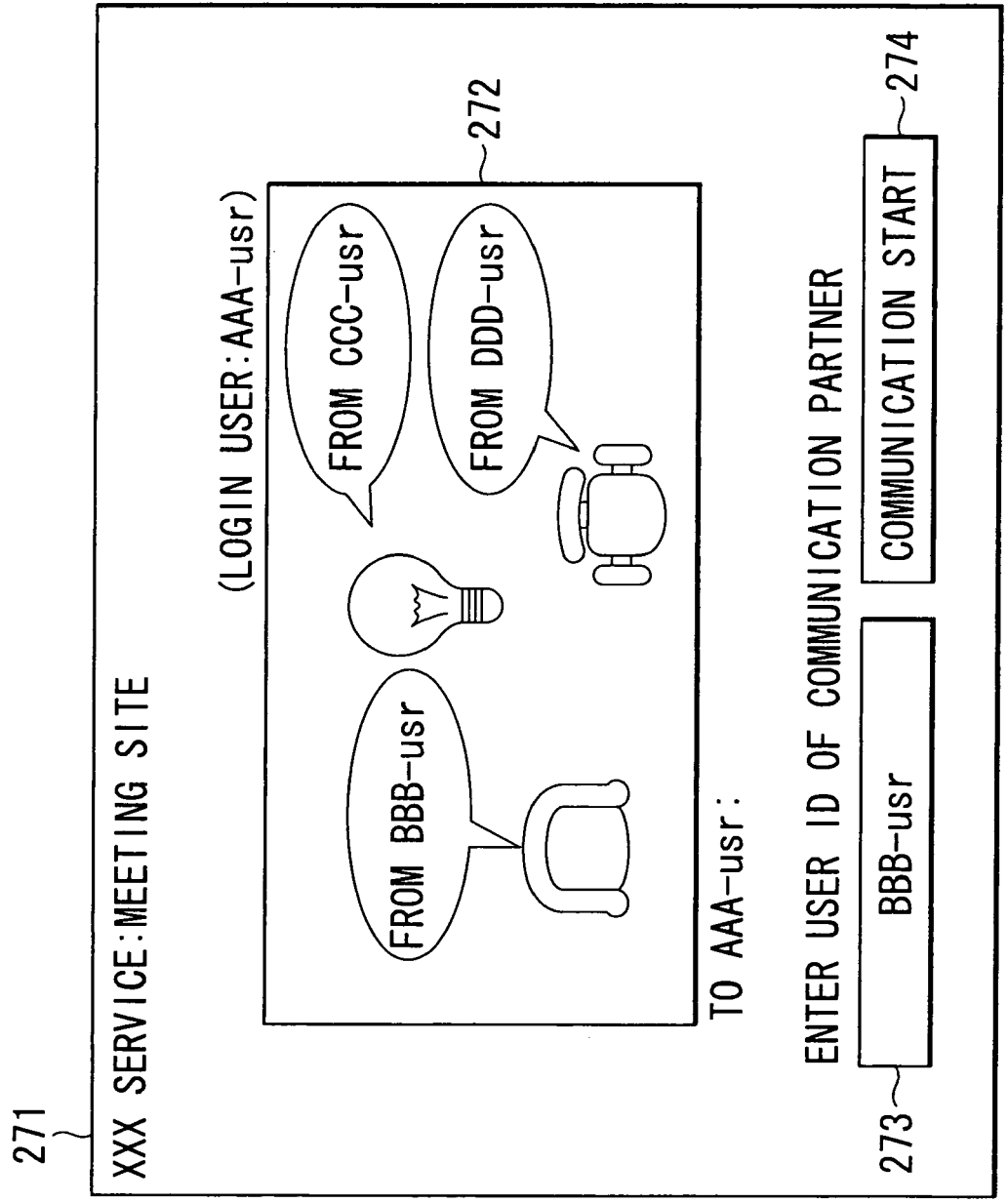
FIG. 16 is a diagram showing an example of the structure of a user identifying screen.

As shown in FIG. 16, the user identifying screen 271 is provided with a user list display field 272 for displaying other users selectable as a communication partner, a user ID input field 273 for inputting the user ID of a user selected by the user as a communication partner, and a communication start button 274 for inputting a communication start instruction by the user.

The user of the IM service selects the communication partner from the user IDs of users presently selectable as a communication partner, inputs the user ID in the user ID input field 273 and operates the communication start button 274.

Reverting to FIG. 15, at Step S174 the communication information acquisition processing unit 65 controls the input unit 81 to receive the input of the user authentication information consisting of the user ID and password.

As the user inputs the user ID of the communication partner in the user ID input field 273 of the user identifying screen 271 and operates the communication start button 274, at Step S174 the communication information acquisition processing unit 65 controls the communication unit 84 to supply a request for communication information of the communication partner to the user service providing apparatus 41 via the relay apparatus. This process corresponds to the process at Step S3 of FIG. 7.

Figure 17:
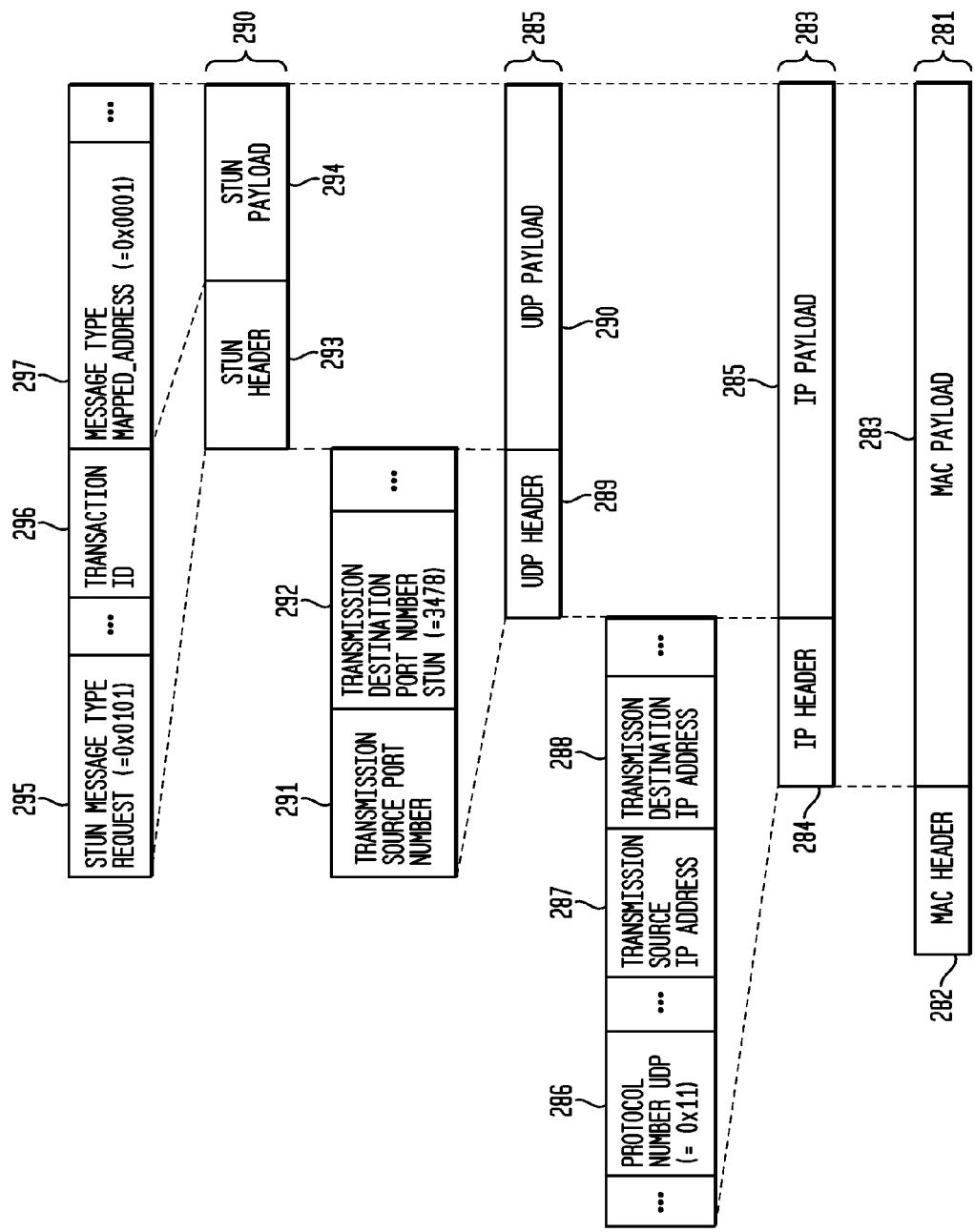
FIG. 17 is a schematic diagram showing an example of the structure of a service request packet.

In order to grasp the address port information after NAPT translation at the relay apparatus 12, i.e., the global address port information of the relay apparatus 12 (corresponding to the local communication apparatus 11), at Step S175 the communication information acquisition processing unit 65 controls the control unit 84 to supply a service request packet, such as shown in FIG. 17, to the apparatus service providing apparatus 51 via the relay apparatus 12. This process corresponds to the process at Step S4 of FIG. 8.

The service request packet 281 consists of a MAC (Media Access Control) packet for communication at the data link layer. As shown in FIG. 17, the service request packet 281 consists of a MAC header 282 and a MAC payload 283.

The MAC payload 283 consists of an IP packet for communication at the network layer and includes an IP header 284 and an IP payload 285. The IP header 284 includes a protocol number 286, a transmission source IP address 287 and a transmission destination IP address 288. The protocol number is an identifier indicating that the service request packet 281 is a packet corresponding to the service provided by the apparatus service providing apparatus 51. The transmission source IP address is data representative of an IP address (in this case, the private address of the local communication apparatus 11) of the transmission source of the service request packet. The transmission destination IP address is data representative of an IP address (in this case, the global address of the apparatus service providing apparatus 51) of the transmission destination of the service request packet.

NAPT translation of the relay apparatus 12 to be executed when the service request packet 281 is transferred translates the value of the IP address 287 of the transmission source into the global address of the relay apparatus 12. Namely, the IP address 287 of the transmission source when the apparatus service providing apparatus 51 acquires it is the global address of the relay apparatus 12.

The IP payload 285 consists of a UDP packet for communication at the transport layer, and includes a UDP header 289 and a UDP payload 290. The UDP header 289 includes a transmission source port number 291 and a transmission destination port number 292. The transmission source port number is data representative of the port number of the transmission source (i.e., the port number of the local communication apparatus 11) used when the service request packet is transmitted. The transmission destination port number is the port number of the transmission destination (i.e., the port number of the apparatus service providing apparatus 51) and is an identifier indicating that the service request packet 281 is a packet corresponding to the service provided by the apparatus service providing apparatus 51.

NAPT translation of the relay apparatus 12 to be executed when the service request packet 281 is transferred translates the value of the transmission source port number into the port number of the relay apparatus 12. Namely, the transmission source port number 291 when the apparatus service providing apparatus 51 acquires it is the global port address of the relay apparatus 12.

The UDP payload 290 consists of a STUN (Simple Traversal of UDP through NATs) packet for communication using a STUN protocol, and includes a STUN header 293 and a STUN payload 294. The STUN header 293 includes a STUN message type 295 and a transaction ID 296. The STUN message type is an identifier indicating that this packet contains a request based upon the STUN protocol and that the service request packet 281 is a packet corresponding to the service provided by the apparatus service providing apparatus 51. The transaction ID is used for identifying a transaction.

The STUN payload 294 contains a message type 297 indicating the contents of a message and is an identifier indicating that the service request packet 281 is a packet corresponding to the service provided by the apparatus service providing apparatus 51.

As described above, the IP header 284, UDP header 289, STUN header 293 and STUN payload 294 contained in the service request packet 281 each include an identifier indicating that the service request packet 281 is a packet corresponding to the service provided by the apparatus service providing apparatus 51. With these identifiers, the apparatus service providing apparatus 51 can execute a process satisfying the request of the service request packet 281.

Reverting to FIG. 15, at Step S176 the communication information acquisition processing unit 65 which supplied the above-described service request packet controls the communication unit 85 to determine whether a service provision packet corresponding to the supplied service request packet has been acquired. If it is determined that the service provision packet has been acquired, the communication information acquisition processing unit 65 proceeds to the process at Step S177 whereat it controls the communication unit 84 to supply the service request packet described above with reference to FIG. 17 to the apparatus service providing apparatus 52 via the relay apparatus 12. This process corresponds to the process at Step S6 of FIG. 8.

At Step S178 the communication information acquisition processing unit 65 controls the communication unit 85 to determine whether the service provision packet corresponding to the supplied service request packet has been acquired. If it is determined that the service provision packet has been acquired, the communication information acquisition processing unit 65 proceeds to the process at Step S179 whereat it extracts address port information of the relay apparatus 12 used for transmission of the service request packets from the two acquired service provision packets, calculates a difference value between two pieces of the address port information, adds the difference value to the address port information acquired later, and predicts (estimates) the communication source global address port information (communication source Glo-IP-port) for the next communication (communication for accessing the local communication apparatus 31).

At Step S180 the communication information acquisition processing unit 65 supplies the predicted (estimated) global address port information (hereinafter called predicted global address port information) to the user service providing apparatus 41 via the relay apparatus 12, and requests registration of the predicted global address port information of the communication source as the user registration information. This process corresponds to the process at Step S9 of FIG. 9.

The user service providing apparatus 41 updates the user registration information based on the request, and supplies the communication information of the communication destination, which is the communication information of the communication partner of the local communication apparatus 11, to the local communication apparatus 11 via the network 21, based on the updated latest user registration information.

At Step S181 the communication information acquisition processing unit 65 of the local communication apparatus 11 controls the communication unit 84 to determine whether the communication information of the communication destination has been acquired. If it is determined that the communication information has not been acquired, the process proceeds to Step S182 whereat it controls the output unit 81 to execute an error process and thereafter terminates the communication information acquiring process. If it is determined at Step S181 that the communication information of the communication destination has been acquired, the process at Step S182 is omitted and the communication information acquiring process is terminated.

If it is determined at Step S176 or S178 that the service provision packet has not been acquired, the communication information acquisition processing unit 65 proceeds to the process at Step S182 to execute the error process and thereafter terminates the communication information acquiring process.

With the above-described processes, the communication information acquisition processing unit 65 of the local communication apparatus 11 supplies the same service request packet to both of the apparatus service providing apparatuses 51 and 52 and acquires the service provision packets from both of the apparatuses.

These processes are executed in order to predict (estimate) the port assigned by the relay apparatus 12 for the next communication by the local communication apparatus 11.

For example, if the relay apparatus 12 assigns the same port to the local communication apparatus independently of the address port information of the communication destination of the local communication apparatus 11, i.e., if NAPT translation translates the transmission source address port information acquired from the local communication apparatus 11 into the same global address port information independently of the address port information of the communication destination, then the address port information contained in the service provision packet supplied from the apparatus service providing apparatus 51 is the global address port information corresponding to the local communication apparatus 11 even for the next communication.

However, for example, if the relay apparatus 12 increases by one (increments) the port number assigned to the local communication apparatus 11 each time the address port information of the communication destination of the local communication apparatus 11 changes, the address port information contained in the service provision packet supplied from the apparatus service providing apparatus 51 does not become the global address port information corresponding to the local communication apparatus 11 for the next communication.

Therefore, the communication information acquisition processing unit 65 of the local communication apparatus 11 acquires the service provision packets from both of the two apparatus service provision apparatuses 51 and 52 having different address port information, calculates the difference value between two pieces of the global address port information contained in the service provision packets, and adds the difference value to the global address port information obtained by later communication with the apparatus service providing apparatus 52 to predict (estimate) the global address port information for the next communication.

In this manner, even if the global address port information corresponding to the local communication apparatus 11 changes with the address port information of the communication destination, the local communication apparatus 11 can predict (estimate) the global address port information corresponding to the local communication apparatus 11 for the next communication, so that relay apparatuses of a larger number of types can be dealt with.

The local communication apparatus 31 using the IM service executes a communication information acquiring process similar to the process described above. Therefore, the flow chart of FIG. 15, user identifying screen of FIG. 16 and the example of the service request packet of FIG. 17 can be applied to the communication information acquiring process by the local communication apparatus 31, and so the description thereof is omitted.

Next, with reference to the flow chart of FIG. 18, a description will be made on an example of an information providing process by the user service providing apparatus 41 to be executed in correspondence with the communication information acquiring process. The description will be made when necessary with reference to FIG. 19.

First, at Step S191 the user registration information management processing unit 155 of the user service providing apparatus 41 controls the communication unit 174 to determine whether the request for communication information supplied at Step S174 of FIG. 15 from the local communication apparatus 11 or 31 has been acquired, and stands by until it is determined that the request has been acquired.

If it is determined that the request for communication information has been acquired, at Step S192 the user registration information management processing unit 155 updates the communication destination global address port information in the user registration information stored in the user registration information database 177, such as shown in FIG. 19, and corresponding to the communication information request source.

As shown in FIG. 19, the user registration information 310 registered in the user registration information database 177 includes a user ID 311, predicted communication source global address port information (predicted communication source Glo-IP-port) 312 which is the global address port information of the predicted (estimated) communication source, and communication destination address port information (communication destination Glo-IP-port) 313 which is the global address port information of a communication destination desired by the user, these user IDs and information being stored in relation to each other.

The communication destination global address port information 313 is the global address port information of the communication partner side desired by the user corresponding to the user ID 311 of the user registration information, whereas the predicted communication source global address port information 312 is the global address port information of the user side corresponding to the user ID 311 of the user registration information.

For example, if the user ID of a user of the local communication apparatus 11 is AAA-usr and the user ID of the local communication apparatus 31 is BBB-usr and these two users intend to communicate with each other, global address port information "ppp.qqq.nr.sss.ttt" of the relay apparatus 12 predicted (estimated) to be used for communication with the local communication apparatus 11 is registered in a predicted communication source global address port 312 corresponding to the user ID "AAA-usr", and an instruction "predicted communication source global address port information of BBB-usr" is registered in a predicted communication destination global address port 313 corresponding to the user ID "AAA-usr", in order that the global address port information of the relay apparatus 32 predicted (estimated) to be used for communication with the local communication apparatus 31 (i.e., predicted global address port information of BBB-user) is applied.

If the communication partner is not designated, "(none)" is registered in the communication destination global address port information 313 in the user registration information of the user.

As described above, in the process at Step S192, the user registration information management processing unit 155 updates the communication global address port information 313 contained in the user registration information 310. The process corresponds to the process at Step S27 of FIG. 7.

Thereafter, the local communication apparatus 11 or 31 which acquired the service providing packet requests registration of the communication source global address port information by the process at Step S180 of FIG. 15.

Reverting to FIG. 18, at Step S193 the user registration information management processing unit 155 controls the communication unit 174 to determine whether the request for registration of the communication source global address port information has been acquired.

If it is determined that the request has been acquired, at Step S194 the user registration information management processing unit 155 updates the communication source global address port information of the user registration information corresponding to the user which requested the registration of the communication source global address information, at Step S195, based on the instruction registered in the communication destination global address port information 313 of the user registration information of the user, acquires the user registration information of the communication destination from the user registration information database 177, and at Step S196 supplies the communication information of the communication destination. These processes correspond to Steps S30 and S31 of FIG. 9.

At Step S197, the user registration information management processing unit 155 determines whether the information providing process is to be terminated. If it is determined that the information providing process is not to be terminated, the process returns to Step S191 to repeat the succeeding processes. If it is determined at Step S197 that the information providing process is to be terminated, at Step S198 the user registration information management processing unit 155 executes an end process to terminate the information providing process.

If it is determined at Step S193 that the request for registration of the communication source global address port information has not been acquired, the user registration information management processing unit 155 proceeds to Step S199 whereat an error process is executed to thereafter return to the process at Step S197 to repeat the succeeding processes.

The user service providing apparatus 41 also executes an information providing process similar to that described above for the communication information acquiring process of the local communication apparatus 31, and manages the global address port information in response to a request from the local communication apparatus 31.

As described above, the user service providing apparatus 41 manages the global address port information necessary for communications between local communication apparatuses, and supplies the information in response to a request from the local communication apparatus 11 or 31. Accordingly, the local communication apparatus 11 or 31 can conduct communication easily even via the relay apparatus performing NAPT translation.

Next, with reference to the flow chart of FIG. 20, a description will be made of an example of an information providing process by the apparatus service providing apparatus 51 to be executed in correspondence with the communication information acquiring process by the local communication apparatus described with reference to the flow chart of FIG. 15. The description will be made when necessary with reference to FIGS. 21 and 22.

At Step S211, the address port information provision processing unit 204 of the apparatus service providing apparatus 51 controls the communication unit 224 to determine whether the service request packet supplied from the local communication apparatus 11 or 31 in the process at Step S175 of FIG. 15 has been acquired, and stands by until it is determined that the packet has been acquired.

Figure 21:
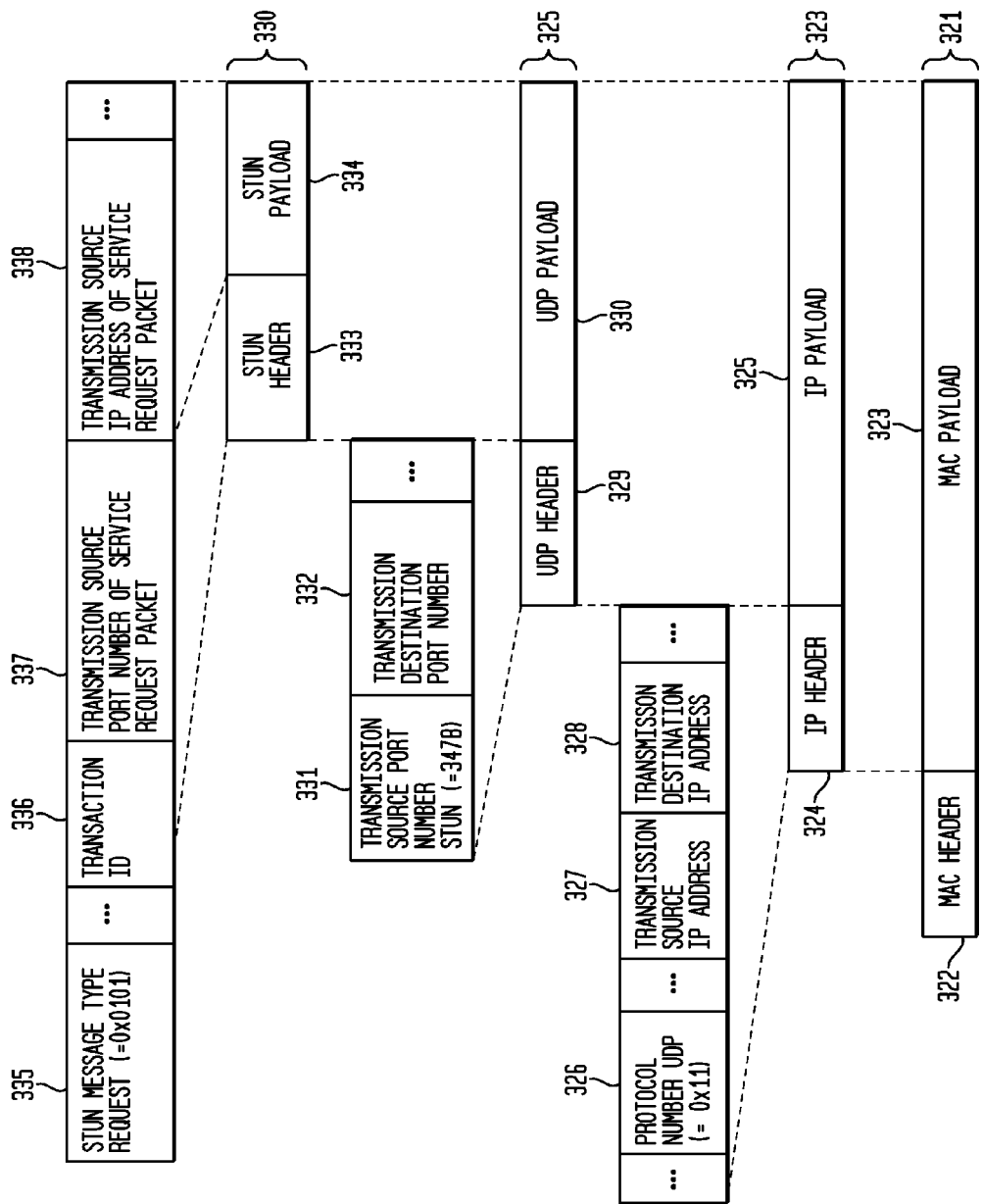
FIG. 21 is a schematic diagram showing an example of the structure of a service providing packet.

If it is determined that the service request packet has been acquired, the address port information provision processing unit 204 proceeds the process to Step S212 whereat it generates a service providing packet, such as shown in FIG. 21.

Referring to FIG. 21, the service providing packet 321 consists of a MAC packet for communication at the data link layer. The service providing packet 321 consists of a MAC header 322 and a MAC payload 323.

The MAC payload 323 consists of an IP packet for communication at the network layer and includes an IP header 324 and an IP payload 325. The IP header 324 includes a protocol number 326, a transmission source IP address 327 and a transmission destination IP address 328. The protocol number is an identifier indicating that the service providing packet 321 is a packet corresponding to the service provided by the apparatus service providing apparatus 51. The transmission source IP address is data representative of an IP address (in this case, the global address of the apparatus service providing apparatus 51) of the transmission source of the service providing packet. The transmission destination IP address is data representative of an IP address (in this case, the global address of the relay apparatus 12 or 32) of the transmission destination of the service providing packet.

The IP payload 325 consists of a UDP packet for communication at the transport layer, and includes a UDP header 329 and a UDP payload 330. The UDP header 329 includes a transmission source port number 331 and a transmission destination port number 332. The transmission source port number is data representative of the port number of the transmission source (i.e., the port number of the apparatus service providing apparatus 51) used when the service providing packet is transmitted, and an identifier indicating that the service providing packet 321 is a packet corresponding to the services provided by the service providing apparatus 51. The transmission destination port number is data representative of the port number of the transmission destination (i.e., the port number of the relay apparatus 12) of the service providing packet 321.

The UDP payload 330 consists of a STUN packet for communication using a STUN protocol, and includes a STUN header 333 and a STUN payload 334. The STUN header 333 includes a STUN message type 335 and a transaction ID 336. The STUN message type is an identifier indicating that this packet contains a request based upon the STUN protocol and that the service providing packet 321 is a packet corresponding to the service provided by the apparatus service providing apparatus 51. The transaction ID is used for identifying a transaction.

The STUN payload 334 contains a transmission source port number 337 of the service request packet and a transmission source IP address 338 of the service request packet As described above, the transmission source IP address 338 and transmission source port number 337 contained in the service request packet 281 acquired by the apparatus service providing apparatus 51 indicate the global address and port number, respectively, of the relay apparatus 12.

Therefore, the transmission source port number 337 of the service request packet indicates the global port number of the relay apparatus 12, and the transmission source IP address 338 indicates the global address of the relay apparatus 12.

The apparatus service providing apparatus 51 acquires the global address port information of the relay apparatus 12 (corresponding to the local communication apparatus 11) from the service request packet, and generates the service providing packet which contains the acquired global address port information.

Figure 20:
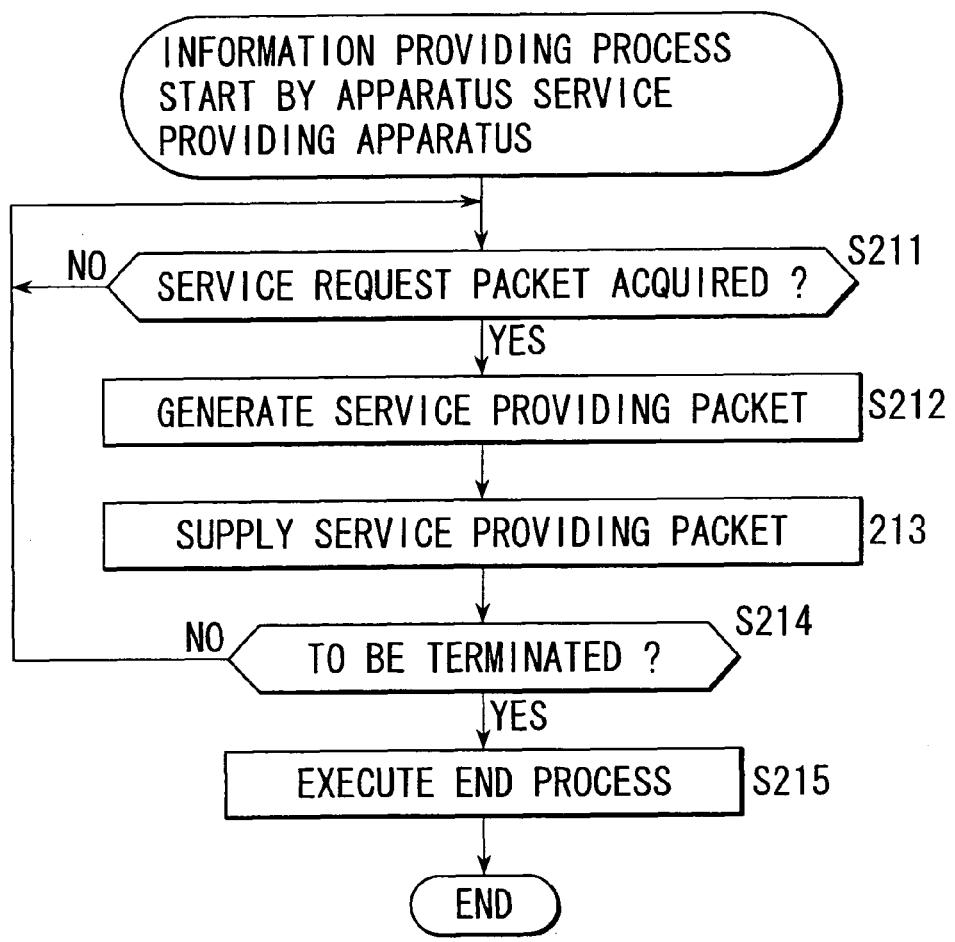
FIG. 20 is a flow chart illustrating an information providing process by the apparatus service providing apparatus shown in FIG. 1.

Reverting to FIG. 20, at Step S213 the apparatus service providing apparatus 51 supplies the generated service providing packet to the requesting local communication source apparatus 11 via the network 21. This process corresponds to the process at Step S63 of FIG. 8.

At Step S214 the apparatus service providing apparatus 51 determines whether the information providing process is to be terminated. If it is determined that the information providing process is not to be terminated, the process returns to Step S211 to repeat the succeeding processes.

If it is determined that the information providing process is to be terminated, the apparatus service providing apparatus 51 proceeds to Step S215 to execute an end process and terminate the information providing process.

The apparatus service providing apparatus 52 executes an information providing process similar to that for the apparatus service providing apparatus 51. Therefore, for the details of the information providing process by the apparatus service providing apparatus 52, the flow chart of FIG. 20 can be adopted, and for the structure of the service providing packet provided by the information providing process, FIG. 21 can be adopted, and so the descriptions thereof are omitted.

The apparatus service providing apparatuses 51 and 52 execute an information providing process similar to that described above for the communication information acquiring process of the local communication apparatus 31, and supplies the service providing packet in response to a request from the local communication apparatus 31.

As described above, the local communication apparatus 11 or 31 acquires the service providing packets from the apparatus service providing apparatuses 51 and 52 and predicts (estimates) the global address port information for the next communication.

Figure 22:
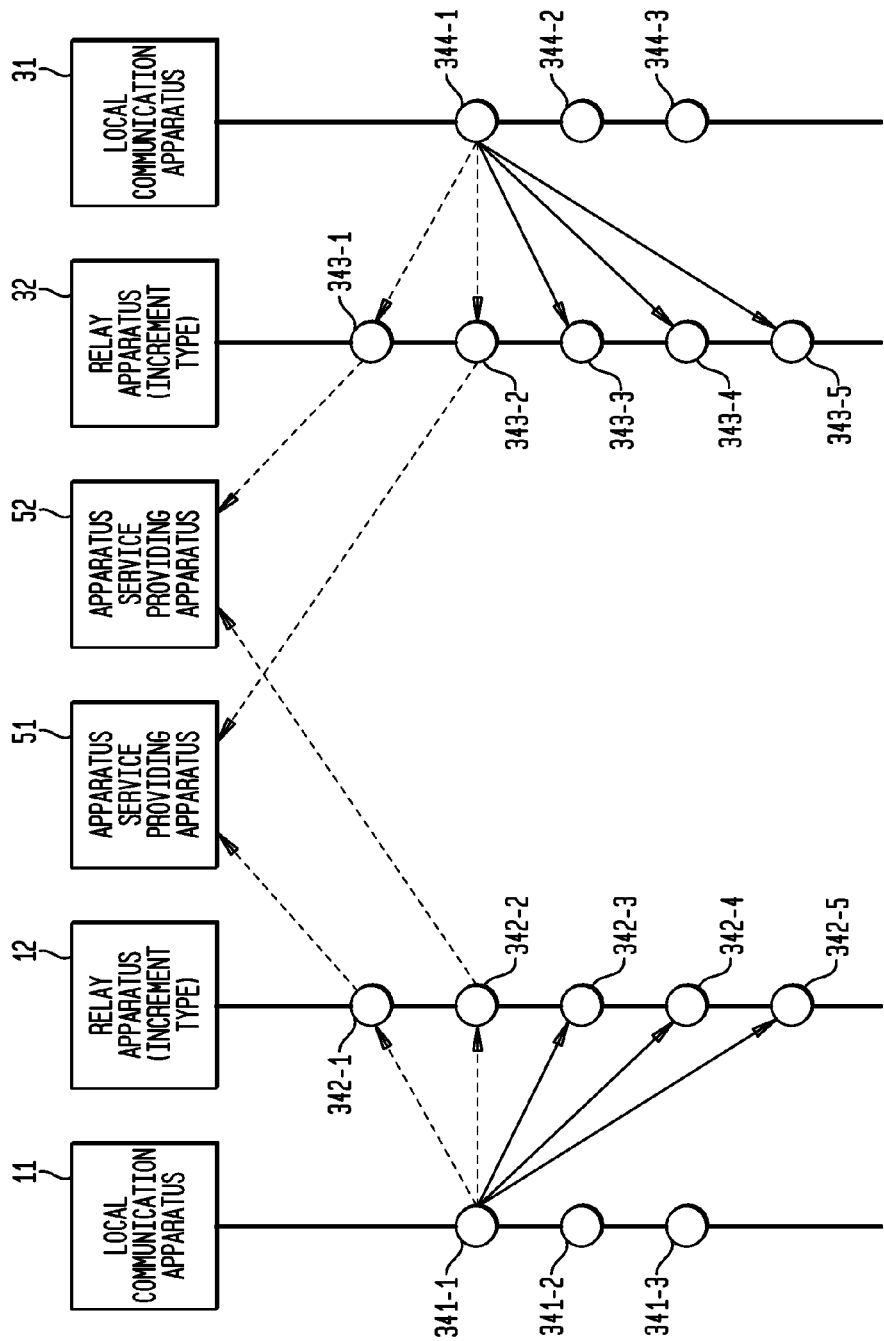
FIG. 22 is a diagram illustrating a transfer state of open request packets among local communication apparatuses shown in FIG. 1.

For example, as shown in FIG. 22, it is assumed that the relay apparatus 12 is of the increment type that each time the address port information of the communication destination of the local communication apparatus 11 changes, the relay apparatus 12 increases by 1 (increments) the port number corresponding to the local communication apparatus 11, and that the relay apparatus 32 is also of the increment type.

The local communication apparatus 11 supplies a service request packet first to the apparatus service providing apparatus 51. At this time, the relay apparatus 12 NAPT-translates the communication source address port information of the service request packet using a port 342-1. The apparatus service providing apparatus 51 supplies the service providing packet for the service request packet to the local communication apparatus 11 via the port 342-1 of the relay apparatus 12.

Next, the local communication apparatus 11 supplies a service request packet to the apparatus service providing apparatus 52. At this time, the relay apparatus 12 NAPT-translates the communication source address port information of the service request packet using a port 342-2 by increasing the port number by 1, because the address port information of the apparatus service providing apparatus 51 is different from the address port information of the apparatus service providing apparatus 52. The apparatus service providing apparatus 52 supplies the service providing packet for the service request packet to the local communication apparatus 11 via the port 342-2 of the relay apparatus 12.

The local communication apparatus 11 acquires the global address information from the acquired service providing packets, and calculates a difference value between two pieces of the global address information, i.e., calculates a change amount in the port numbers used by the relay apparatus 12. In this example, the difference value is "1".

The local communication apparatus 11 adds a value "1" to the port number of the port 342-2 used for later communication with the apparatus service providing apparatus 52, and predicts (estimates) that the port 342-3 is the port to be used by the relay apparatus 12 for the next communication.

For example, if the difference value is "2", the local communication apparatus 11 adds the value "2" to the port number of the port 342-2 used for later communication with the apparatus service providing apparatus 52, and predicts (estimates) that the port 342-4 is the port to be used by the relay apparatus 12 for the next communication, and if the difference value is "3", the local communication apparatus 11 adds the value "3" to the port number of the port 342-2 used for later communication with the apparatus service providing apparatus 52, and predicts (estimates) that the port 342-5 is the port to be used by the relay apparatus 12 for the next communication.

If the difference value is "0", the same port (e.g., port 342-1) is used for communications with both the apparatus service providing apparatus 51 and the apparatus service providing apparatus 52, and the local communication apparatus 11 predicts (estimates) that the same port (e.g., 342-1) is also to be used for the next communication.

Similarly, the local communication apparatus 31 acquires the global address port information for the next communication from the two service providing packets supplied from the apparatus service providing apparatuses 51 and 52.

In the above manner, the apparatus service providing apparatuses 51 and 52 generate service providing packets each containing the global address and port number of the relay apparatus 12, and supply them to the local communication apparatus 11. The local communication apparatus 11 can therefore predict and (estimate) the global address port information of the relay apparatus 12 for the next communication, and can readily supply this information to the user service providing apparatus 41.

Figure 10:
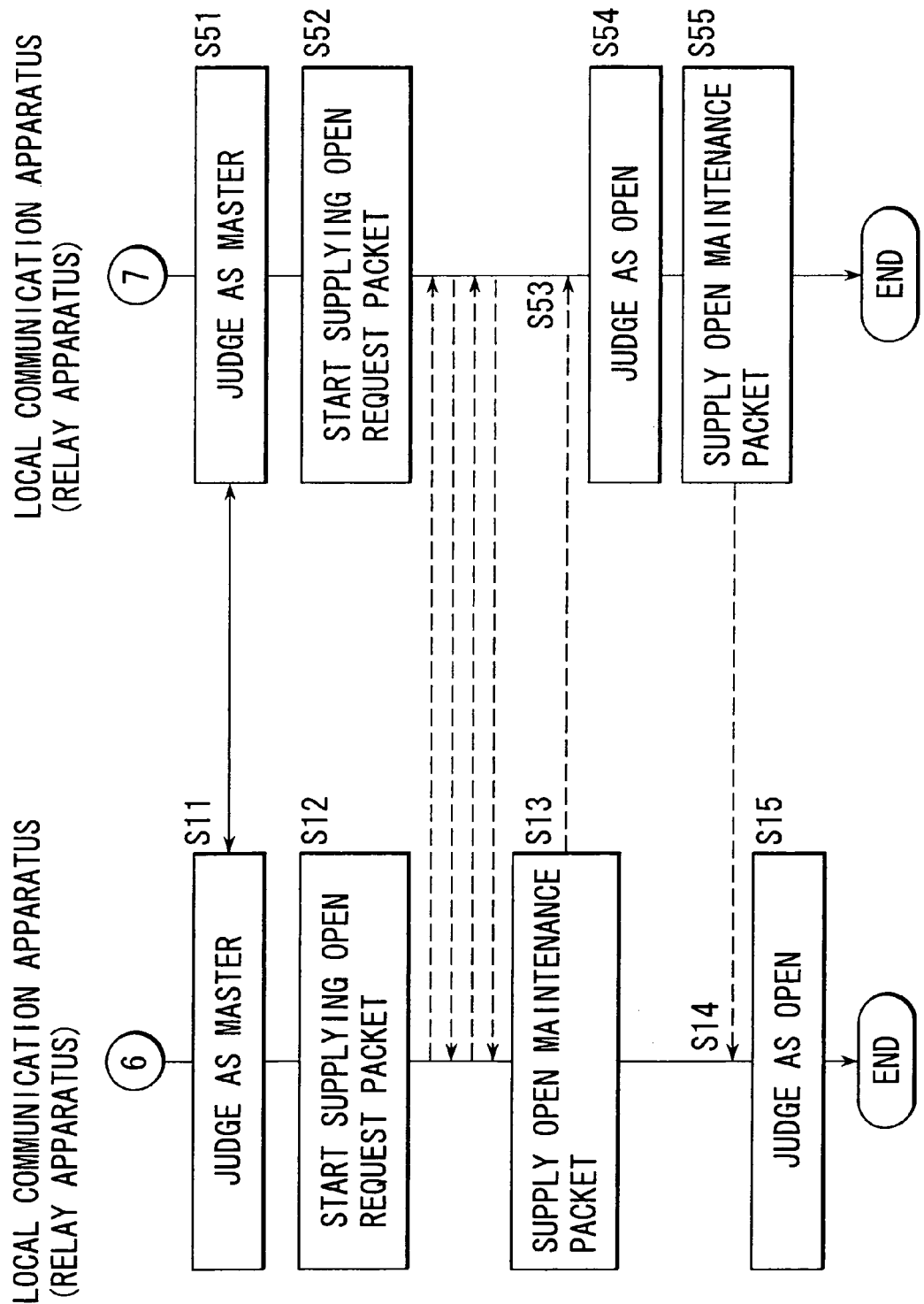
FIG. 10 is a flow chart illustrating the communication contents among apparatuses in the network system shown in FIG. 1, following the flow chart shown in FIG. 9.

Reverting to FIG. 9, the local communication apparatus 11 having completed the process at Step S10 proceeds to Step S11 of FIG. 10 to execute a master/slave judgment process of determining whether the local communication apparatus 11 has a master roll taking the initiative in communication with the local communication apparatus 31 or has a slave roll passing the initiative in communication to the communication partner. Similarly, the local communication apparatus 31 also executes the master/slave judgment process at Step S51 of FIG. 10.

For example, numerals at respective digits of the IP address (preferable global address) of each of the local communication apparatuses 11 and 31 are added together, and the local communication apparatus having a larger value is used as the master, and the apparatus having a smaller value is used as the slave. It is obvious that the master and slave may be determined by other methods.

In the following description, although it is assumed that the local communication apparatus 11 is the master and the local communication apparatus 31 is the slave, the master may be either one of the local communication apparatuses 11 and 31.

The local communication apparatus 11 determined to be the master executes a communication start algorithm for requesting a communication start, in order to connect the local communication apparatus 31. Namely, the local communication apparatus 11 proceeds with the process to Step S12 to start supplying a plurality of open request packets. Similarly, the local communication apparatus 31 determined to be the slave proceeds to Step S52 to start supplying a plurality of open request packets.

As the open request packets are supplied, the address port information of the relay apparatus 32 on the communication partner side, capable of communicating with the local communication apparatus 31, is identified. Then, the local communication apparatus 11 as the master proceeds to Step S13 to supply an open maintenance packet to the local communication apparatus 31 using the identified address port information.

At Step S53, after the local communication apparatus 31 as the slave acquires the open maintenance packet from the local communication apparatus 11, the local communication apparatus 31 proceeds to Step S54 whereat it is determined that the communication with the local communication apparatus 11 has become open, and at Step S55 the open maintenance packet is supplied to the local communication apparatus 11.

As the local communication apparatus 11 acquires the open maintenance packet supplied from the local communication apparatus 31 at Step S14, it is determined at Step S15 that the communication with the local communication apparatus 31 has become open.

In the above communications, the local communication apparatuses 11 and 31 process transmission/reception packets based on the UDP/IP protocol system using STUN, RTP, RTCP or the like.

In the above processes, in the communication start request algorithm for requesting a communication start, the local communication apparatus 11 executes a communication start request process to be described below to determine the port number of the transmission source (local communication apparatus 11) and the port number of the transmission destination (relay apparatus 32) to generate the open request packet.

With reference to the flow chart of FIG. 23, a description will be made of an example of the communication start request process by the local communication apparatus 11. The description will be made when necessary with reference to FIGS. 24 and 25.

In the following, the variable numSrcPriPort is the number of private ports used for transmitting from the local communication apparatus the open request packet for requesting a communication start with the communication partner, and the variable numDstGloPort is the number of global ports designated as the transmission destination of the open request packet, among the ports of the relay apparatus on the communication partner side.

The variable timeSendInterval is the interval of transmission of each packet from the local communication apparatus, and the variable is MasterFlag indicates whether the local communication apparatus is the master (slave).

At Step S231, the inter-local communication control unit 66 of the local communication apparatus 11 substitutes a value "0" in variables i and j. At Step S232, the inter-local communication control unit 66 retains as the variable Base-Glo-port the value of a variable Glo-port representative of the global port number of the relay apparatus 32 on the transmission destination side, and retains as the variable Base-Pri-port a variable Pri-port representative of the private port number of the local communication apparatus 11 of the transmission source.

Used as the initial value of the variable Glo-port is the port number of the communication destination global address information contained in the communication destination communication information acquired at Step S181 of FIG. 15. The initial value of the variable Glo-port may be a value different from this initial port number calculated in a predetermined manner by using the initial port number.

As the process proceeds to Step S233, the inter-local communication control unit 66 determines whether the value of the variable i is smaller than the variable numSrcPriPort. If it is determined that all predetermined ports of the local communication apparatus 11 are not processed and the value of the variable i is smaller than the variable numSrcPriPort, the inter-local communication control unit 66 proceeds to Step S234 whereat the value of the variable i is added to the value of the variable Base-Pri-port and this addition result is substituted in the variable Pri-port.

At Step S235 the inter-local communication control unit 66 determines whether the value of the variable j is smaller than the variable numDstGloPort. If it is determined to be smaller, at Step S236 the value of the variable j is added to the variable Base-Glo-port and this addition result is substituted in the variable Glo-port.

At Step S237 the inter-local communication control unit 66 generates the open request packet by using the value of the variable Pri-port as the port number of the transmission source and the value of the variable Glo-port as the port number of the transmission destination, and controls the communication unit 84 to supply the generated open request packet to the relay apparatus 32 via the relay apparatus 12.

The inter-local communication control unit 66 proceeds to Step S238 whereat it stands by for a predetermined time timeSendInterval and then proceeds to Step S239.

At Step S239 the inter-local communication control unit 66 substitutes a value (j+1) in the variable j, and at Step S240 determines whether a termination request of the open request packet has been output. If it is determined that the termination request has been output, the communication request process is terminated.

If it is determined at Step S233 that the value of the variable i is not smaller than the variable numSrcPriPort, the inter-local communication control unit 66 terminates the communication start request process.

If it is determined at Step S235 that the value of the variable j is not smaller than the variable numDstGloPort, the inter-local communication control unit 66 proceeds to Step S241 whereat the value "0" is substituted in the variable j, and at Step S242 a value (i+1) is substituted in the variable i, and thereafter the process is returned to Step S233 to repeat the succeeding processes.

If it is determined at Step S240 that a termination request of the open request packet has not been output, the inter-local communication control unit 66 returns the process to Step S235 to repeat the succeeding processes.

As described above, the inter-local communication control unit 66 executes the communication start request algorithm, determines the port numbers of the transmission source and destination, and generates and supplies (numSrcPriPort× numDstGloPort) open request packets.

Figure 24:
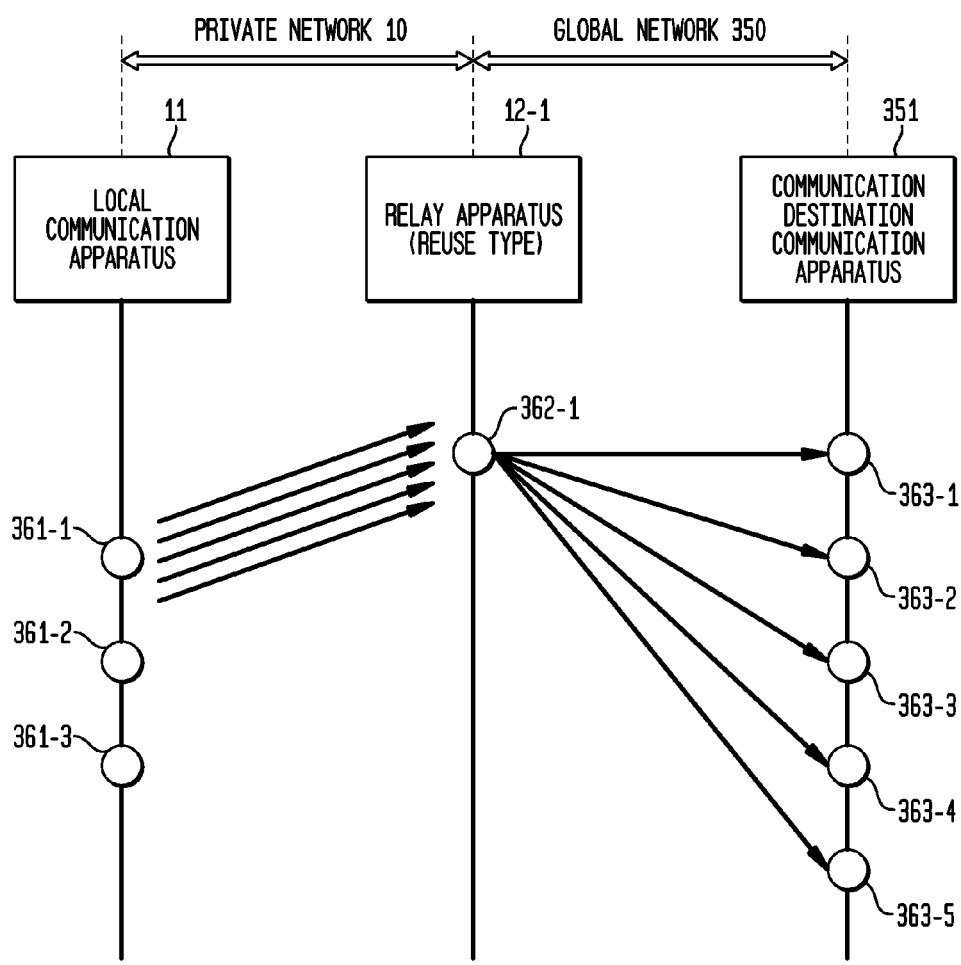
FIG. 24 is a diagram illustrating a NAPT translation state by a reuse type relay apparatus.

For example, as shown in FIG. 24, when the inter-local communication apparatus 11 supplies the packet to a communication destination apparatus 351 via the relay apparatus 12-1 and a global network 350, and if the relay apparatus 12-1 is of the reuse type of relay apparatus which assigns the same port 362-1 to the local communication apparatus 11 even if the communication destination address port information has changed, the communication destination apparatus 351 can communicate with the local communication apparatus 11 by responding to the port 362-1.

Figure 25:
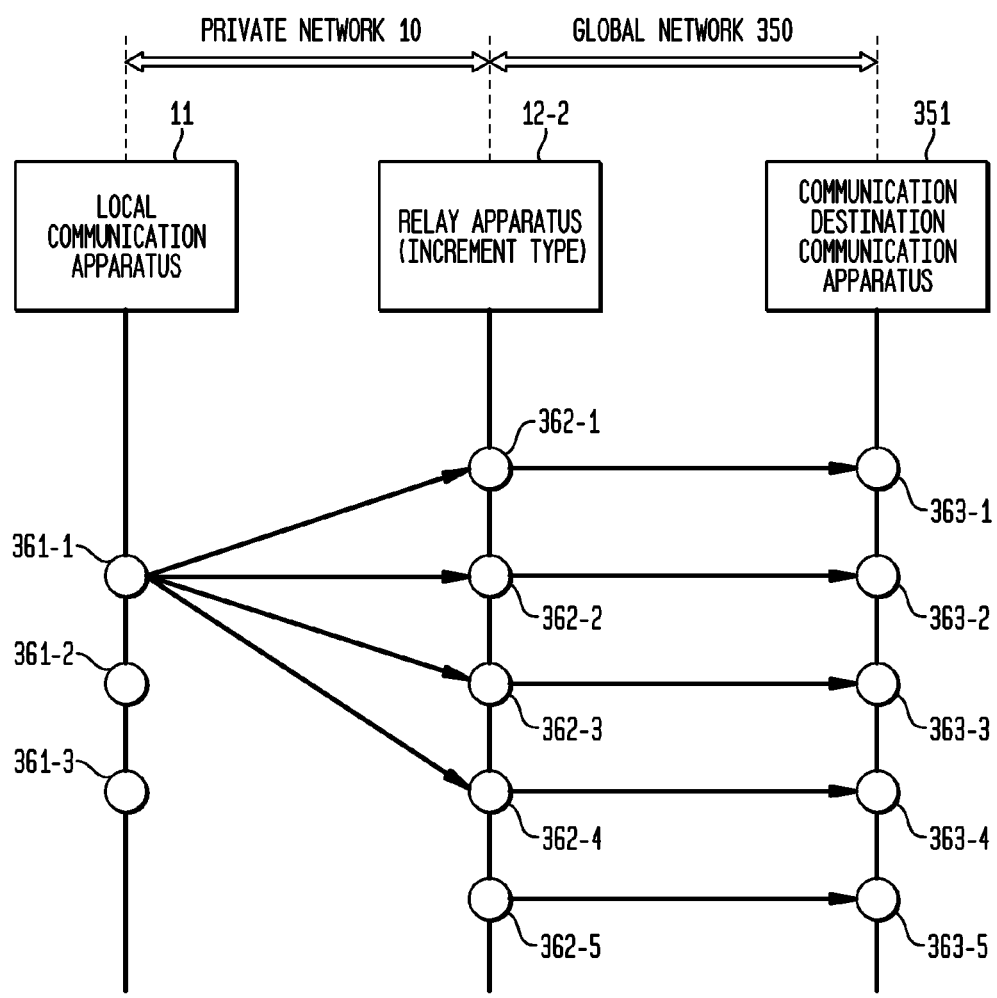
FIG. 25 is a diagram illustrating a NAPT translation state by an increment type relay apparatus.

However, for example, as shown in FIG. 25, if the relay apparatus 12-2 is of the increment type of relay apparatus which assigns a different port each time the communication destination address port information changes (port 363-1 to 363-5), the relay apparatus 12-2 changes use ports (362-1 to 362-5) for the communication destination ports.

In this case, since the communication destination apparatus 351 does not have the information necessary for selecting a port capable of being supplied to the local communication apparatus 11, the port number of the relay apparatus 12 supplying a response cannot be identified.

Namely, in the network system of FIG. 1, the local communication apparatus 11 cannot determine which port of the relay apparatus 32 is accessed in order to communicate with the local communication apparatus 31.

To avoid this, the inter-local communication control unit 66 executes the communication start request algorithm to generate open request packets for a plurality of ports near the global port number of the relay apparatus which are predicted (estimated) as being capable of communications, and controls the communication unit 84 to supply a plurality of generated open request packets to the relay apparatus 32. As described above, the local communication apparatus 31 executes similar processes.

The local communication apparatus 31 as the slave uses the transmission source address port information of the open request packets transmitted from the local communication apparatus 11 and was able to be received, to thereby adjust the transmission destination address port information of the open request packets to be transmitted, in order to allow the local communication apparatus 11 to receive the open request packets.

In this manner, the local communication apparatuses 11 and 31 acquire transmission/reception open request packets so that the port number of the communication destination relay apparatus to be accessed can be identified easily.

The local communication apparatus 11 or 31 identifies the port number of the communication destination to be accessed by using the above-described open request packets, and transmits/receives the open maintenance packet to make the communication open and established, as previously described with reference to FIG. 10.

Figure 26:
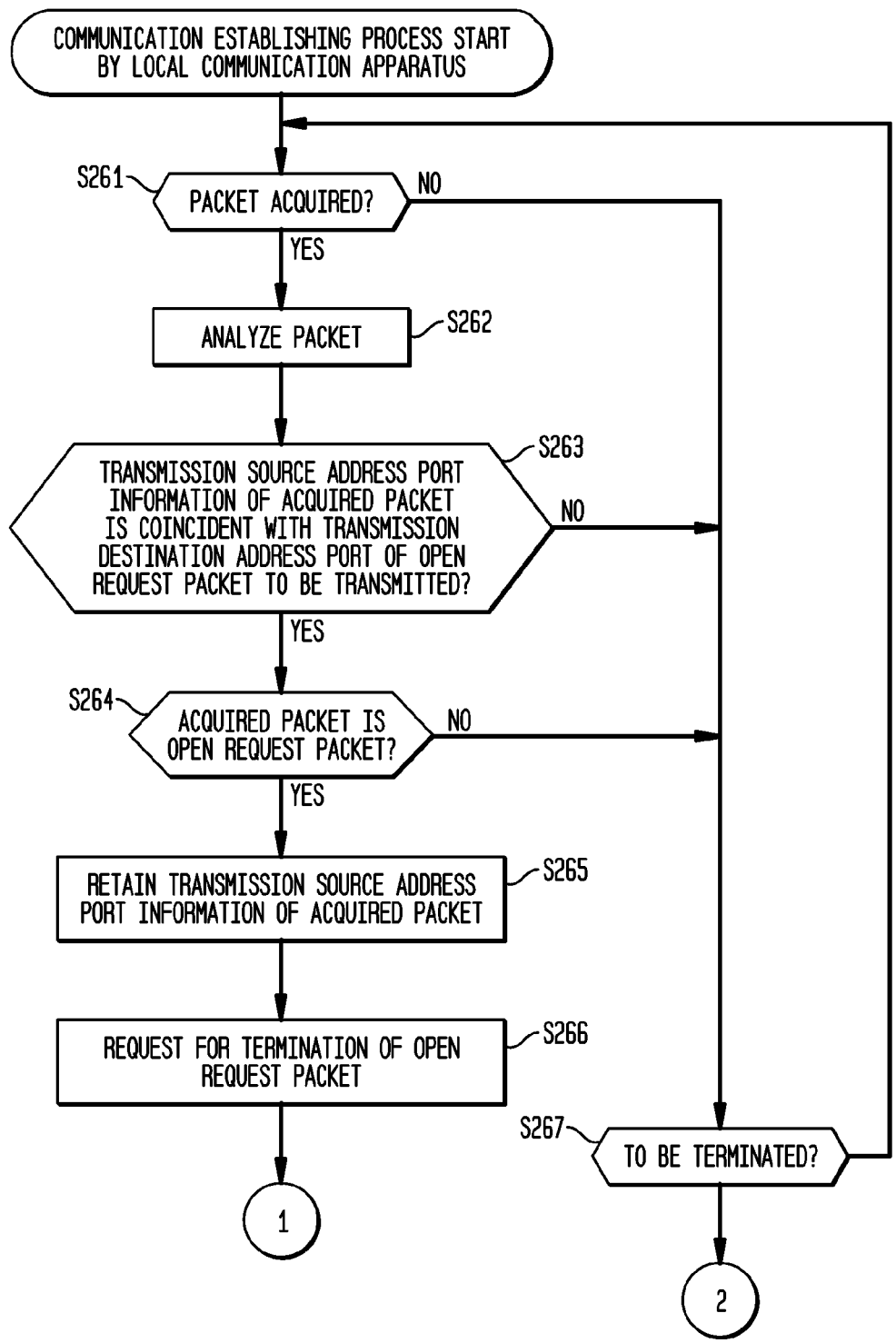
FIG. 26 is a flow chart illustrating an example of a communication establishing process by the local communication apparatus shown in FIG. 1.
Figure 27:
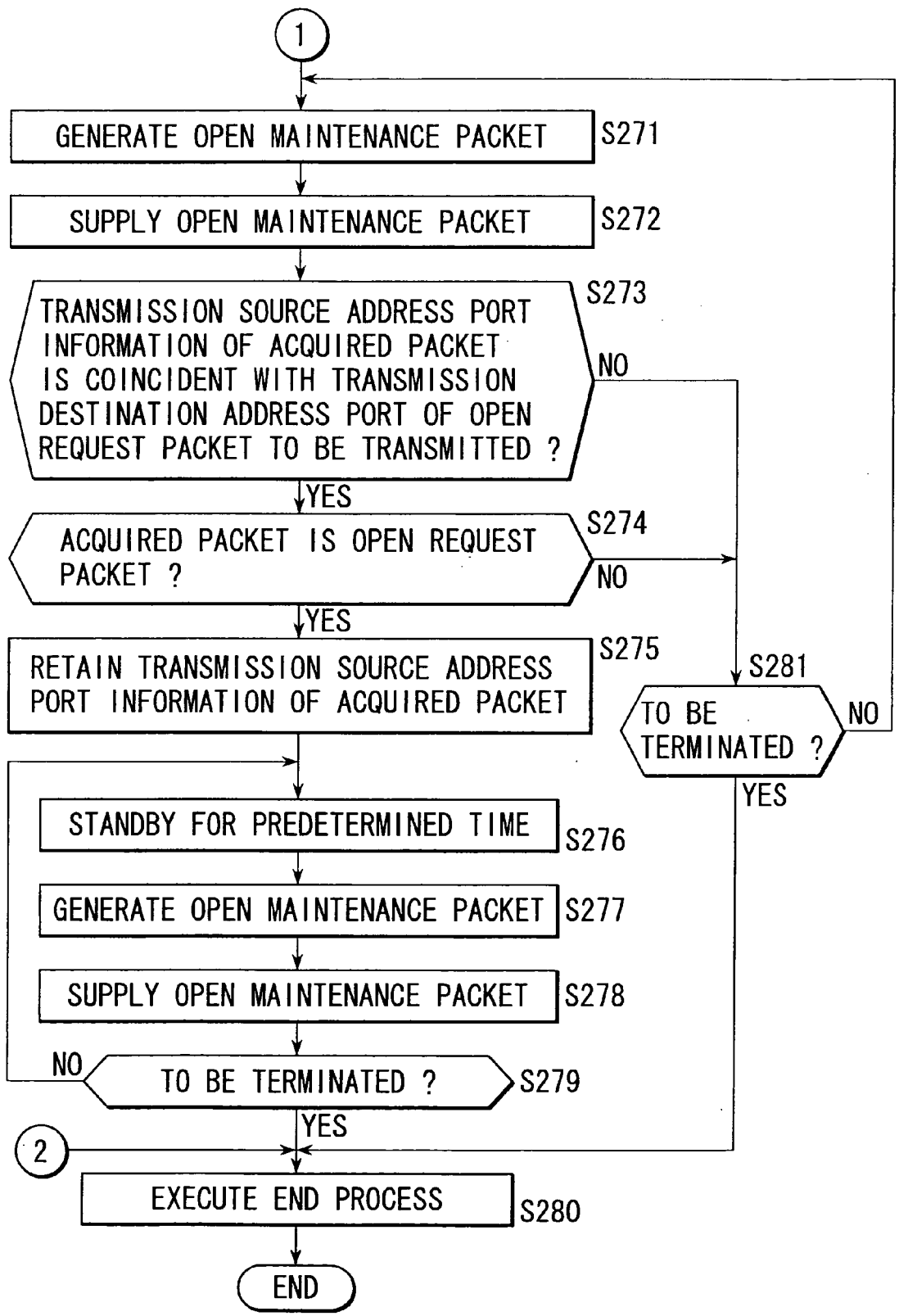
FIG. 27 is a flow chart illustrating an example of the communication establishing process by the local communication apparatus shown in FIG. 1, following the flow chart shown in FIG. 26.

With reference to FIGS. 26 and 27, a description will be made on a communication establishing process to be executed in parallel with the above-described communication start request process when the local communication apparatus 11 is the master.

First, at Step S261 of FIG. 26, the inter-local communication control unit 66 of the local communication apparatus 11 controls the communication unit 84 to determine whether the packet has been acquired from the exterior. If it is determined that the packet has been acquired, at Step S262 the inter-local communication control unit 66 analyzes the acquired packet and at Step S263 determines whether the transmission source address port information of the acquired packet coincides with the transmission destination address port information of the open request packet transmitted from the local communication apparatus 11.

If it is determined that the transmission source address port information of the acquired packet coincides with the transmission destination address port information of the open request packet, the inter-local communication control unit 66 proceeds to Step S264 whereat the identification information of the acquired packet is checked to determine whether the acquired packet is the open request packet.

If it is determined that the acquired packet is the open request packet, at Step S265 the inter-local communication control unit 66 retains the transmission source address port information of the acquired packet and at Step S266 requests termination of the open request packet to the above-described communication open request process.

The inter-local communication control unit 66 which requested termination of the open request packet proceeds to Step S271 of FIG. 27 whereat it generates the open maintenance packet, and at Step S272 supplies the generated open maintenance packet to the communication partner local communication apparatus 31 via the relay apparatus 12.

As described with reference to FIG. 10, when the open request packet or open maintenance packet is acquired from the local communication apparatus 11, the local communication apparatus 31 supplies the open maintenance packet to the local communication apparatus 11.

When the inter-local communication control unit 66 of the local communication apparatus 11 acquires the packet via the communication unit 84, at Step S273 the inter-local communication control unit 66 determines whether the transmission source address port information of the acquired packet coincides with the transmission destination address port information of the open maintenance packet transmitted from the local communication apparatus 11.

If it is determined that the transmission source address port information of the acquired packet coincides with the transmission destination address port information of the open maintenance packet, the inter-local communication control unit 66 proceeds to Step S274 to check the identifier contained in the acquired packet and determine whether the acquired packet is the open maintenance packet.

If it is determined that the acquired packet is the open maintenance packet, the inter-local communication control unit 66 proceeds to Step S275 whereat the transmission source address port information of the acquired packet is retained, at Step S276 it stands by for a predetermined time, and thereafter at Step S277 it generates the open maintenance packet, and supplies the generated open maintenance packet at Step S278.

Namely, the inter-local communication control unit 66 executes the processes of Steps S273 and S274 to determine whether the communication with the local communication apparatus 31 has become open. It is determined at Step S273 whether the transmission source address port information of the acquired packet coincides with the transmission destination address port information of the open maintenance packet, and if it is determined at Step S274 that the acquired packet is the open maintenance packet, the inter-local communication control unit 66 determines that communication with the local communication apparatus 31 has become open, and supplies the open maintenance packet to the local communication apparatus 31 by the process at Step S275 and succeeding processes.

At Step S279 the inter-local communication control unit 66 determines whether the communication establishing process is to be terminated. If it is determined that the process is not to be terminated, the process returns to Step S276 to repeat the succeeding processes. If it is determined at Step S279 that the communication establishing process is to be terminated, at Step S280 the inter-local communication control unit 66 executes a predetermined end process to terminate the communication establishing process.

If it is determined at Step S261 of FIG. 26 that the packet has not been acquired, if it is determined at Step S263 that the transmission source address port information of the acquired packet does not coincide with the transmission destination address port information of the open request packet, or if it is determined at Step S264 that the acquired packet is not the open request packet, then the inter-local communication control unit 66 proceeds to Step S267 whereat it is determined whether the communication establishing process is to be terminated. If it is determined that the process is not to be terminated, the process returns to Step S261 to repeat the succeeding processes.

If it is determined at Step S267 that the communication establishing process is to be terminated, the inter-local communication control unit 66 proceeds to Step S280 of FIG. 27 whereat the end process is executed to terminate the communication establishing process.

If it is determined at Step S273 of FIG. 27 that the transmission source address port information of the acquired packet does not coincide with the transmission destination address port information of the open maintenance packet, or if it is determined at Step S274 that the acquired packet is not the open maintenance packet, the inter-local communication control unit 66 proceeds to Step S281 whereat it is determined whether the communication establishing process is to be terminated. If it is determined that the process is not to be terminated, the process returns to Step S271 to repeat the succeeding processes.

If it is determined at Step S281 that the communication establishing process is to be terminated, the inter-local communication control unit 66 proceeds to Step S280 whereat the end process is executed to terminate the communication establishing process.

Next, with reference to the flow charts of FIGS. 28 and 29, a description will be made on the communication establishing process by the local communication apparatus 11 as the slave.

Figure 28:
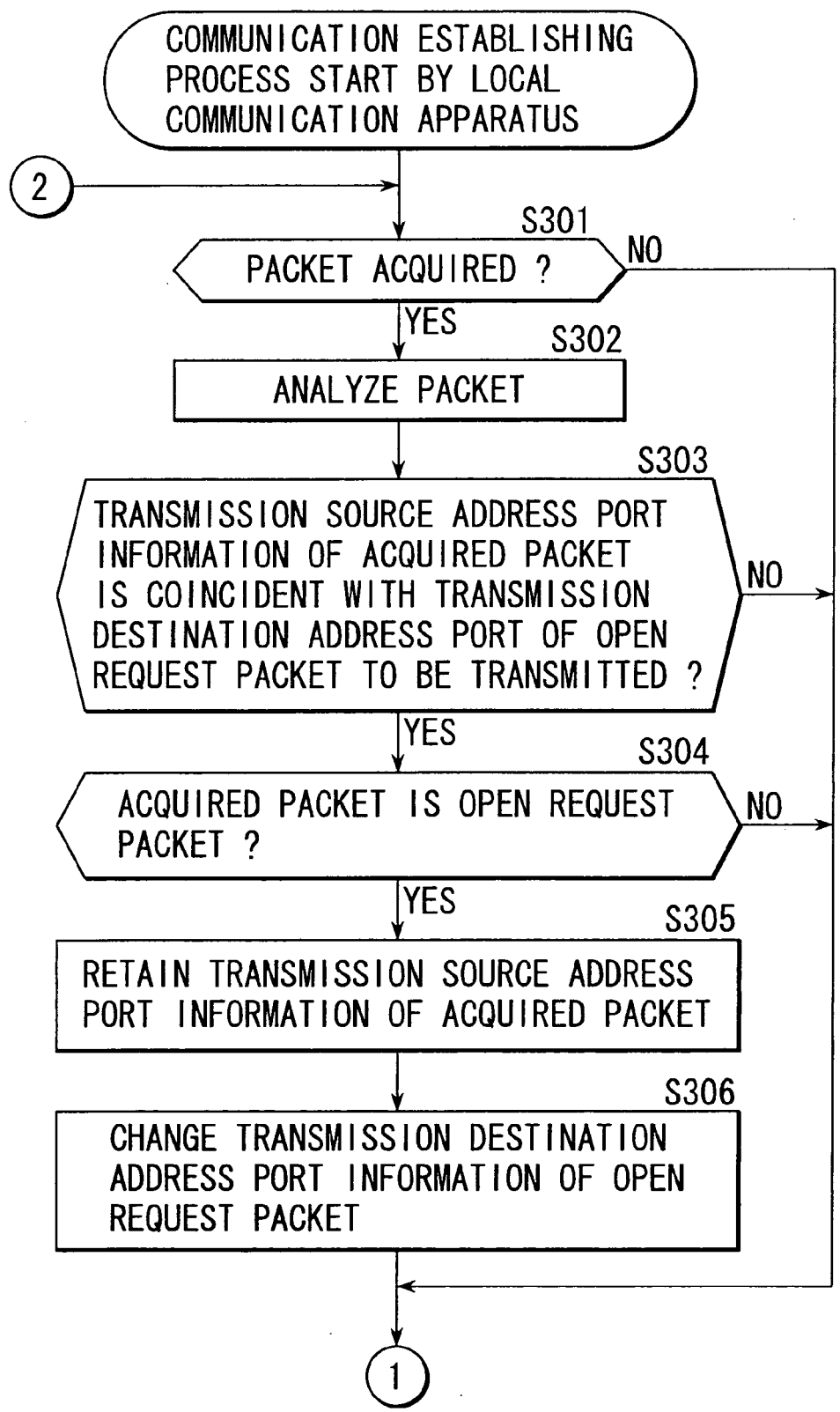
FIG. 28 is a flow chart illustrating another example of the communication establishing process by the local communication apparatus shown in FIG. 1.

First, at Step S301 of FIG. 28, the inter-local communication control unit 66 of the local communication apparatus 11 controls the communication unit 84 to determine whether the packet has been acquired from the exterior. If it is determined that the packet has been acquired, at Step S302 the inter-local communication control unit 66 analyzes the acquired packet and at Step S303 determines whether the transmission source address port information of the acquired packet coincides with the transmission destination address port information of the open request packet transmitted from the local communication apparatus 11.

If it is determined that the transmission source address port information of the acquired packet coincides with the transmission destination address port information of the open request packet, the inter-local communication control unit 66 proceeds to Step S304 whereat the identification information of the acquired packet is checked to determine whether the acquired packet is the open request packet.

Figure 29:
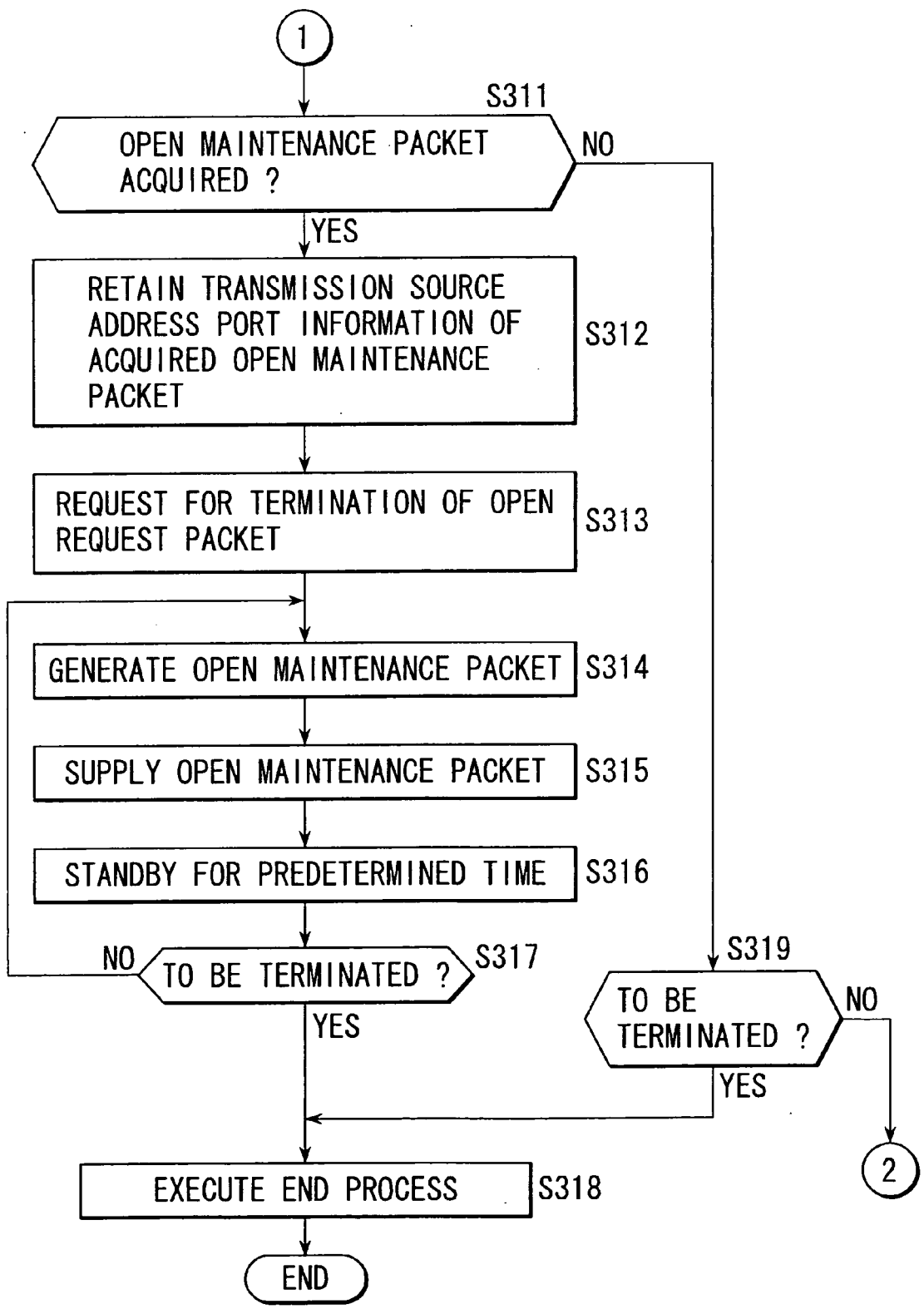
FIG. 29 is a flow chart illustrating another example of the communication establishing process by the local communication apparatus shown in FIG. 1, following the flow chart shown in FIG. 28.

If it is determined that the acquired packet is the open request packet, at Step S305 the inter-local communication control unit 66 retains the transmission source address port information of the acquired packet and at Step S306 changes the transmission destination address port information of the open request packet to be transmitted, and proceeds to Step S311 of FIG. 29 whereat the communication unit 84 is controlled to determine whether the open maintenance packet has been acquired.

If it is determined that the open maintenance packet has been acquired, the inter-local communication control unit 66 determines that communication with the local communication apparatus 31 has become open, at Step S312 retains the communication source address port information of the acquired open maintenance packet, at Step S313 requests termination of the open request packet to the communication start request process, at Step S314 generates the open maintenance packet, at Step S315 supplies the generated open maintenance packet to the communication partner local communication apparatus 31 via the relay apparatus 12, at Step S316 stands by for a predetermined time, and thereafter at Step S317 determines whether the communication establishing process is to be terminated. If it is determined that the process is not to be terminated, the process returns to Step S314 to repeat the succeeding processes.

If it is determined at Step S317 that the communication establishing process is to be terminated, at Step S318 the inter-local communication control unit 66 executes an end process to terminate the communication establishing process.

If it is determined at Step S311 that the open maintenance packet has not been acquired, the inter-local communication control unit 66 proceeds to Step S319 whereat it is determined whether the communication establishing process is to be terminated. If it is determined that the process is not to be terminated, the process returns to Step S301 of FIG. 28 to repeat the succeeding processes.

If it is determined at Step S319 of FIG. 29 that the communication establishing process is to be terminated, the inter-local communication control unit 66 proceeds to Step S318 to terminate the communication establishing process.

Similarly, the local communication apparatus 31 also executes the communication establishing process by referring to the flow charts of FIGS. 26 to 29, and so the description thereof is omitted.

In the above manner, the local communication apparatus 11 supplies the open maintenance packet relative to the address port information identified by the open request packet to thereby establish communications. In this manner, the local communication apparatus 11 or 31 can easily communicate with the communication partner 31 or 11 even if the communications are performed by the relay apparatuses 12 and 32 having the NAPT translation function.

Figure 30:
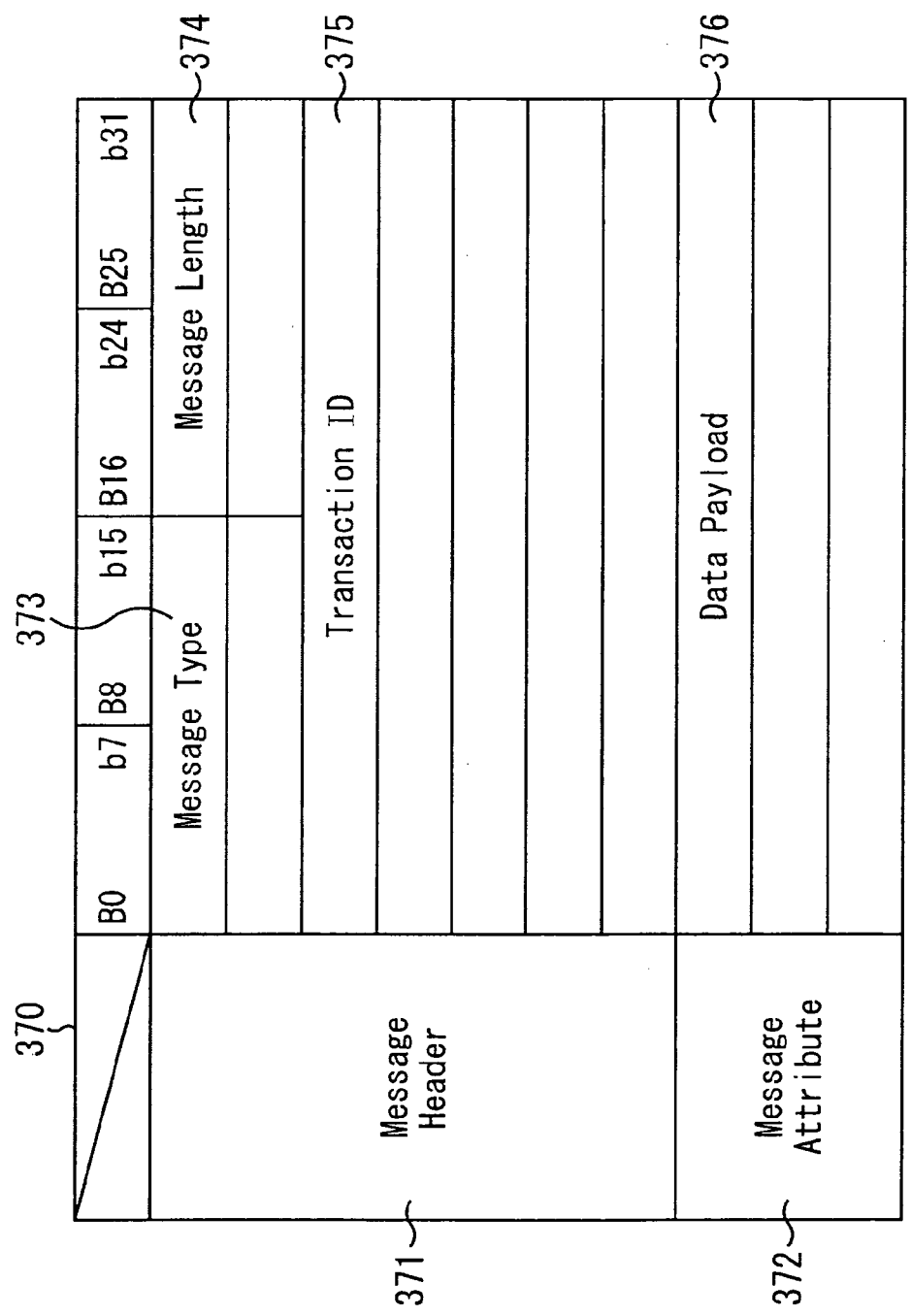
FIG. 30 is a schematic diagram showing an example of the structure of a UDP packet for transferring STUN messages.

As described above, the service request packet, service providing packet, open request packet and open maintenance packet described above exchange various messages, for example, by using STUN messages using the STUN protocol. As shown in FIG. 30, a UDP packet 370 includes a header field (Message Header) 371 and a data field (Message Attribute) 372 and consists of 28 bytes.

The header field 371 consists of a message type 373 of 2 bytes, a message length 374 of 2 bytes and a transaction ID 375 of 16 bytes. The data field 372 consists of a data payload 376 of 8 bytes.

Through transmission/reception of UDP packets of this type, the local communication apparatuses 11 and 31 and apparatus service providing apparatuses 51 and 52 transfer various messages. With reference to the flow chart of FIG. 31, the message to be transferred in the above-described processes will be described. The description will be made when necessary with reference to FIGS. 32 to 36. In the following, since the processes to be executed by the apparatus service providing apparatus 52 are similar to those of the apparatus service providing apparatus 51, the description thereof is omitted.

Figure 31:
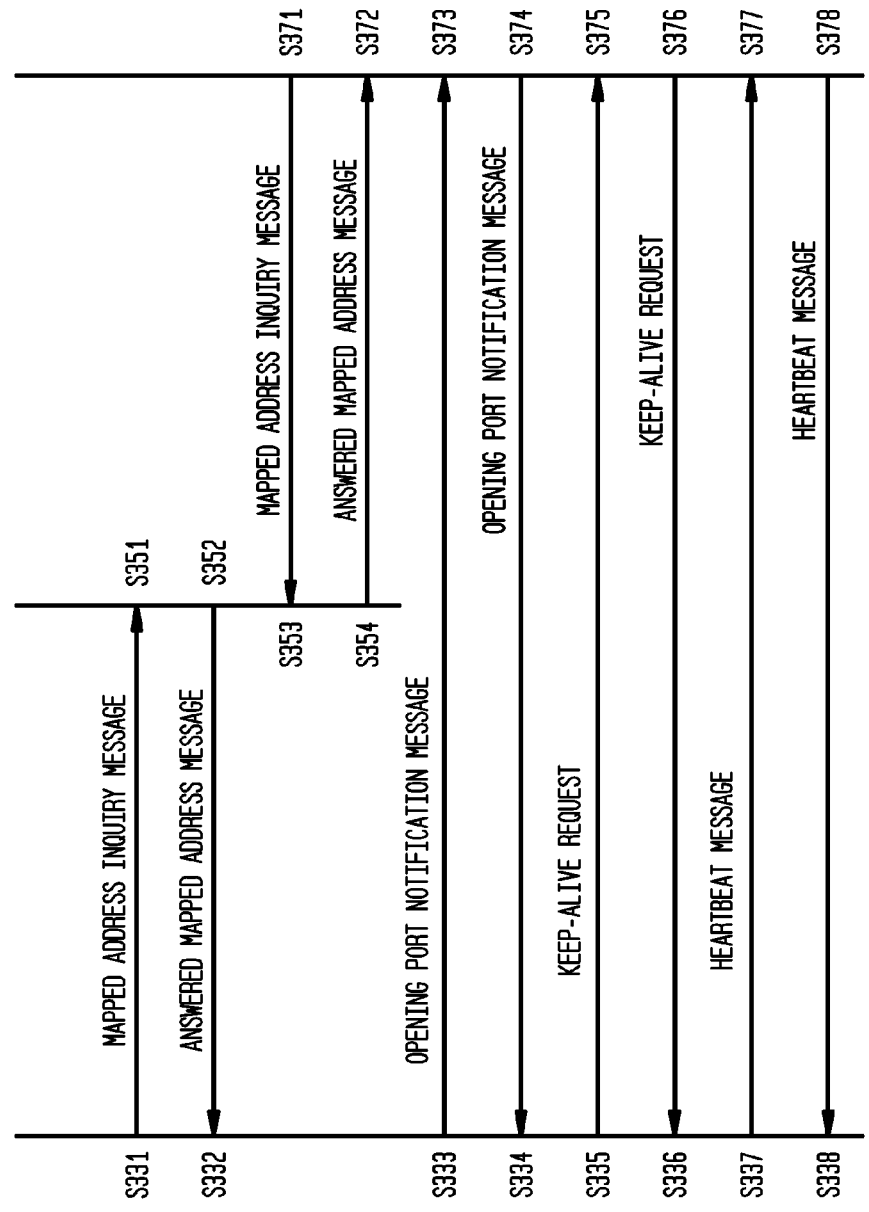
FIG. 31 is a schematic diagram illustrating a STUN message transfer state among apparatuses in the network system shown in FIG. 1.
Figure 32:
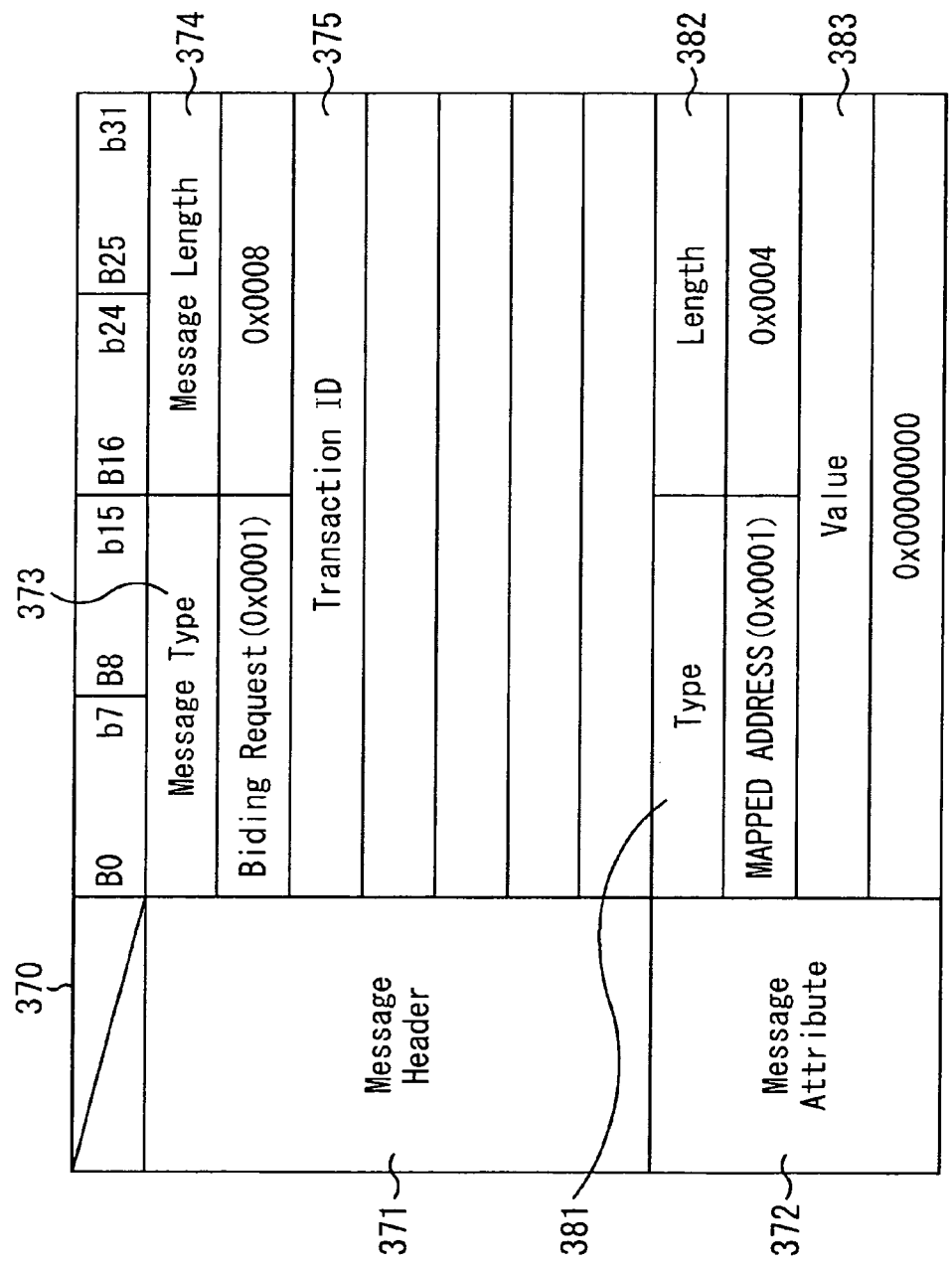
FIG. 32 is a schematic diagram showing an example of the structure of a UDP packet for transferring the STUN message.

At Step S331 of FIG. 31, the local communication apparatus 11 supplies as the service request packet a mapped address inquiry message of the STUN message, such as shown in FIG. 32, to the apparatus service providing apparatus 51. This process corresponds to Step S4 of FIG. 8.

As shown in FIG. 32, the data field 372 of the UDP packet 370 as the service request packet includes a message type 381, a data length 382 and a message value 383. In FIG. 32, the value of the type is "0x0001" representative of a mapped address, the data length 382 indicates that the message is 4 bytes (0x0004) and the message value 383 is "0x00000000".

Figure 33:
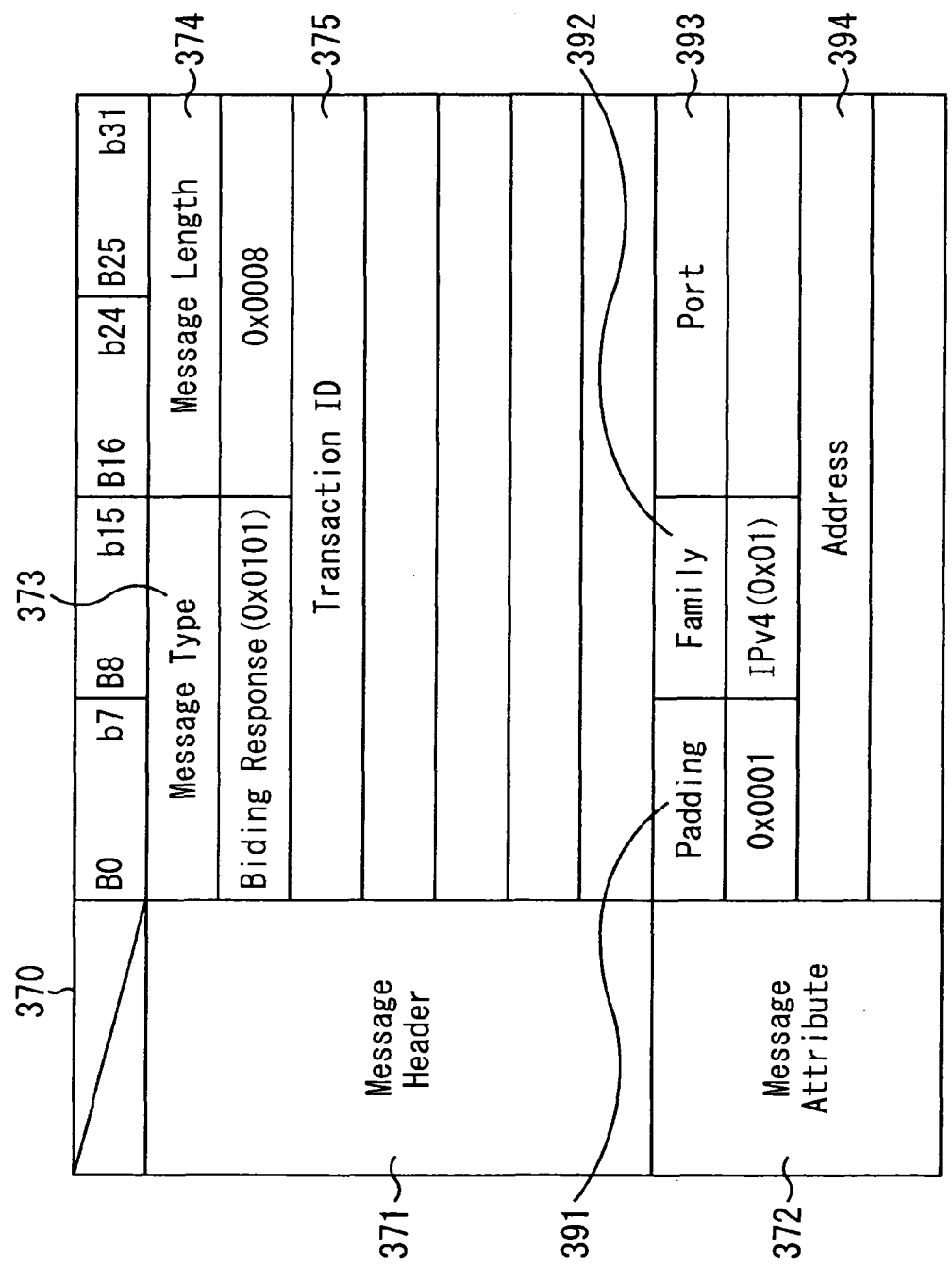
FIG. 33 is a schematic diagram showing another example of the structure of the UDP packet for transferring a STUN message.

Reverting to FIG. 31, as the apparatus service providing apparatus 51 acquires the mapped address inquiry message at Step S351, and supplies an answered mapped address message of the STUN message, such as shown in FIG. 33, to the local communication apparatus 11 at Step S352. These processes correspond to Steps S61 and S63 of FIG. 8.

As shown in FIG. 33, the data field 372 of the UDP packet 370 as the service providing packet providing the address port information of the relay apparatus 12 includes a padding 391, a family 392, a port 393 and an address 394. In FIG. 33, the value of the padding 391 is "0x0001", the family 392 indicates the address port information of "IPv4" (0x01), and the port 393 and address 394 indicate the address port information of the relay apparatus 12.

Reverting to FIG. 31, at Step S332 the local communication apparatus 11 acquires the UDP packet containing the above-described STUN messages.

Similarly, at Step S371 the local communication apparatus 31 supplies the service request packet shown in FIG. 32 to the apparatus service providing apparatus 51. As the apparatus service providing apparatus 51 acquires the service request packet at Step S353, the apparatus service providing apparatus 51 supplies the service providing packet, such as shown in FIG. 33, to the local communication apparatus 31 at Step S354. At Step S372 the local communication apparatus 31 acquires the service providing packet.

Figure 34:
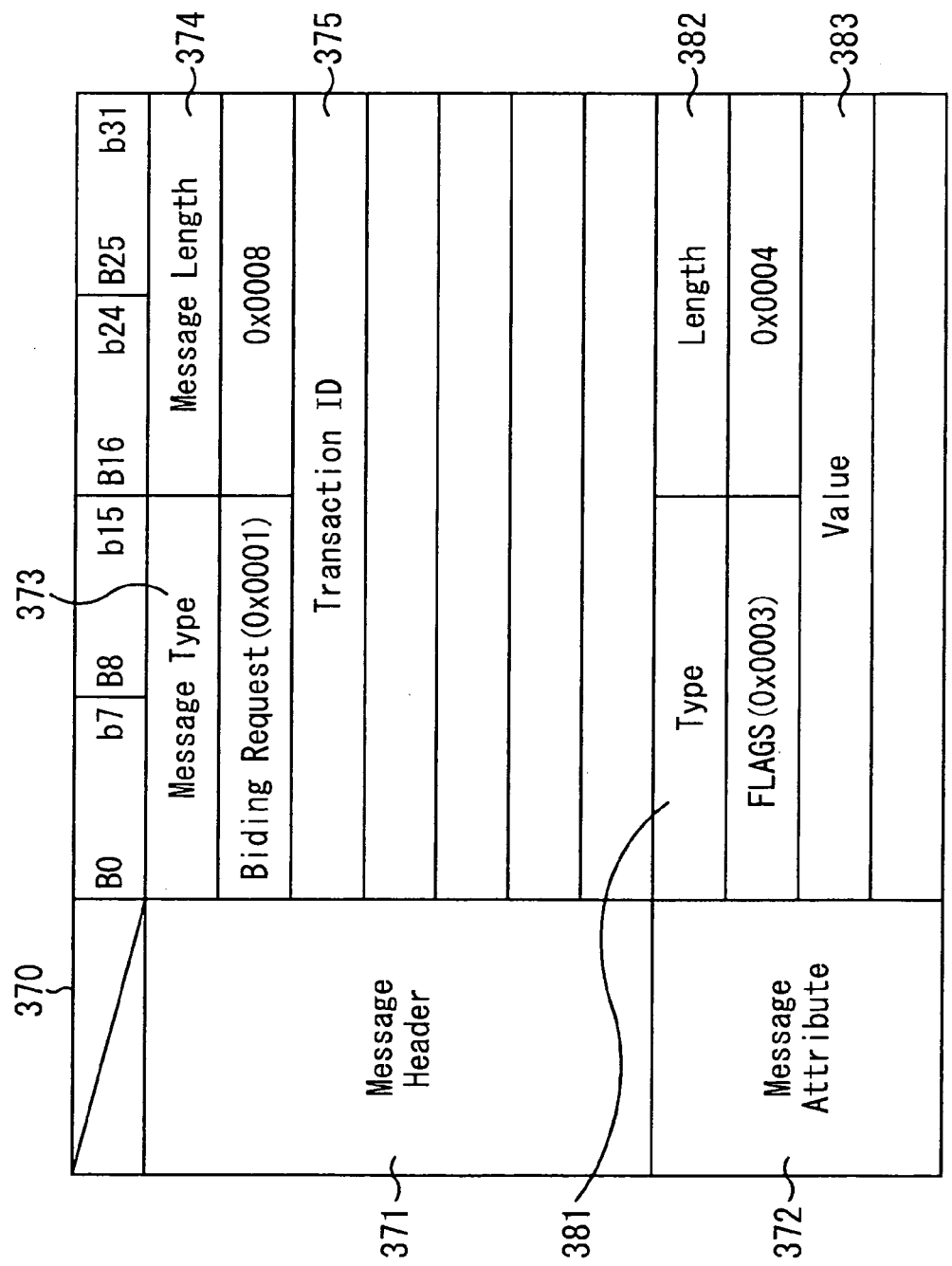
FIG. 34 is a schematic diagram showing still another example of the structure of the UDP packet for transferring a STUN message.

At Step S333 the local communication apparatus 11 supplies as the open request packet an opening port notification message of the STUN message, such as shown in FIG. 34, to the local communication apparatus 31. This process corresponds to Step S12 of FIG. 10.

As shown in FIG. 34, the type 381 in the data field 372 of the UDP packet 370 as the open request message indicates a flags request of the STUN message (0x0003), and the data length 382 is 4 bytes (0x0004). In this case, the message value 383 is "bitC=1", and "0" in other cases (0x00000001).

At Step S373, the local communication apparatus 31 acquires the open request packet. Similarly, at Step S374 the local communication apparatus 31 supplies the open request packet, such as shown in FIG. 34, to the local communication apparatus 11 which acquires the open request packet at Step S334.

At Step S335 the local communication apparatus 11 supplies as the open maintenance packet a keep-alive message of the STUN message, such as shown in FIG. 32. Similar to the mapped address inquiry message, the keep-alive request message uses the mapped address request of the STUN message. This process corresponds to Step S13 of FIG. 10.

As the local communication apparatus 31 acquires the open maintenance packet at Step S375, the local communication apparatus 31 supplies at Step S376 as the open maintenance packet a keep-alive response message of the STUN message, such as shown in FIG. 33. Similar to the answered mapped address message, the keep-alive response message uses the mapped address message of the STUN message. This process corresponds to Step S55 of FIG. 10.

As the local communication apparatus 11 acquires the open maintenance packet at Step S336, the local communication apparatus 11 supplies as the open maintenance packet for maintaining the open communication a heartbeat message of the STUN message, such as shown in FIG. 34. Similar to the opening port notification message, the heartbeat message uses the flags request of the STUN message. In this case, the message value 383 is "1" for bitA and bitB, and "0" for other cases (0x00000005). At Step S377 of FIG. 31 the local communication apparatus 31 acquires the open maintenance packet.

Similarly, at Step S378 the local communication apparatus 31 supplies the open maintenance packet to the local communication apparatus 11 which in turn acquires the open maintenance packet at Step S338.

Figure 35:
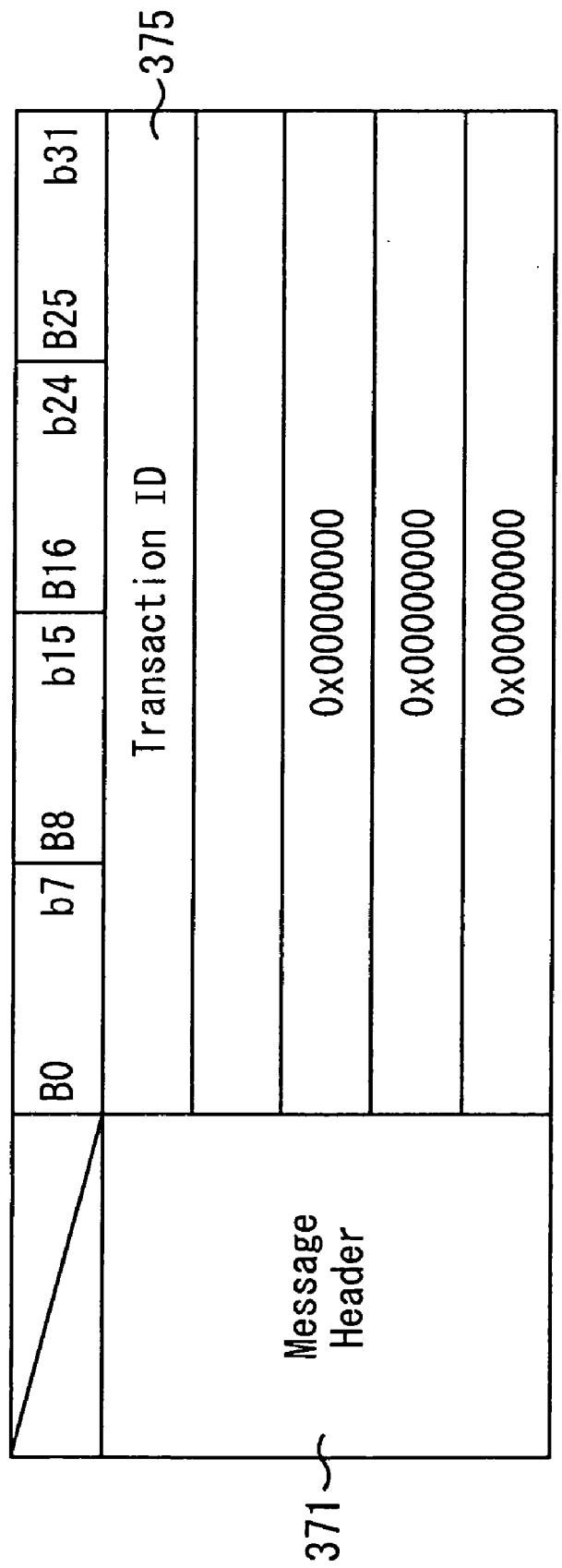
FIG. 35 is a schematic diagram showing an example of the structure of a transaction ID of the UDP packet.
Figure 36:
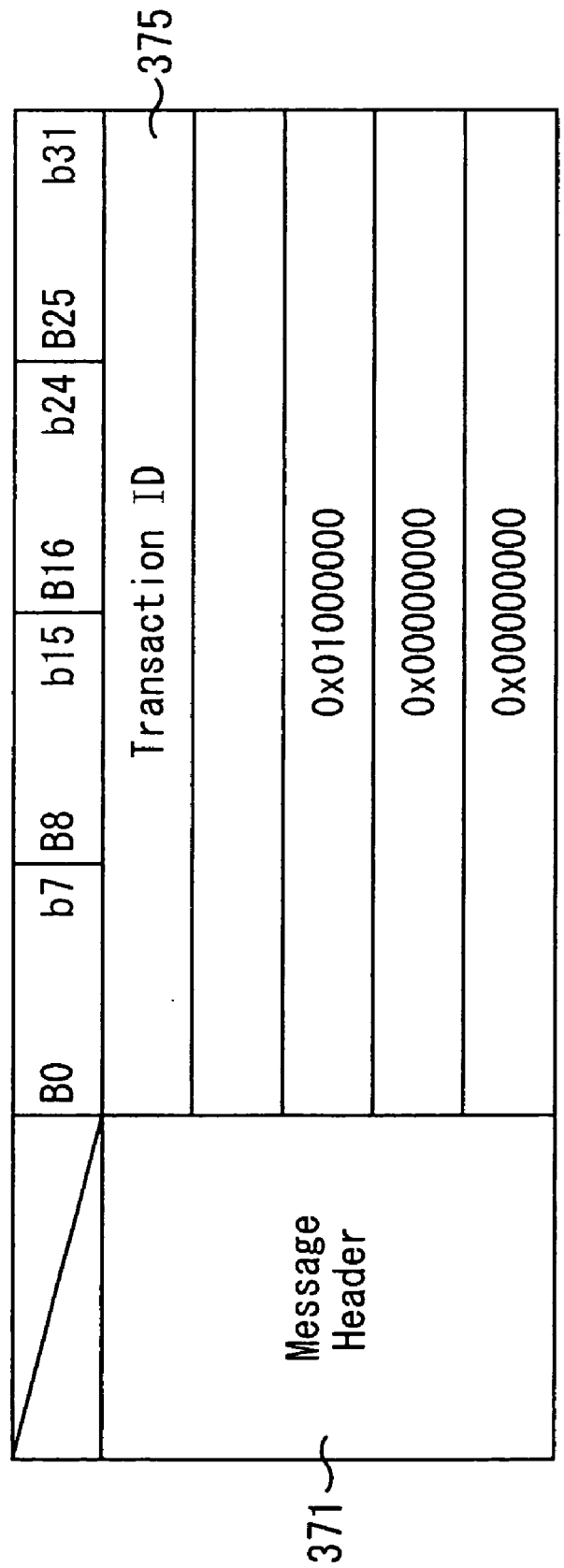
FIG. 36 is a schematic diagram showing another example of the structure of a transaction ID of the UDP packet.

In the keep-alive request message and keep-alive response message described above, the transaction ID 375 in the header field 371 has the value such as shown in FIG. 35, and the transaction ID 375 in the heartbeat message has the value such as shown in FIG. 36.

The service request packet, service providing packet, open request packet and open maintenance packet may obviously be packets having a structure different from the above-described structure, and protocols other than the STUN protocol may be used.

As described above, by using the STUN messages, the local communication apparatuses 11 and 31 acquire the predicted (estimated) address port information of the transmission destination by using the service request packet and service providing packet, supply a plurality of open request packets based on the address port information to search a port enabling actual communication to become open, and maintain the port by the open maintenance packet. In this manner, even in communications via the relay apparatuses, the local communication apparatuses 11 and 31 can conduct communications in a network system consisting of already existing facilities.

Figure 37:
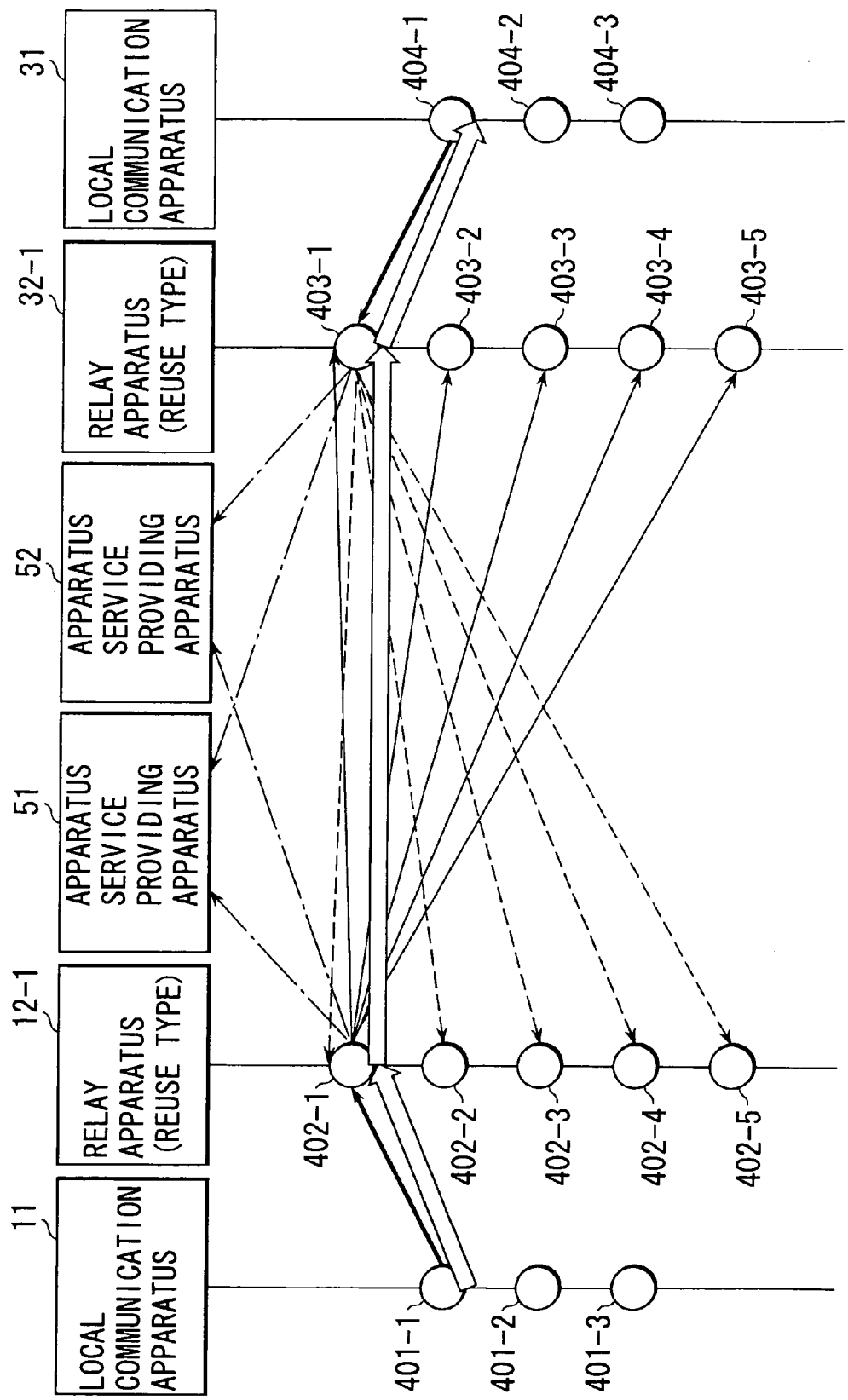
FIG. 37 is a diagram showing an example of a transfer state of the open request packet by the local communication apparatus shown in FIG. 1.

In the following, specific examples are given. In FIG. 37, the relay apparatus on the local communication apparatus 11 side is a relay apparatus 12-1 of the reuse type, and the relay apparatus on the local communication apparatus 31 side is a relay apparatus 32-1 of the reuse type.

The relay apparatus 12-1 relays the UDP packet supplied from the local communication apparatus 11 by using a port 402-1 independently from the address port information of the supply side. Namely, as shown in FIG. 37, a packet transmitted from the local communication apparatus 11 and having the port number of the transmission source address port information set to a port 401-1 of the local communication apparatus is NAPT-translated at the relay apparatus 12-1 to translate the port number of the transmission source address port information into the port 402-1, and thereafter supplied to ports 403-1 to 403-5 of the apparatus service providing apparatus 51 or 52 or the relay apparatus 32-1.

In this case, therefore, two pieces of the global address information contained in the service providing packets supplied from the apparatus service providing apparatuses 51 and 52 have the difference value of "0". Based on this difference value, the local communication apparatus 11 predicts (estimates) that the relay apparatus 12-1 will use the port 402-1 for the local communication apparatus 11 for the next communication, i.e., when the open request packet is supplied to the relay apparatus 32-1.

Similarly, the relay apparatus 32-1 relays the UDP packet supplied from the local communication apparatus 31 by using a port 403-1 independently from the address port information of the supply side. Namely, as shown in FIG. 37, a packet transmitted from the local communication apparatus 31 and having the port number of the transmission source address port information set to a port 404-1 of the local communication apparatus is-NAPT translated at the relay apparatus 32-1 to translate the port number of the transmission source address port information into the port 403-1, and thereafter supplied to ports 402-1 to 402-5 of the apparatus service providing apparatus 51 or 52 or the relay apparatus 12-1.

In this case, therefore, two pieces of the global address information contained in the service providing packets supplied from the apparatus service providing apparatuses 51 and 52 have the difference value of "0". Based on this difference value, the local communication apparatus 31 predicts (estimates) that the relay apparatus 32-1 will use the port 403-1 for the local communication apparatus 31 for the next communication, i.e., when the open request packet is supplied to the relay apparatus 12-1.

The local communication apparatuses 11 and 31 exchange the predicted address port information by using the user service providing apparatus 41 and utilize the exchanged information as the transmission destination address port information when the open request packet is transmitted. In this case, the local communication apparatus 11 supplies the open request packet via the port 403-1, whereas the local communication apparatus 31 supplies the open request packet via the port 402-1.

In this case, therefore, communications become open via the port 401-1 of the local communication apparatus 11, the port 402-1 of the relay apparatus 12-1, the port 403-1 of the relay apparatus 32-1 and the port 404-1 of the local communication apparatus 31.

Figure 38:
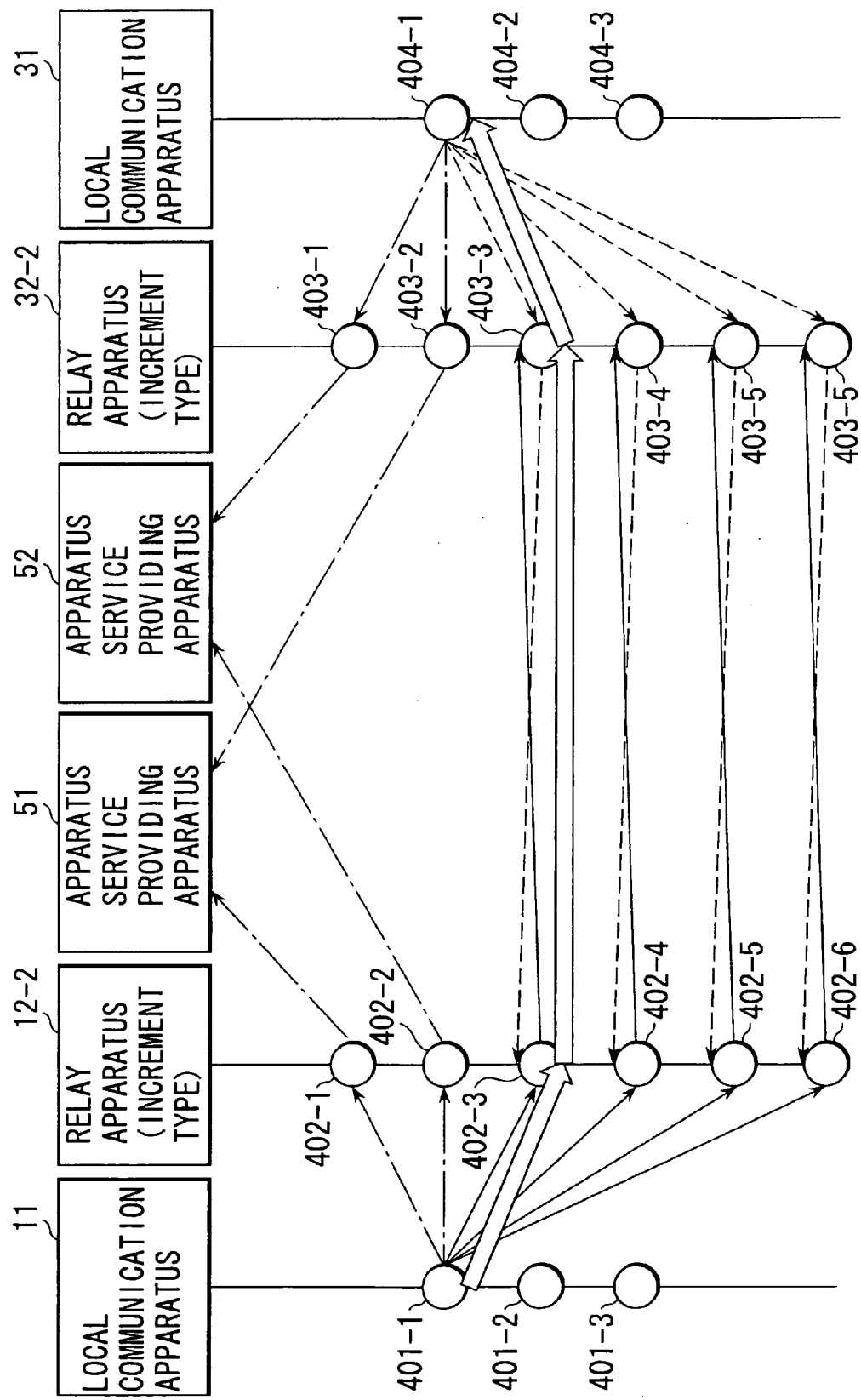
FIG. 38 is a diagram showing another example of a transfer state of the open request packet by the local communication apparatus shown in FIG. 1.

In FIG. 38, the relay apparatus on the local communication apparatus 11 side is a relay apparatus 12-2 of the increment type that relays by increasing the port number by 1 each time the address port information of the packet supply destination changes, and the relay apparatus on the local communication apparatus 31 side is a relay apparatus 32-2 of the same increment type.

The relay apparatus 12-2 relays the UDP packet supplied from the local communication apparatus 11 by increasing the port number by 1 each time the supply destination address port information changes. Namely, as shown in FIG. 38, as the relay apparatus 12-2 acquires the service request packet having the transmission source address port information indicating a port 401-1 of the local communication apparatus 11 and the transmission destination address port information indicating the apparatus service providing apparatus 51, the relay apparatus NAPT-translates the service request packet to translate the communication source address into a port 402-1 of the relay apparatus 12-2 and thereafter supplies it to the apparatus service providing apparatus 51. Next, as the relay apparatus 12-2 acquires the service request packet having the transmission source address port information indicating the port 401-1 of the local communication apparatus 11 and the transmission destination address port information indicating the apparatus service providing apparatus 52, the relay apparatus 12-2 NAPT-translates the service request packet to translate the transmission source address into a port 402-2 of the relay apparatus 12-2 and thereafter supplies it to the apparatus service providing apparatus 51.

In this case, therefore, two pieces of the global address information contained in the service providing packets supplied from the apparatus service providing apparatuses 51 and 52 have the difference value of "1". Based on this difference value, the local communication apparatus 11 predicts (estimates) that the relay apparatus 12-2 will use a port 402-3 next to the port 402-2 for the local communication apparatus 11 for the next communication, i.e., when the open request packet is supplied to the relay apparatus 32-2.

The relay apparatus 32-2 executes the processes similar to the case of the above-described relay apparatus 12-2 to relay the UDP packet supplied from the local communication apparatus 31 by increasing the port number by 1 each time the supply destination address port information changes.

In this case, therefore, two pieces of the global address information contained in the service providing packets supplied from the apparatus service providing apparatuses 51 and 52 have the difference value of "1". Based on this difference value, the local communication apparatus 31 predicts (estimates) that the relay apparatus 32-2 will use a port 403-3 next to the port 403-2 for the local communication apparatus 31 for the next communication, i.e., when the open request packet is supplied to the relay apparatus 12-2.

The local communication apparatuses 11 and 31 exchange the predicted address port information by using the user service providing apparatus 41 and utilize the exchanged information as the transmission destination address port information when the open request packet is transmitted. In this case, the local communication apparatus 11 supplies the open request packet via the port 403-3, whereas the local communication apparatus 31 supplies the open request packet via the port 402-3.

In this case, therefore, communications become open via the port 401-1 of the local communication apparatus 11, the port 402-3 of the relay apparatus 12-1, the port 403-3 of the relay apparatus 32-2 and the port 404-1 of the local communication apparatus 31.

As described above, the local communication apparatuses 11 and 31 can make the communications readily become open even via NAPT.

In the above description, although the relay apparatus of the increment type relays by increasing the port number by 1 each time the address port information of the packet supply destination changes, the invention is not limited thereto, and the number of port numbers to be increased by the relay apparatus may be two or more.

The communication start request algorithm to be executed by the master side communication apparatus and the communication start request algorithm to be executed by the slave side communication apparatus may contain different processes.

With reference to the flow chart of FIG. 39, a control process by the local communication apparatus 11 will be described. The description will be made when necessary with reference to the flow chart of FIG. 40.

At Step S391 the inter-local communication control unit 66 of the local communication apparatus 11 determines whether the local communication apparatus 11 is the master of communications. If it is determined as the master, at Step S392 a second communication request process is executed as the communication start request algorithm. The details of the second communication start request process will be described later with reference to the flow chart of FIG. 40. The inter-local communication control unit 66 that executes the process at Step S392 terminates the control process.

If it is determined at Step S391 that the local communication apparatus 11 is the slave, the inter-local communication control unit 66 proceeds to Step S393 whereat a first communication request process similar to the flow chart shown in FIG. 23 is executed as the communication start request algorithm. Since the flow chart of FIG. 23 can be adopted, a description of the details of the first communication start request process is omitted. The inter-local communication control unit 66 that executes the process at Step S393 terminates the control process.

Next, with reference to the flow chart of FIG. 40, a description will be made on the second communication start request process by the local communication apparatus.

At Step S411 the inter-local communication control unit 66 of the local communication apparatus 11 substitutes a value "0" in the variables i and j. At Step S412 the inter-local communication control unit 66 retains as the variable Base-Glo-port the value of the variable Glo-port representative of the global port of the relay apparatus 12 on the transmission destination side, and retains as the variable Base-Pri-port the variable Pri-port representative of the port of the local communication apparatus 11.

As the process proceeds to Step S413, the inter-local communication control unit 66 determines whether the value of the variable i is smaller than the variable numSrcPriPort. If it is determined that the value of the variable i is smaller than the variable numSrcPriPort, the inter-local communication control unit 66 proceeds to Step S414 whereat the value of the variable i is added to the value of the variable Base-Pri-Port and this addition result is substituted in the variable Pri-port.

At Step S415 the inter-local communication control unit 66 determines whether the value of the variable j is smaller than twofold the variable numDstGloPort. If it is determined to be smaller, at Step S416 the value of the variable j is added to the variable Base-Glo-Port and this addition result is substituted in the variable Glo-port.

At Step S417 the inter-local communication control unit 66 generates the open request packet by using the value of the variable Pri-port as the port number of the transmission source and the value of the variable Glo-port as the port number of the transmission destination, and controls the communication unit 84 to supply the generated open request packet to the relay apparatus 32 via the relay apparatus 12.

The inter-local communication control unit 66 proceeds to Step S418 and stands by for a predetermined time timeSend-Interval. Thereafter at Step S419 a value (j+2) is substituted in the value of the variable j, and at Step S420 it is determined whether a termination request of the open request packet has been output in response to a user operation or the like. If it is determined that the termination request has been output, the second communication start request process is terminated to terminate the control process of FIG. 39.

If it is determined at Step S413 that the value of the variable i is not smaller than the variable numSrcPriPort, the inter-local communication control unit 66 terminates the second communication start request process to terminate the control process of FIG. 39.

If it is determined at Step S415 that the value of the variable j is not smaller than twofold of the variable numSrcDstPort, the inter-local communication control unit 66 proceeds to Step S421 whereat the value "0" is substituted in the variable j, and to Step S422 whereat a value (i+1) is substituted in the variable i, and thereafter the process is returned to Step S413 to repeat the succeeding processes.

If it is determined at Step S420 that the termination request of the open request packet has not been output, the inter-local communication control unit 66 returns the process to Step S415 to repeat the succeeding processes.

As described above, if the local communication apparatus 11 is on the master side, the inter-local communication control unit 66 supplies open request packets to a consecutive port group of the relay apparatus 32 on the communication destination side, at every second port starting from the predicted (estimated) port number (supplies open request packets by shifting the port number by 2). If the local communication apparatus 11 is on the slave side, the inter-local communication control unit 66 supplies open request packets to the ports of the relay apparatus 32 on the communication destination side, by shifting the port number by 1 starting from the predicted (estimated) port number.

The local communication apparatus 31 executes the control process similar to the case of the local communication apparatus 11 to execute the communication start request process.

Figure 41:
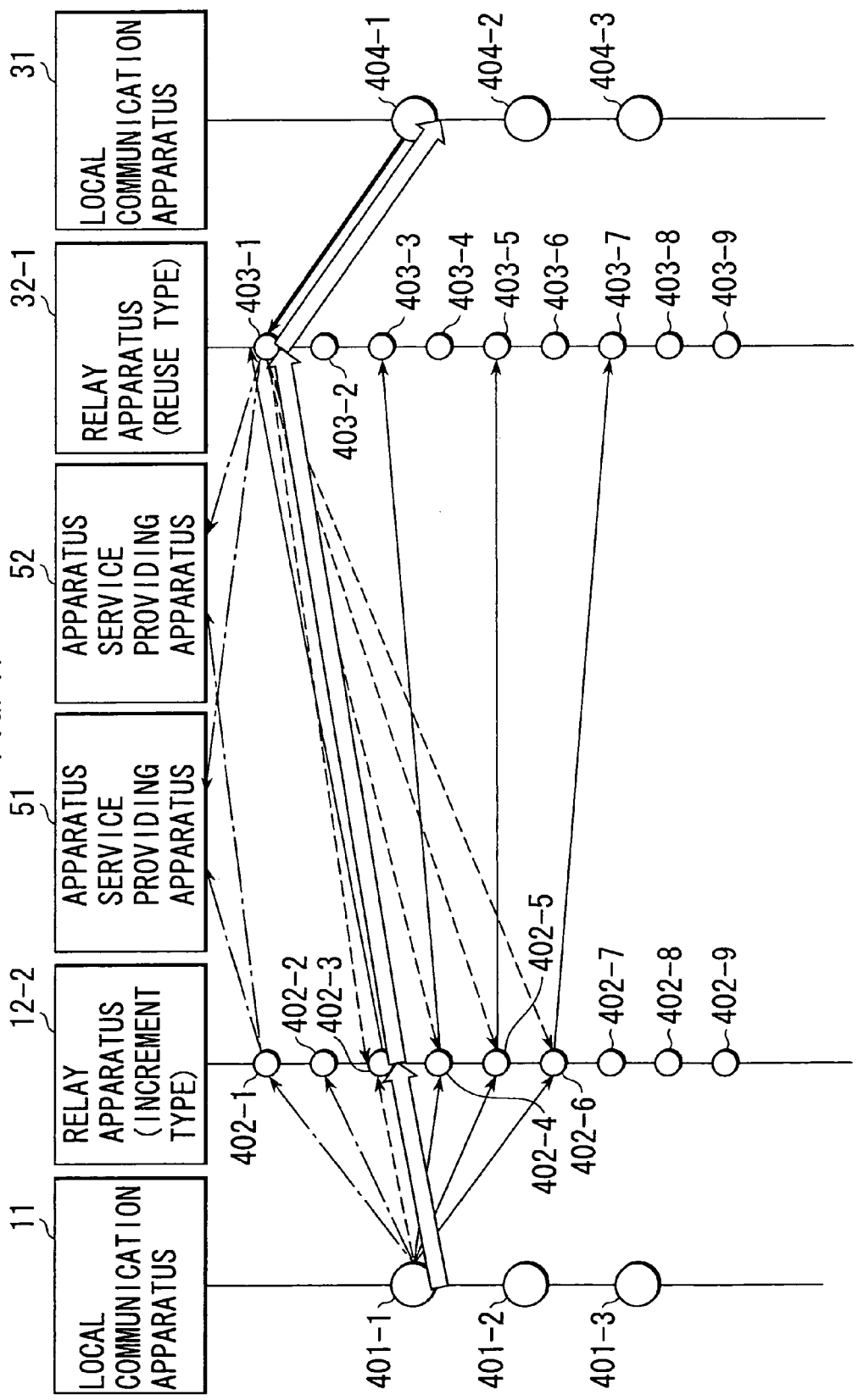
FIG. 41 is a diagram showing an example of a transfer state of the open request packet by the local communication apparatus shown in FIG. 1.

For example, in FIG. 41, the relay apparatus on the local communication apparatus 11 side is a relay apparatus 12-2 of the increment type that relays by increasing the port number by 1 each time the address port information of the packet supply destination changes, and the relay apparatus on the local communication apparatus 31 side is a relay apparatus 32-1 of the reuse type.

In this case, a port of the relay apparatus 12-2 predicted (estimated) to be assigned to the local communication apparatus 11 when the open request packet is transmitted from the local communication apparatus 11 is a port 402-3 similar to that described with reference to FIG. 38, and a port of the relay apparatus 32-1 predicted (estimated) to be assigned to the local communication apparatus 31 when the open request packet is transmitted from the local communication apparatus 31 is a port 403-1 similar to that described with reference to FIG. 37. Namely, the local communication apparatus 11 supplies the open request packet to a plurality of ports at every second port starting from the port 403-1, and the local communication apparatus 31 supplies the open request packet to a plurality of consecutive ports starting from the port 402-3.

In this case, therefore, communications become open via the port 401-1 of the local communication apparatus 11, the port 402-3 of the relay apparatus 12-2, the port 403-1 of the relay apparatus 32-1 and the port 404-1 of the local communication apparatus 31.

Figure 42:
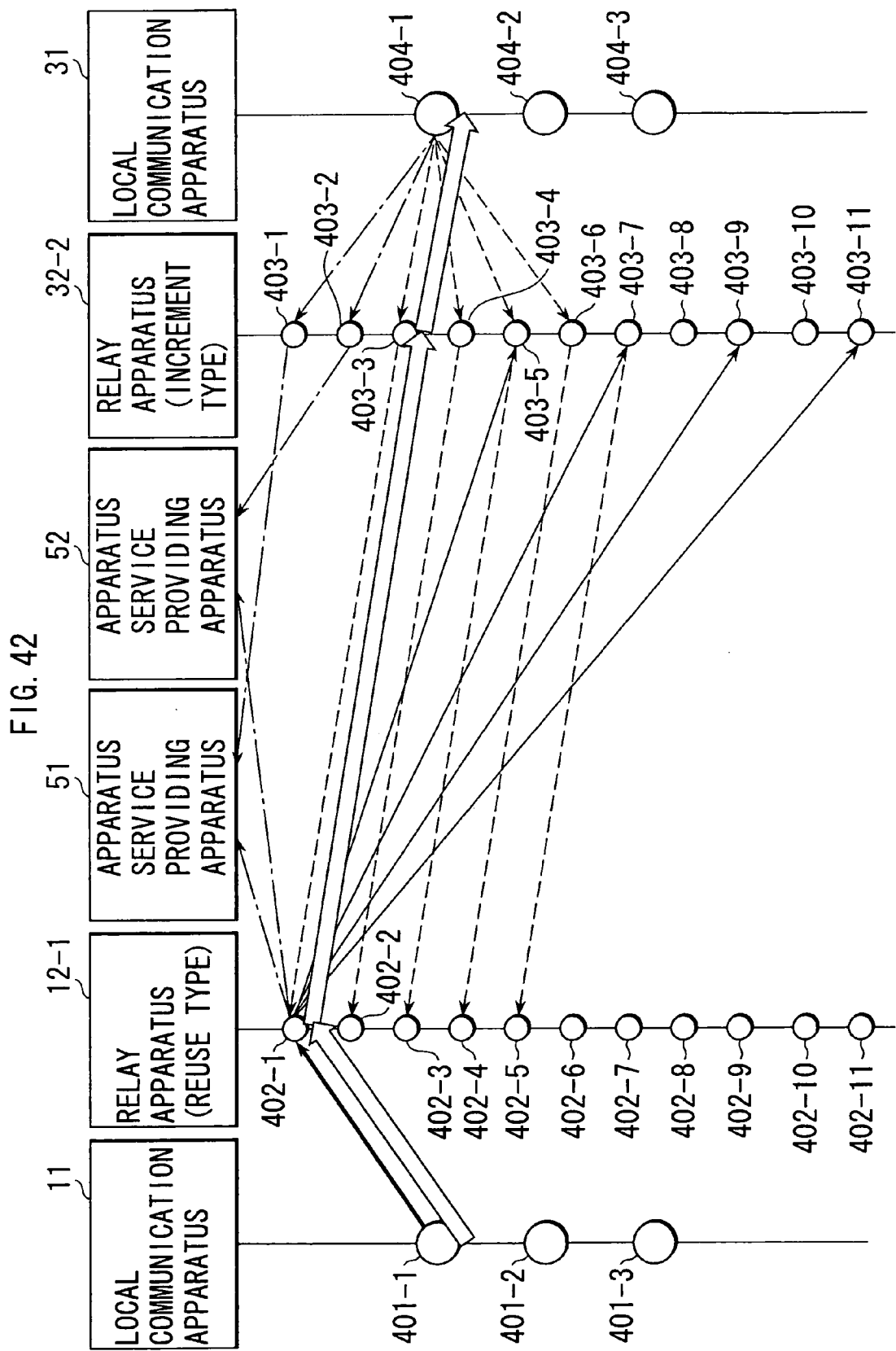
FIG. 42 is a diagram showing another example of a transfer state of the open request packet by the local communication apparatus shown in FIG. 1.

For example, in FIG. 42, the relay apparatus on the local communication apparatus 11 side is a relay apparatus 12-1 of the reuse type and the relay apparatus on the local communication apparatus 31 side is a relay apparatus 32-2 of the increment type that relays by increasing the port number by 1 each time the address port information of the packet supply destination changes.

In this case, a port of the relay apparatus 12-1 predicted (estimated) to be assigned to the local communication apparatus 11 when the open request packet is transmitted from the local communication apparatus 11 is a port 402-1 similar to that described with reference to FIG. 37, and a port of the relay apparatus 32-2 predicted (estimated) to be assigned to the local communication apparatus 31 when the open request packet is transmitted from the local communication apparatus 31 is a port 403-3 similar to that described with reference to FIG. 38. Namely, the local communication apparatus 11 supplies the open request packet to a plurality of ports at every second port starting from the port 403-3, and the local communication apparatus 31 supplies the open request packet to a plurality of consecutive ports starting from the port 402-1.

In this case, therefore, communications become open via the port 401-1 of the local communication apparatus 11, the port 402-1 of the relay apparatus 12-1, the port 403-3 of the relay apparatus 32-2 and the port 404-1 of the local communication apparatus 31.

As described above, the local communication apparatuses 11 and 31 can make the communications readily become open even via NAPT.

In the above description, although the local communication apparatus as the master supplies the open request packet at every second port number, the local communication apparatus as the slave may supply the open request packet in this manner. In this case, the local communication apparatus as the master supplies the open request packet at consecutive port numbers.

Further, in the above description, it is sufficient if the local communication apparatus as the master and the local communication apparatus as the slave use different algorithms for supplying the open request packet. For example, the local communication apparatus may supply the open request packet to the communication destination relay apparatus at every second or more port numbers.

Furthermore, the local communication apparatus may supply the open request packets output from respective ports to the transmission destination apparatus at different ports. With reference to the flow chart of FIG. 43, a description will be made on the control process by the local communication apparatus 11 in this case. The description will be made when necessary with reference to the flow charts of FIGS. 44 and 45.

At Step S441 the inter-local communication control unit 66 of the local communication apparatus 11 determines whether the local communication apparatus 11 is the master of communications. If it is determined to be the master, at Step S442 a third communication request process is executed as the communication start request algorithm. The details of the third communication start request process will be described later with reference to the flow chart of FIG. 44. The inter-local communication control unit 66 that executes the process at Step S442 terminates the control process.

If it is determined at Step S441 that the local communication apparatus 11 is the slave, the inter-local communication control unit 66 proceeds to Step S443 whereat a fourth communication request process is executed as the communication start request algorithm. The details of the fourth communication start request process will be described later with reference to the flow chart of FIG. 45. The inter-local communication control unit 66 that executes the process at Step S443 terminates the control process.

Next, with reference to the flow chart of FIG. 44, a description will be made on the third communication start request process by the local communication apparatus. It is assumed in the following that a variable numDstGloPort2 is the number of open request packets supplied from one port (i.e., the number of ports of the communication destination relay apparatus to which the open request packet is supplied from one port).

At Step S461 the inter-local communication control unit 66 of the local communication apparatus 11 substitutes a value "0" in the variables i and j. At Step S462 the inter-local communication control unit 66 retains as the variable Base-Glo-port the value of the variable Glo-port representative of the global port of the relay apparatus 12, and retains as the variable Base-Pri-port the variable Pri-port representative of the port of the local communication apparatus 11.

As the process proceeds to Step S463, the inter-local communication control unit 66 determines whether the value of the variable i is smaller than the variable numSrcPriPort. If it is determined that the value of the variable i is smaller than the variable numSrcPriPort, the inter-local communication control unit 66 proceeds to Step S464 whereat the value of the variable i is added to the value of the variable Base-Pri-Port and this addition result is substituted in the variable Pri-port.

At Step S465 the inter-local communication control unit 66 determines whether the value of the variable j is smaller than (numDstGloPort2×i+numDstGloPort2−1). If it is determined to be smaller, at Step S466 the value of the variable j is added to the variable Base-Glo-Port and this addition result is substituted in the variable Glo-port.

At Step S467 the inter-local communication control unit 66 generates the open request packet by using the value of the variable Pri-port as the port number of the transmission source and the value of the variable Glo-port as the port number of the transmission destination, and controls the communication unit 84 to supply the generated open request packet to the relay apparatus 32 via the relay apparatus 12.

The inter-local communication control unit 66 proceeds to Step S468 and stands by for a predetermined time timeSendInterval. Thereafter at Step S469 a value (j+1) is substituted in the value of the variable j, and at Step S470 it is determined whether a termination request of the open request packet has been output in response to a user operation or the like. If it is determined that the termination request has been output, the third communication start request process is terminated to terminate the control process of FIG. 43.

Figure 43:
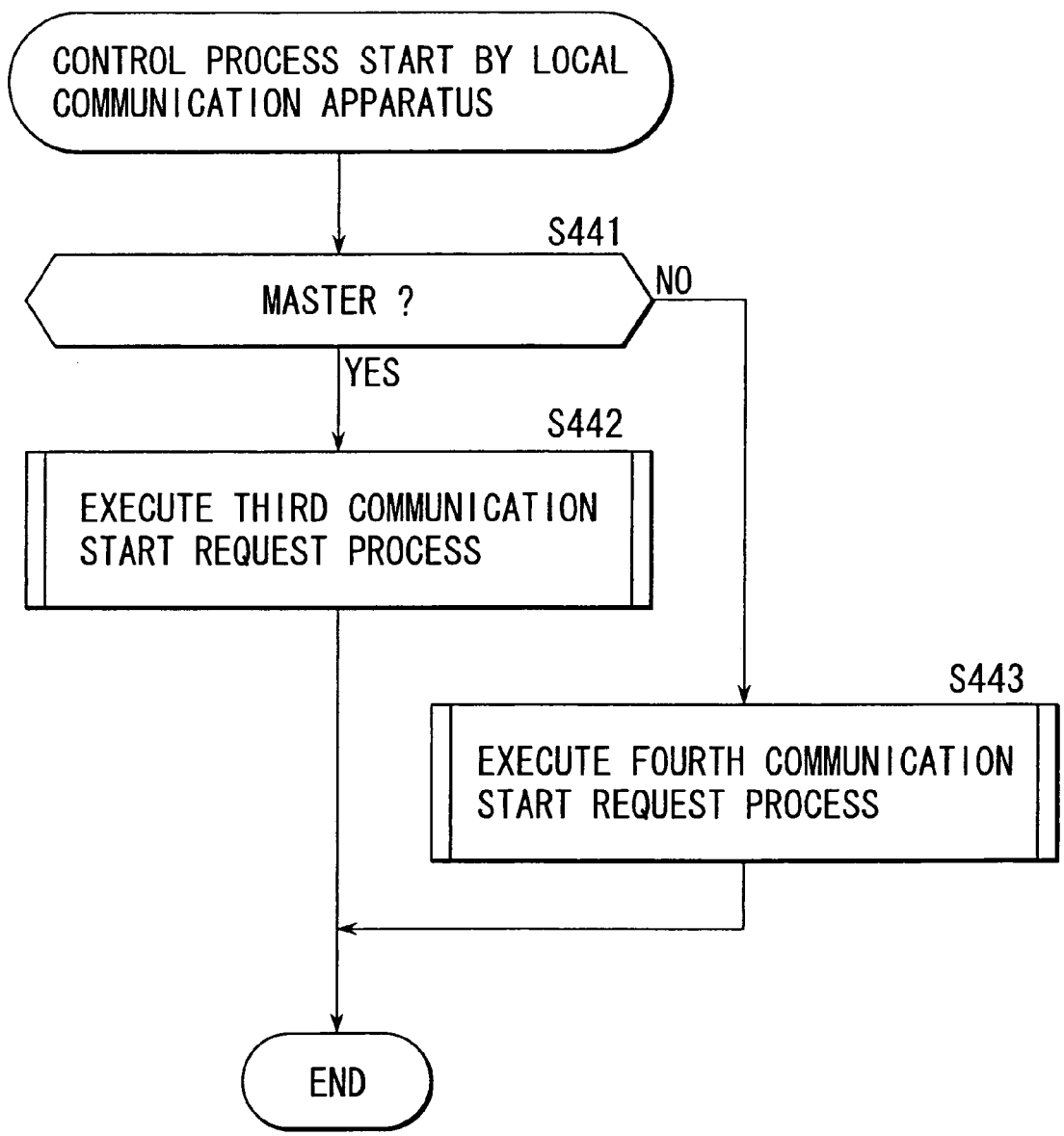
FIG. 43 is a flow chart illustrating another example of the control process by the local communication apparatus shown in FIG. 1.

If it is determined at Step S463 that the value of the variable i is not smaller than the variable numSrcPriPort, the inter-local communication control unit 66 terminates the third communication start request process to terminate the control process of FIG. 43.

If it is determined at Step S465 that the value of the variable j is not smaller than the value of (numDstGloPort2×i+numDstGloPort2−1), the inter-local communication control unit 66 proceeds to Step S471 whereat the value "0" is substituted in the variable j, and to Step S472 whereat a value (i+1) is substituted in the variable i, and thereafter the process is returned to Step S463 to repeat the succeeding processes.

If it is determined at Step S470 that the termination request of the open request packet has not been output, the inter-local communication control unit 66 returns the process to Step S465 to repeat the succeeding processes.

Figure 45:
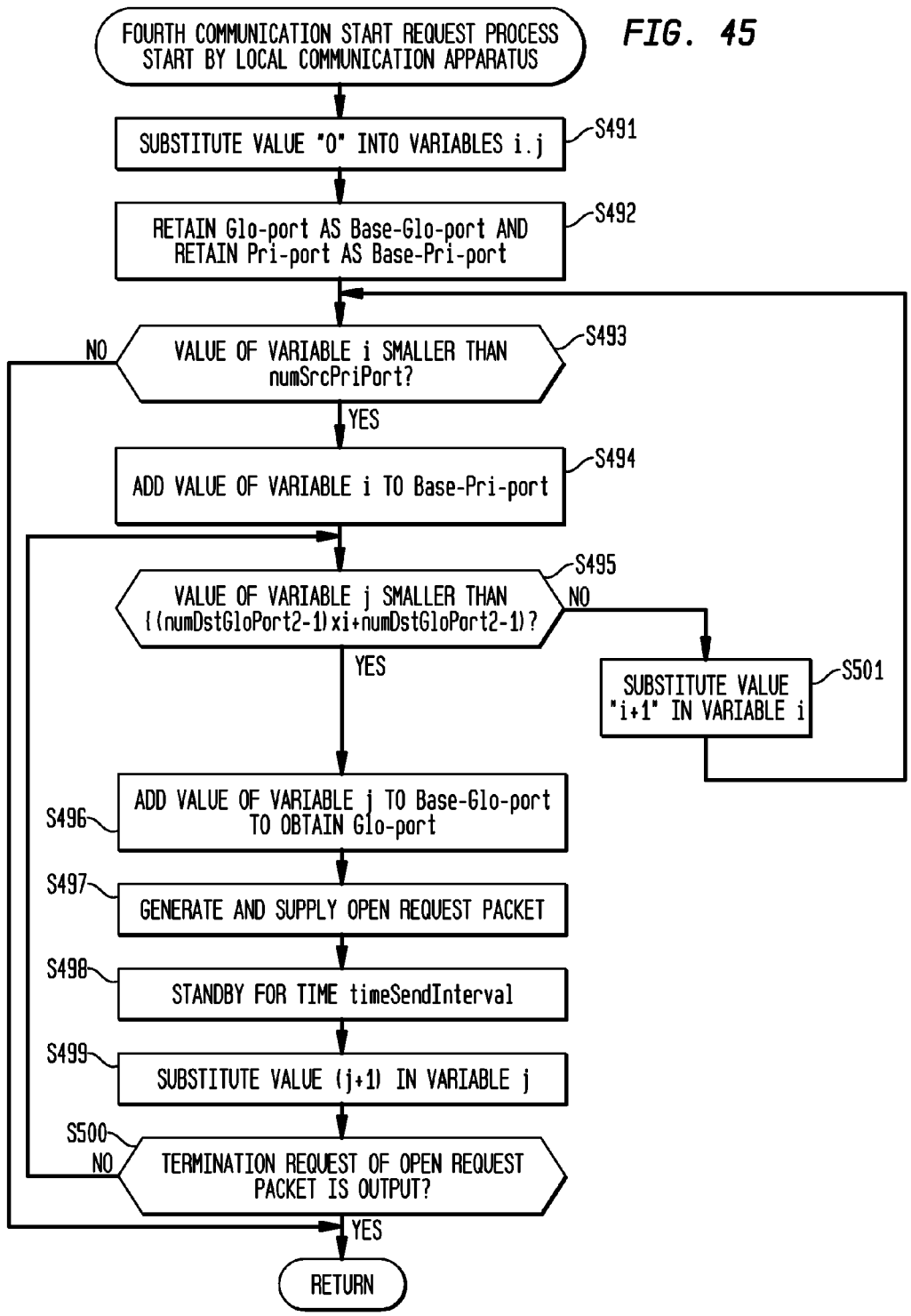
FIG. 45 is a flow chart illustrating the details of a fourth communication start request process by the local communication apparatus shown in FIG. 1.

Next, with reference to the flow chart of FIG. 45, a description will be made on the fourth communication start request process by the local communication apparatus.

At Step S491 the inter-local communication control unit 66 of the local communication apparatus 11 substitutes a value "0" in the variables i and j. At Step S492 the inter-local communication control unit 66 retains as the variable Base-Glo-port the value of the variable Glo-port representative of the global port of the relay apparatus 12, and retains as the variable Base-Pri-port the variable Pri-port representative of the port of the local communication apparatus 11.

As the process proceeds to Step S493, the inter-local communication control unit 66 determines whether the value of the variable i is smaller than the variable numSrcPriPort. If it is determined that the value of the variable i is smaller than the variable numSrcPriPort, the inter-local communication control unit 66 proceeds to Step S494 whereat the value of the variable i is added to the value of the variable Base-Pri-Port and this addition result is substituted in the variable Pri-port.

At Step S495 the inter-local communication control unit 66 determines whether the value of the variable j is smaller than {(numDstGloPort2−1)×i+numDstGloPort2−1}. If it is determined to be smaller, at Step S496 the value of the variable j is added to the variable Base-Glo-Port and this addition result is substituted in the variable Glo-port.

At Step S497 the inter-local communication control unit 66 generates the open request packet by using the value of the variable Pri-port as the port number of the transmission source and the value of the variable Glo-port as the port number of the transmission destination, and controls the communication unit 84 to supply the generated open request packet to the relay apparatus 32 via the relay apparatus 12.

The inter-local communication control unit 66 proceeds to Step S498 and stands by for a predetermined time timeSendInterval. Thereafter at Step S499 a value (j+1) is substituted in the value of the variable j, and at Step S500 it is determined whether a termination request of the open request packet has been output in response to a user operation or the like. If it is determined that the termination request has been output, the fourth communication start request process is terminated to terminate the control process of FIG. 43.

If it is determined at Step S493 that the value of the variable i is not smaller than the variable numSrcPriPort, the inter-local communication control unit 66 terminates the fourth communication start request process to terminate the control process of FIG. 43.

If it is determined at Step S495 that the value of the variable j is not smaller than the value of {(numDstGloPort2−1)×i+ numDstGloPort2−1}, the inter-local communication control unit 66 proceeds to Step S501 whereat the value (i+1) is substituted in the variable i, and thereafter the process is returned to Step S493 to repeat the succeeding processes.

If it is determined at Step S500 that the termination request of the open request packet has not been output, the inter-local communication control unit 66 returns the process to Step S495 to repeat the succeeding processes.

As described above, if the local communication apparatus 11 is on the master side, the inter-local communication control unit 66 sets a plurality of groups each having (numDst-GloPort2−1) consecutive ports of the relay apparatus 32 of the communication destination and one port, and supplies (numDstPort2−1) open request packets to different groups of the relay apparatus 32 from each port of the local communication apparatus 11. If the local communication apparatus 11 is the slave, the inter-local communication control unit 66 sets a plurality of consecutive groups each having (numDst-GloPort2−1) consecutive ports of the relay apparatus 32 of the communication destination, and supplies (numDstPort2−1) open request packets to different groups of the relay apparatus 32 from each port of the local communication apparatus 11.

The local communication apparatus 31 executes a control process similar to the above-described case of the local communication apparatus 11 to execute the communication start request process.

Figure 46:
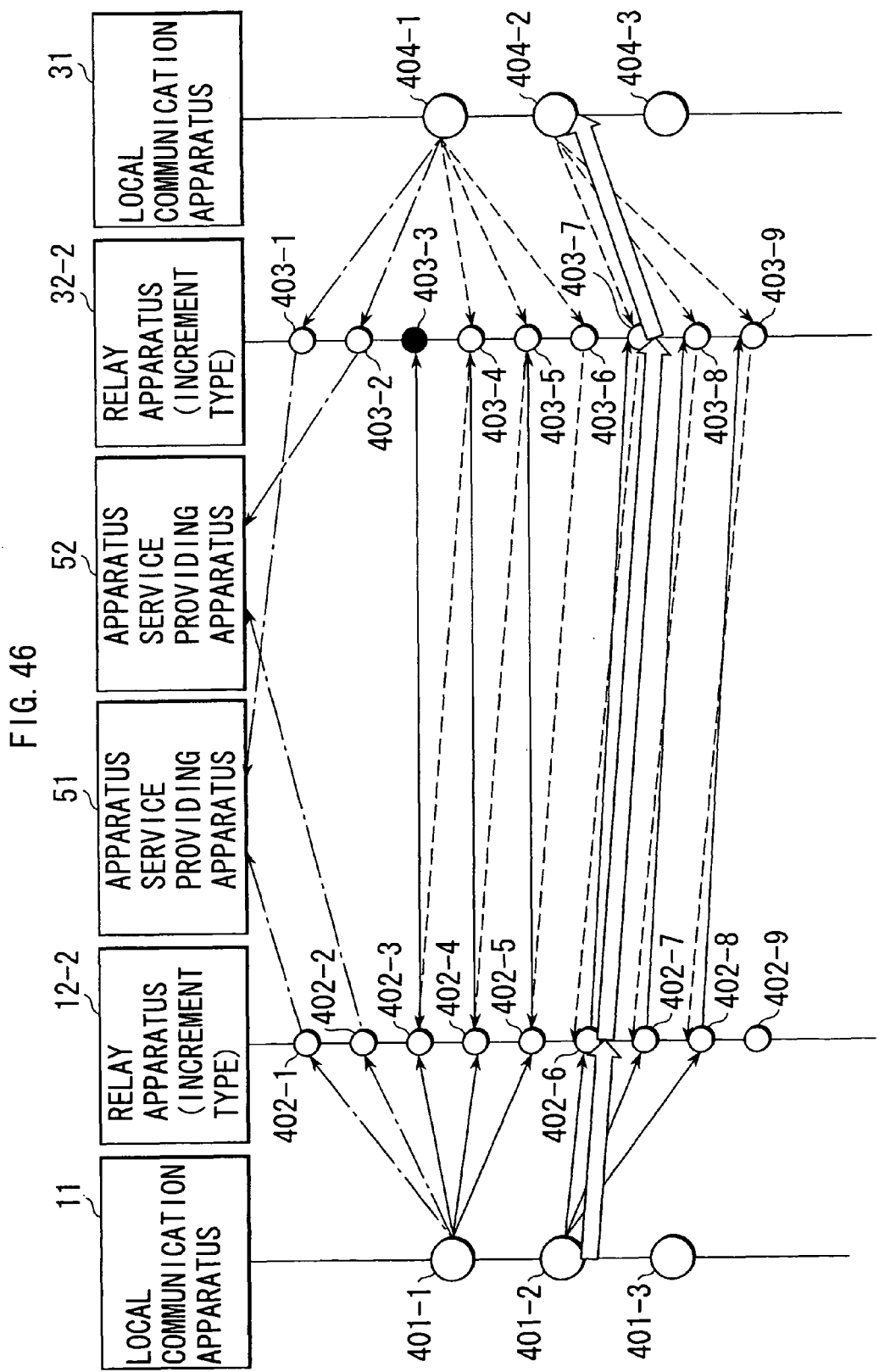
FIG. 46 is a diagram showing an example of a transfer state of the open request packet by the local communication apparatus shown in FIG. 1.

For example, it is assumed that the value of the variable numSrcPriPort is "3" and the value of the variable numSrcPriPort2 is "4". In FIG. 46, the relay apparatus on the local communication apparatus 11 side is a relay apparatus 12-2 of the increment type that relays by increasing the port number by 1 each time the address port information of the packet supply destination changes, and the relay apparatus on the local communication apparatus 31 is also a relay apparatus 32-2 of the increment type.

In this case, a port of the relay apparatus 12-2 predicted (estimated) to be assigned to the local communication apparatus 11 when the open request packet is transmitted from the local communication apparatus 11 is a port 402-3 similar to that described with reference to FIG. 38, and a port of the relay apparatus 32-2 predicted (estimated) to be assigned to the local communication apparatus 31 when the open request packet is transmitted from the local communication apparatus 31 is a port 403-3 similar to that described with reference to FIG. 38. Namely, the local communication apparatus 11 supplies the open request packet to a plurality of consecutive ports starting from the port 403-3, and the local communication apparatus 31 supplies the open request packet to a plurality of consecutive ports starting from the port 402-3.

In this case, if the relay apparatus 32-2 on the communication destination side increments the port to be used by passing the port 403-3 because of some reason, the port numbers of the communication sources of the open request packet supplied from the local communication apparatus 11 shift by 1. Even in this case, communications become open via the port 401-2 of the local communication apparatus 11, the port 402-6 of the relay apparatus 12-2, the port 403-7 of the relay apparatus 32-2 and the port 404-2 of the local communication apparatus 31.

Figure 47:
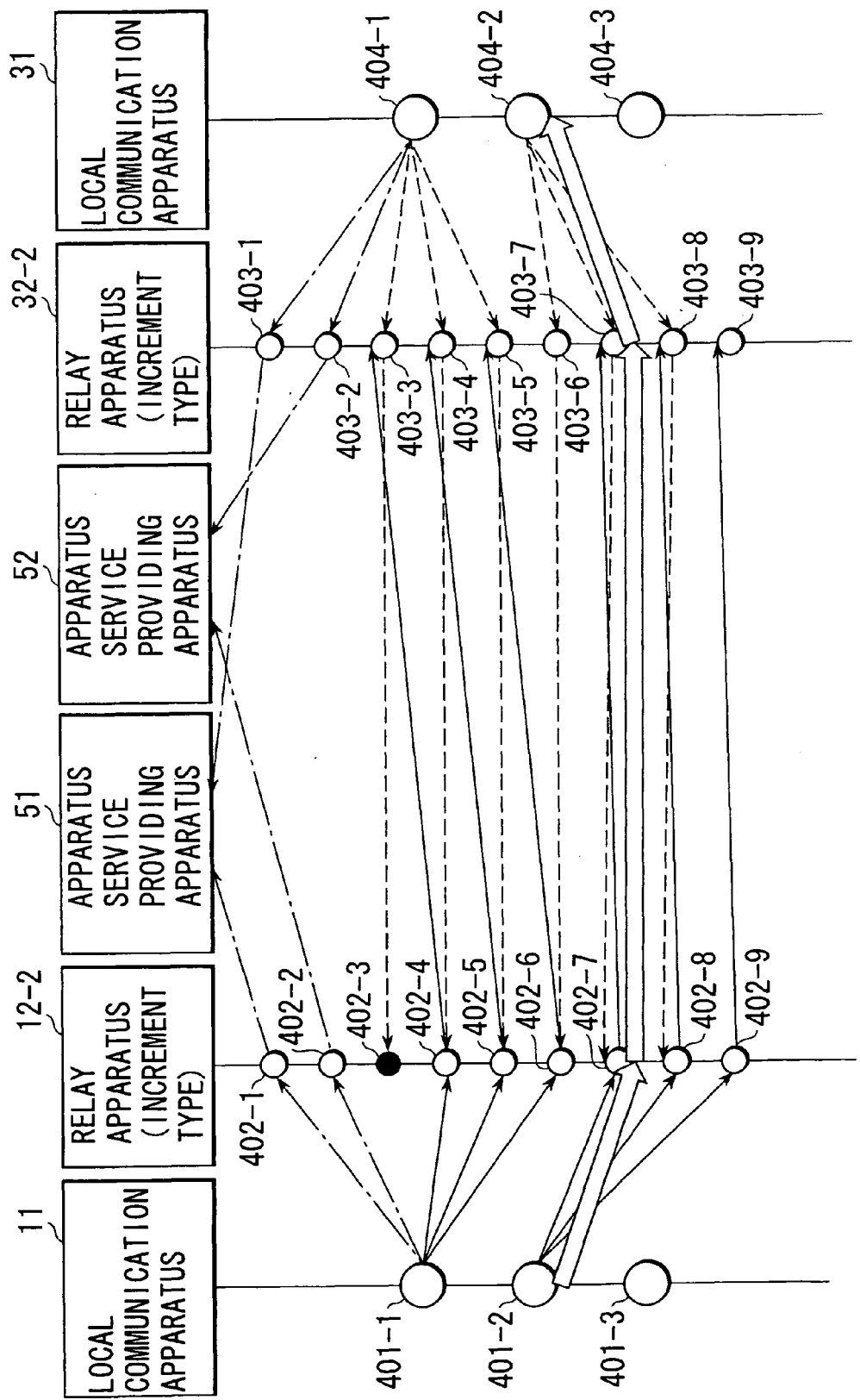
FIG. 47 is a diagram showing another example of a transfer state of the open request packet by the local communication apparatus shown in FIG. 1.

Further, as shown in FIG. 47, if the relay apparatus 12-2 on the communication source side increments the port to be used by passing the port 402-3 because of some reason, the port numbers of the communication sources of the open request packet supplied from the local communication apparatus 11 shift by 1. Even in this case, communications become open via the port 401-2 of the local communication apparatus 11, the port 402-7 of the relay apparatus 12-2, the port 403-7 of the relay apparatus 32-2 and the port 404-2 of the local communication apparatus 31.

As described above, the open request packet supplied from each port of the local communication apparatus is supplied to different ports of the communication destination relay apparatus, and the different open request packet supply methods are used for the master and slave. In this manner, the local communication apparatuses can conduct communications easily in a network system consisting of already existing facilities and in many other cases.

In the above-described examples, it is sufficient if different algorithms for supplying the open request packet are used for the local communication apparatuses as the master and slave. If the local communication apparatus is the master, the fourth communication start request process may be executed, whereas if the local communication apparatus is the slave, the third communication start request process may be executed.

In the above description, although the value of the variable numSrcPriPort is set to "3" and the value of the variable numSrcPriPort2 is set to "4", other values may be set. Also in the above description, if the local communication apparatus 11 is on the master side, the inter-local communication control unit 66 supplies (numDstGloPort2−1) open request packets from each port, whereas if the local communication apparatus 11 is the slave, the inter-local communication control unit 66 supplies (numDstGloPort2−1) open request packets from each port. The number of open request packets supplied from each port may be equal to or larger or smaller than this value.

In addition to the above-described communication start request algorithm for making the local communication apparatus 11 generate and supply the open request packet, any other algorithms may be used. For example, a combination of all the first to fourth communication start request processes described above may be used as the communication start request algorithm.

Figure 48:
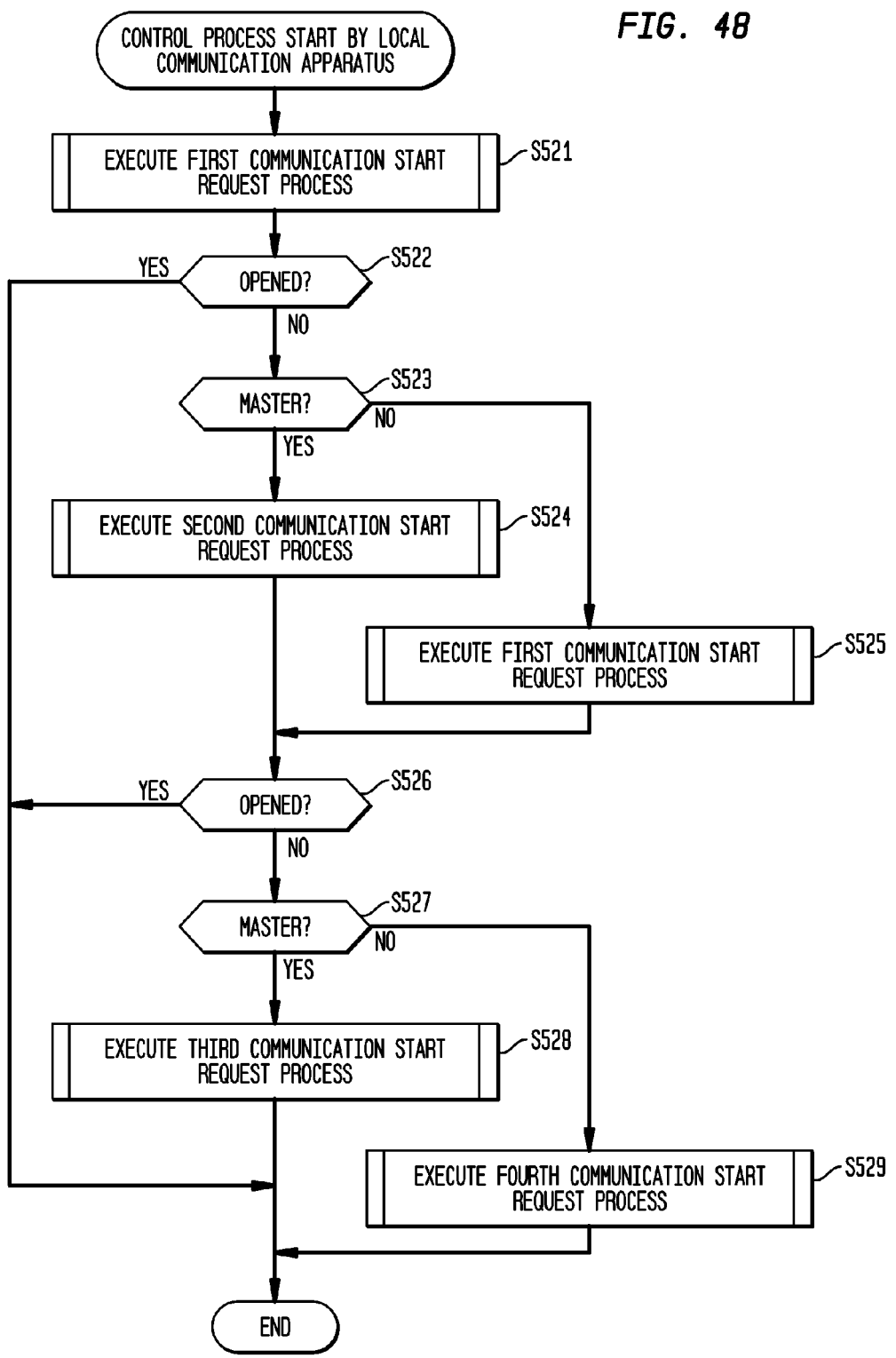
FIG. 48 is a flow chart illustrating still another example of the control process by the local communication apparatus shown in FIG. 1.

With reference to the flow chart of FIG. 48, the control process by the local communication apparatus 11 will be described.

First, at Step S521 the inter-local communication control apparatus 66 of the local communication apparatus 11 executes the first communication start request process similar to that described with reference to the flow chart of FIG. 23. At Step S522 the inter-local communication control unit 66 determines whether communications have become open by the first communication start request process. If it is determined that communications are not open, the process proceeds to Step S523 whereat it is determined whether the local communication apparatus 11 is the master.

Figure 40:
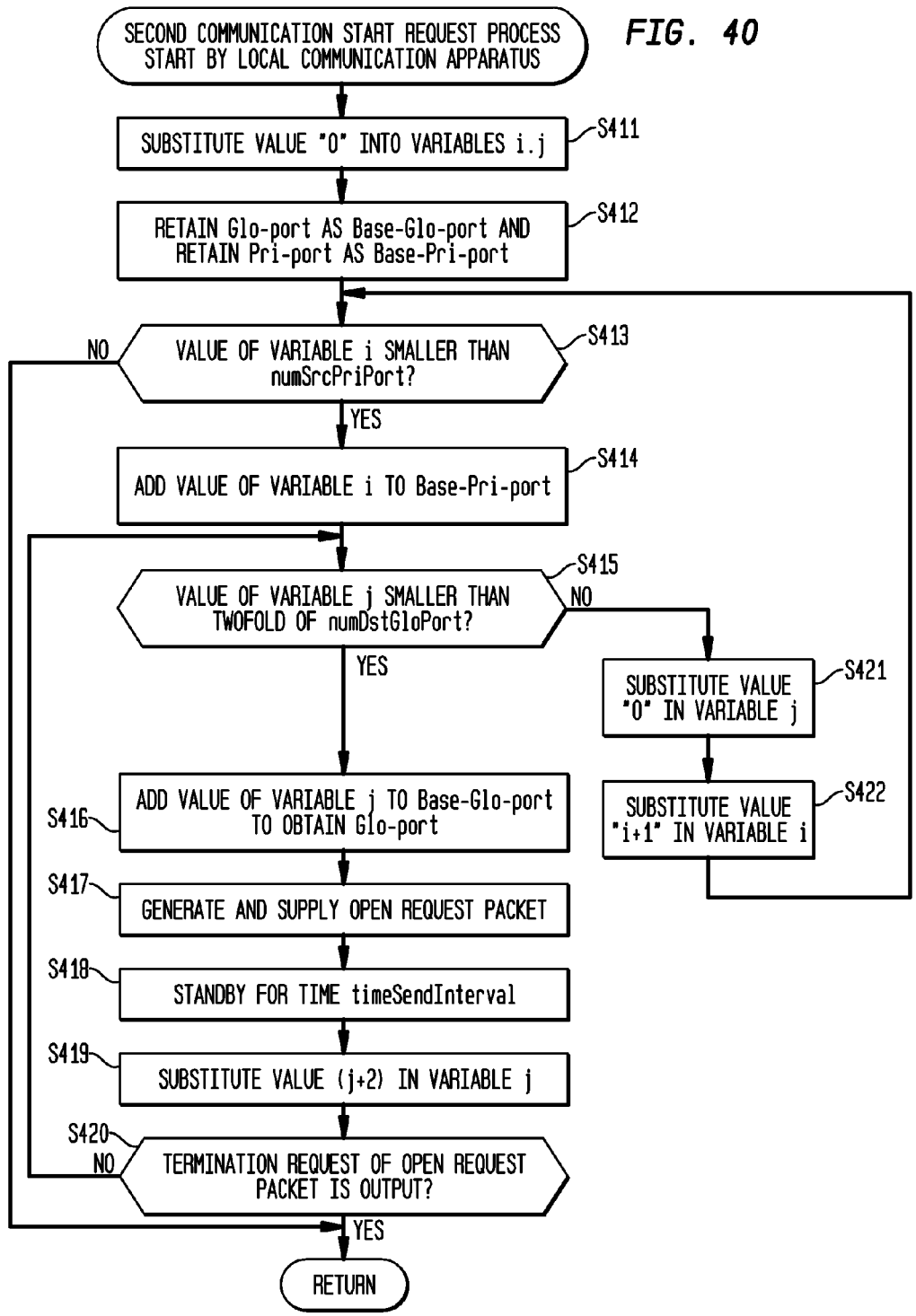
FIG. 40 is a flow chart illustrating the details of a second communication start request process by the local communication apparatus shown in FIG. 1.

If it is determined that the local communication apparatus 11 is the master, the inter-local communication control unit 66 proceeds to Step S524 whereat the second communication start request process similar to that described with reference to the flow chart of FIG. 40 is executed. The inter-local communication control unit 66 that completes the first communication start request process proceeds to Step S526.

If it is determined at Step S523 that the local communication apparatus 11 is the master of communications, the inter-local communication control unit 66 proceeds to Step S525 whereat it executes the first communication start request process similar to that at Step S521. The inter-local communication control unit 66 that completes the first communication start request process proceeds to Step S526.

At Step S526 the inter-local communication control unit 66 determines whether communications have become open by the first or second communication start request process. If it is determined that communications are not open, the process proceeds to Step S527 whereat it is determined whether the local communication apparatus 11 is the master.

Figure 44:
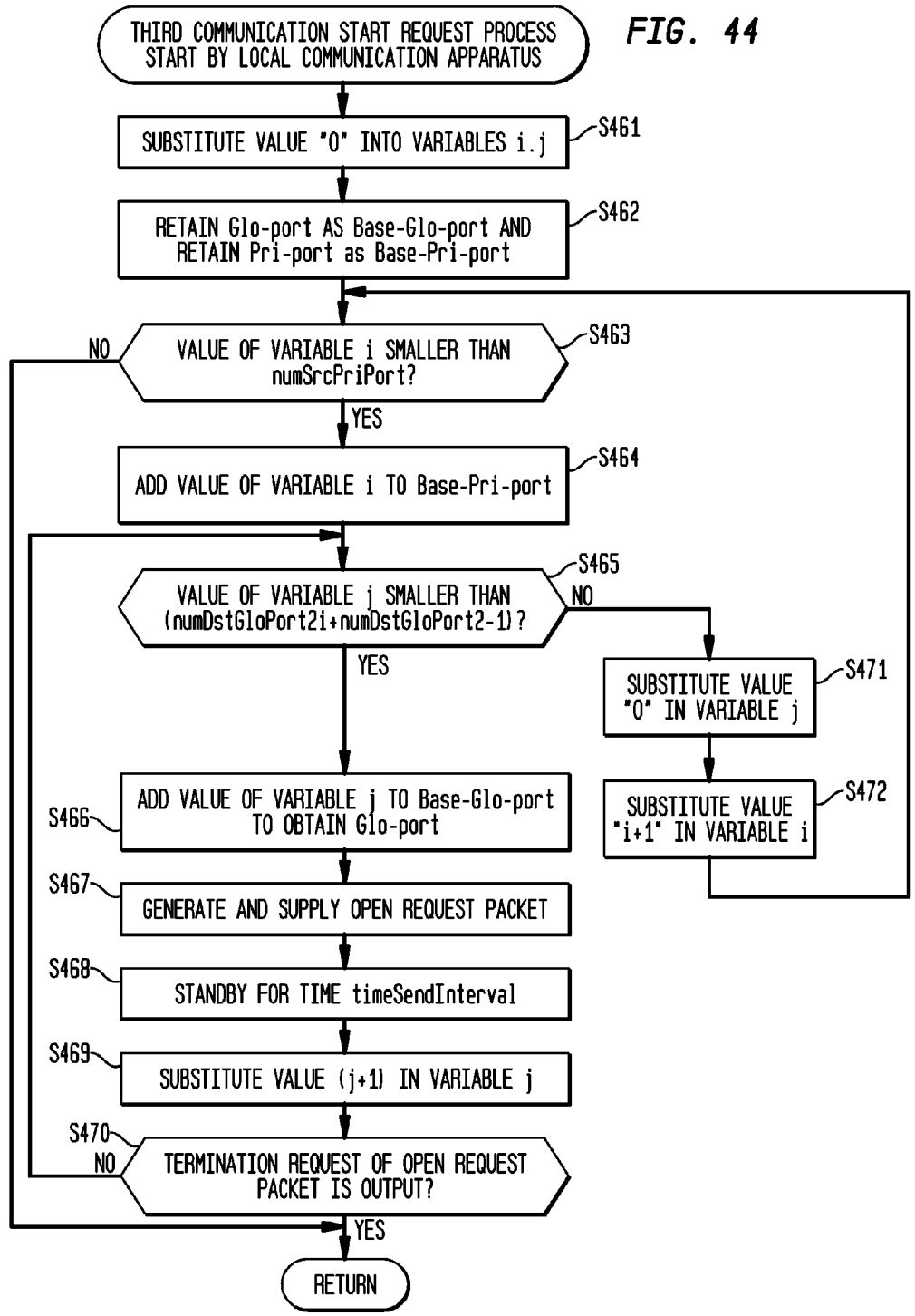
FIG. 44 is a flow chart illustrating the details of a third communication start request process by the local communication apparatus shown in FIG. 1.

If it is determined that the local communication apparatus 11 is the master, the inter-local communication control unit 66 proceeds to Step S528 whereat the third communication start request process similar to that described with reference to the flow chart of FIG. 44 is executed. The inter-local communication control unit 66 that completes the third communication start request process terminates the control process.

If it is determined at Step S527 that the local communication apparatus 11 is the communication slave, the inter-local communication control unit 66 proceeds to Step S529 to execute the fourth communication start request process similar to that described with reference to the flow chart of FIG. 45. The inter-local communication control unit 66 that completes the fourth communication start request process terminates the control process.

If it is determined at Step S522 or Step S526 that communications have become open, the inter-local communication control unit 66 terminates the control process.

As described above, by combining a plurality of communication start request processes, the local communication apparatus 11 can conduct communications with the communication partner communication apparatus 31 easily in a network system consisting of already existing facilities and in many other cases.

In the above description, although the local communication apparatus 11 executes the control process, the local communication apparatus 31 may execute a control process similar to the above-described control process. In the control process to be executed by the local communication apparatus 11 and the control process to be executed by the local communication apparatus 31, it is obvious that different combinations of a plurality of communication start request processes and different orders of combinations may be used.

Even if a destination communication apparatus is directly connected to the network without the involvement of a relay apparatus having the NAPT function or the like, the relay apparatus of the communication destination may execute the communication start request process such as that described above. The local communication apparatus 11 connected to the network 21 via the relay apparatus 12 can easily start communicating with the communication apparatus.

Further, in the examples described above, although it has been described that the local communication apparatus 11 communicates with the local communication apparatus 31 via the two relay apparatuses 12 and 32, this is not limiting and communications may be conducted via three or more relay apparatuses. In this case, as the above-described processes are executed for each relay apparatus, the global port number on the communication partner local communication apparatus 31 side can be predicted so that communications with the local communication apparatus 31 can be conducted easily.

Furthermore, in the above-described examples, communications via the relay apparatus having the NAPT function have been described. However, as the above-described processes are executed, the local communication apparatus 11 can predict the global port number on the communication partner local communication apparatus 31 side so that communications with the local communication apparatus 31 can be conducted easily.

The local communication apparatus 11, relay apparatus 12, local communication apparatus 31, relay apparatus 32, user service providing apparatus 41, apparatus service providing apparatus 51 or apparatus service providing apparatus 52 described above may have a portion or all of the above-described structure integrated with another apparatus, or may consist of a plurality of apparatuses.

The apparatus service providing apparatuses 51 and 52 among others are used for describing that the same processes are executed twice, and have different pieces of address port information. A single apparatus service providing apparatus having a plurality of ports may be used by changing ports to be used and repeating the same processes a plurality of times so that processes similar to the above-described processes can be realized easily.

Figure 8:
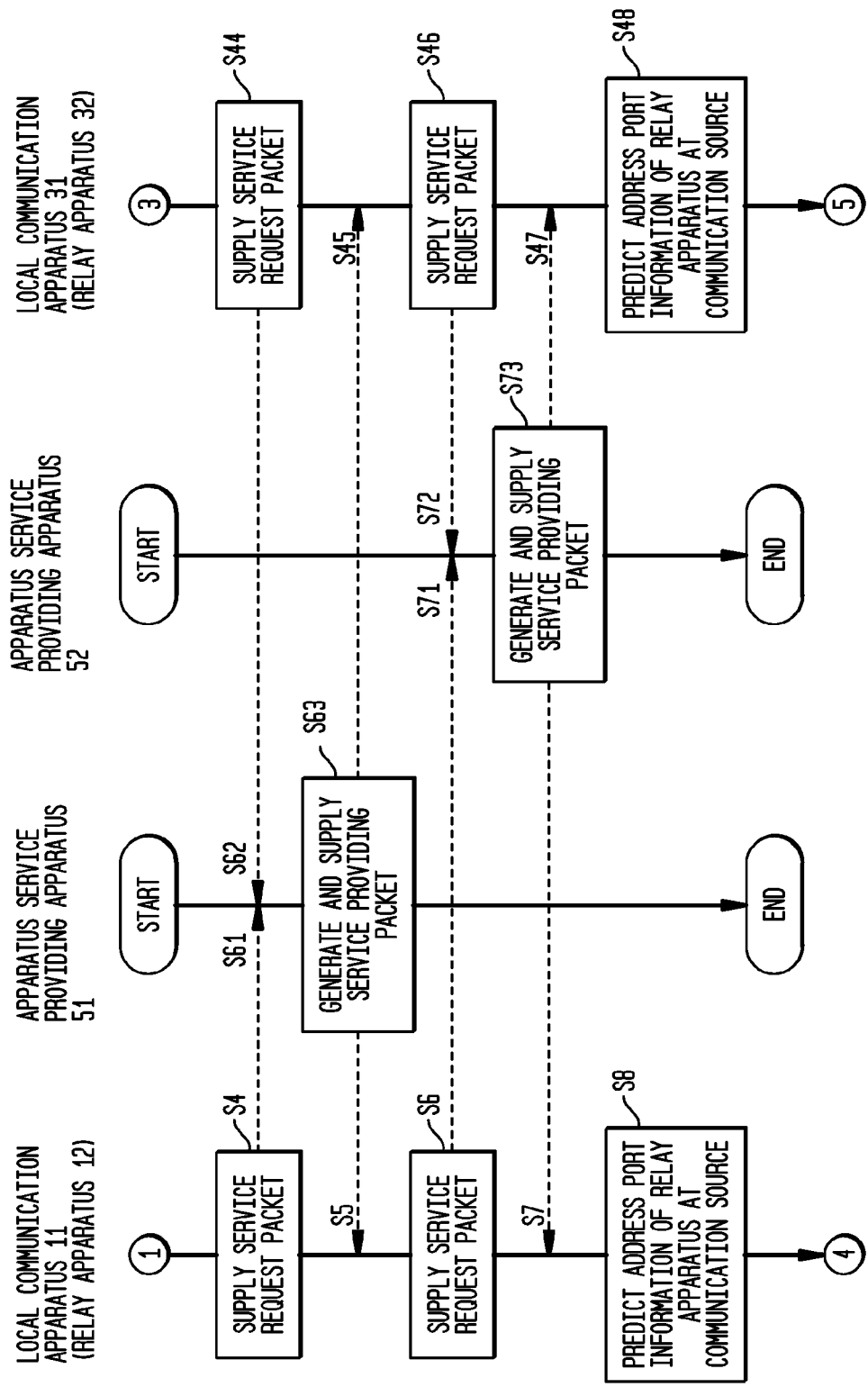
FIG. 8 is a flow chart illustrating the communication contents among apparatuses in the network system shown in FIG. 1, following the flow chart shown in FIG. 7.

When the local communication apparatus 11 or 31 supplies the service request packet to the apparatus service providing apparatuses 51 and 52 like Step S4 and S6 or Step S44 and S46 of FIG. 8, it is desired to execute in succession (continuously) the processes at Step S4 and S6 (or processes at Step S44 and S46) in order not to permit another communication to be established between two communications. However, the local communication apparatus 11 (local communication apparatus 31) may execute the processes at Step S4 and S6 of FIG. 8 (Step S44 and S46) at any timings. For example, it is obvious that the process at Step S4 (Step S44) may be executed and after a stand-by for a predetermined time, the process at Step S6 (Step S46) is executed.

Each of the above-described processes may be executed by any one of the above-described apparatuses or may be executed by an apparatus other than the above-described apparatuses.

Further, although it has been described that the local communication apparatuses 11 and 31 communicate in one-to-one correspondence by using the IM services, the invention is not limited thereto, but three or more users (three or more local communication apparatuses) may communicate at the same time. In this case, one of the local communication apparatuses is determined as the communication master, and processes similar to those described above are executed between the master local communication apparatus and other slave local communication apparatuses.

A series of processes described above may be executed by hardware, or software as described above. If a series of processes is executed by software, the programs constituting the software are installed from recording media or the like into a computer assembled by dedicated hardware or for example a general personal computer which is installed with various programs and can execute various functions.

The recording media consist of, as shown in FIGS. 3 to 6, not only the removable media 91, 131, 181 or 231 including package media made of a magnetic disc, (including a flexible disc), an optical disc (including CD-ROM (Compact Disc-Read Only Memory) and DVD (Digital Versatile Disc)), a magneto-optical disc (including MD (Mini-Disc) (registered trademark)), a semiconductor memory or the like, respectively distributed for supplying users with programs and recorded with the programs, but also a hard disc built in a computer beforehand and provided to users, including ROM 62, 102, 152 or 202 and the storage unit 83, 123, 173 or 223.

In this specification, steps describing programs provided by media include obviously the processes to be executed time sequentially in the description order and the processes not necessarily executed time sequentially but executed parallel or individually.

In addition, in this specification, the system is intended to mean the whole apparatus consisting of a plurality of apparatuses.

As described so far, according to the invention, communications are possible. In particular, even in already existing facilities performing NAPT translation wherein each time the address and port of the communication destination of a communication terminal apparatus are changed, the port to be used for relaying communications by the communication terminal apparatus is incremented by two or more, and communications with another apparatus can be easily performed via NAPT.

The invention claimed is:

1. An information processing method of an information processing apparatus connected to a first network, connected to a second network via a first address translation apparatus for address translation, and connected to a third network, the information processing method for performing communication between the information processing apparatus and a first other information processing apparatus connected to the second network via a second address translation apparatus for address translation, the information processing method comprising:

supplying first and second packets to first and second addresses of a second other information processing apparatus connected to the second network via the first address translation apparatus to request an address on the second network corresponding to the information processing apparatus;

acquiring third and fourth packets including third and fourth addresses on the second network corresponding to the information processing apparatus and supplied from the second other information processing apparatus based on the first and second packets supplied;

predicting a fifth address on the second network corresponding to the information processing apparatus by using the third and fourth addresses included in the acquired third and fourth packets; and predicting the fifth address for each communication between the first information processing apparatus and first other information processing apparatus that comprises calculating a difference between the third and fourth addresses and adding the difference to global address port information received from the second other information processing apparatus after reception of the third and fourth addresses from the second other information processing apparatus.

2. A recording medium recorded with a computer-executable program for controlling a processing method in an information processing apparatus connected to a first network, connected to a second network via a first address translation apparatus for address translation, and connected to a third network, the processing method for performing communication between the information processing apparatus and a first other information processing apparatus connected to the second network via a second address translation apparatus for address translation, the processing method comprising:

supplying first and second packets to first and second addresses of a second other information processing apparatus connected to the second network via the first address translation apparatus to request an address on the second network corresponding to the information processing apparatus;

acquiring third and fourth packets including third and fourth addresses on the second network corresponding to the information processing apparatus and supplied from the second other information processing apparatus based on the first and second packets supplied;

predicting a fifth address on the second network corresponding to the information processing apparatus by using the third and fourth addresses included in the acquired third and fourth packets; and predicting the fifth address for each communication between the first information processing apparatus and first other information processing apparatus that comprises calculating a difference between the third and fourth addresses and adding the difference to global address port information received from the second other information processing apparatus after reception of the third and fourth addresses from the second other information processing apparatus.

3. An information processing apparatus connected to a network for performing communications with a first other information processing apparatus connected to the network via a first address translation apparatus for address translation and with a second other information processing apparatus connected to the network via a second address translation apparatus for address translation, the information processing apparatus comprising:

acquisition means for acquiring information of an address on the network of the first other information processing apparatus, the address being predicted by the first other information processing apparatus and supplied from the first other information processing apparatus;

prediction means for predicting the address of the first other information processing apparatus for each communication between the first information processing apparatus and first other information processing apparatus that comprises calculating a difference between two received addresses and adding the difference to global address port information received from the information processing apparatus after reception of the two received addresses from the information processing apparatus;

storage means for storing the acquired information of the address on the network of the first other information processing apparatus; and supply means for supplying the stored information of the address on the network of the first other information processing apparatus to the second other information processing apparatus based on a request from the second other information processing apparatus acting as a communication partner of the first other information processing apparatus.

4. An information processing method of an information processing apparatus connected to a network for performing communications with a first other information processing apparatus connected to the network via a first address translation apparatus for address translation and with a second other information processing apparatus connected to the network via a second address translation apparatus for address translation, the information processing method comprising:

acquiring information of an address on the network of the first other information processing apparatus, the address being predicted by the first other information processing apparatus and supplied from the first other information processing apparatus;

predicting the address of the first other information processing apparatus for each communication between the first information processing apparatus and first other information processing apparatus that comprises calculating a difference between two received addresses and adding the difference to global address port information received from the information processing apparatus after reception of the two received addresses from the information processing apparatus;

storing the acquired information of the address on the network of the first other information processing apparatus; and supplying the stored information of the address on the network of the first other information processing apparatus to the second other information processing apparatus based on a request from the second other information processing apparatus acting as a communication partner of the first other information processing apparatus.

5. A recording medium recorded with a computer-executable program for controlling a processing method in an information processing apparatus connected to a network for performing communications with a first other information processing apparatus connected to the network via a first address translation apparatus for address translation and with a second other information processing apparatus connected to the network via a second address translation apparatus for address translation, the processing method comprising:

acquiring information of an address on the network of the first other information processing apparatus, the address being predicted by the first other information processing apparatus and supplied from the first other information processing apparatus;

predicting the address of the first other information processing apparatus for each communication between the first information processing apparatus and first other information processing apparatus that comprises calculating a difference between two received addresses and adding the difference to global address port information received from the information processing apparatus after reception of the two received addresses from the information processing apparatus;

storing the acquired information of the address on the network of the first other information processing apparatus; and supplying the stored information of the address on the network of the first other information processing apparatus to the second other information processing apparatus based on a request from the second other information processing apparatus acting as a communication partner of the first other information processing apparatus.

6. A network system, comprising:

a first information processing apparatus connected to a first network and connected to a second network via a first address translation apparatus for translating addresses;

a second information processing apparatus connected to a third network and connected to the second network via a second address translation apparatus for translating addresses;

a third information processing apparatus connected to the second network and having a first address and a second address; and a fourth information processing apparatus connected to the second network, the fourth information processing apparatus managing addresses of the first information processing apparatus and the second information processing apparatus on the second network;

the first information processing apparatus operating to supply first and second packets to the first and second addresses of the third information processing apparatus via the first address translation apparatus to request an address on the second network corresponding to the first information processing apparatus;

the third information processing apparatus operating to acquire the first and second packets, to generate third and fourth packets by using third and fourth addresses on the second network corresponding to the first information processing apparatus, the third and fourth addresses being included in the first and second packets, and to supply the third and fourth packets to the first information processing apparatus;

the first information processing apparatus further operating to acquire the third and fourth packets, to predict a fifth address which is an address on the second network corresponding to the first information processing apparatus by using the third and fourth addresses included in the third and fourth packets, the fifth address being used when the second information processing apparatus is accessed, and to supply the fifth address to the fourth information processing apparatus;

the fourth information processing apparatus operating to store the fifth address in association with a user ID of the first information processing apparatus;

the second information processing apparatus operating to supply fifth and sixth packets to the first and second addresses of the third information processing apparatus via the second address translation apparatus to request addresses on the second network corresponding to the second information processing apparatus;

the third information processing apparatus further operating to acquire the fifth and sixth packets, to generate seventh and eighth packets by using sixth and seventh addresses on the second network corresponding to the second information processing apparatus, the sixth and seventh addresses being included in the fifth and sixth packets, and to supply the seventh and eighth packets to the second information processing apparatus;

the second information processing apparatus further operating to acquire the seventh and eighth packets, to predict an eighth address which is an address on the second network corresponding to the second information processing apparatus by using the sixth and seventh addresses included in the seventh and eighth packets, the eighth address being used when the second information processing apparatus is accessed, and to supply the eighth address to the fourth information processing apparatus;

the fourth information processing apparatus further operating to store the eighth address in association with a user ID of the second information processing apparatus;

the first information processing apparatus further operating to request from the fourth information processing apparatus an address corresponding to a user of the second information processing apparatus which is a communication partner;

the fourth information processing apparatus further operating to supply the eighth address to the first information processing apparatus in response to the request;

the first information processing apparatus further operating to acquire the eighth address, and to access the second information processing apparatus based on the eighth address;

the second information processing apparatus further operating to request from the fourth information processing apparatus an address corresponding to a user of the first information processing apparatus which is a communication partner;

the fourth information processing apparatus further operating to supply the fifth address to the second information processing apparatus in response to the request; and the second information processing apparatus further operating to acquire the fifth address, and to access the first information processing apparatus based on the fifth address; and the first information processing apparatus further operating to predict the fifth address for each communication between the first and second information processing apparatuses that comprises calculating a difference between the third and fourth addresses and adding the difference to global address port information received from the third information processing apparatus after reception of the third and fourth addresses from the third information processing apparatus.

7. The network system as claimed in claim 6, wherein:

the third information processing apparatus includes a fifth information processing apparatus connected to the second network and having the first address, and a sixth information processing apparatus connected to the second network and having the second address;

the fifth information processing apparatus operating to acquire the first packet, to generate the third packet by using the third address included in the first packet, to supply the third packet to the first information processing apparatus, to acquire the fifth packet, to generate the seventh packet by using the sixth address included in the fifth packet, and to supply the seventh packet to the second information processing apparatus; and the sixth information processing apparatus operating to acquire the second packet, to generate the fourth packet by using the fourth address included in the second packet, to supply the fourth packet to the first information processing apparatus, to acquire the sixth packet, to generate the eighth packet by using the seventh address included in the sixth packet, and to supply the eighth packet to the second information processing apparatus.

8. A communication method for a network system including a first information processing apparatus connected to a first network and connected to a second network via a first address translation apparatus for translating addresses, a second information processing apparatus connected to a third network and connected to the second network via a second address translation apparatus for translating addresses, a third information processing apparatus connected to the second network and having a first address and a second address, and a fourth information processing apparatus connected to the second network, the fourth information processing apparatus managing addresses of the first information processing apparatus and the second information processing apparatus on the second network, the communication method comprising:

supplying first and second packets from the first information processing apparatus to the first and second addresses of the third information processing apparatus via the first address translation apparatus to request an address on the second network corresponding to the first information processing apparatus;

acquiring the first and second packets in the third information processing apparatus, generating third and fourth packets by using third and fourth addresses on the second network corresponding to the first information processing apparatus, the third and fourth addresses being included in the first and second packets, and supplying the third and fourth packets to the first information processing apparatus;

acquiring the third and fourth packets in the first information processing apparatus, predicting a fifth address which is an address on the second network corresponding to the first information processing apparatus by using the third and fourth addresses included in the third and fourth packets, the fifth address being used when the second information processing apparatus is accessed, and supplying the fifth address to the fourth information processing apparatus;

predicting the fifth address for each communication between the first and second information processing apparatuses that comprises calculating a difference between the third and fourth addresses and adding the difference to global address port information received from the third information processing apparatus after reception of the third and fourth addresses from the third information processing apparatus;

storing the fifth address in the fourth information processing apparatus in association with a user ID of the first information processing apparatus;

supplying fifth and sixth packets from the second information processing apparatus to the first and second addresses of the third information processing apparatus via the second address translation apparatus to request addresses on the second network corresponding to the second information processing apparatus;

acquiring the fifth and sixth packets in the third information processing apparatus, generating seventh and eighth packets by using sixth and seventh addresses on the second network corresponding to the second information processing apparatus, the sixth and seventh addresses being included in the fifth and sixth packets, and supplying the seventh and eighth packets to the second information processing apparatus;

acquiring the seventh and eighth packets in the second information processing apparatus, predicting an eighth address which is an address on the second network corresponding to the second information processing apparatus by using the sixth and seventh addresses included in the seventh and eighth packets, the eighth address being used when the first information processing apparatus is accessed, and supplying the eighth address to the fourth information processing apparatus;

storing the eighth address in the fourth information processing apparatus in association with a user ID of the second information processing apparatus;

requesting by the first information processing apparatus to the fourth information processing apparatus an address corresponding to a user of the second information processing apparatus which is a communication partner;

supplying the eighth address from the fourth information processing apparatus to the first information processing apparatus in response to the request;

acquiring the eighth address in the first information processing apparatus, and accessing the second information processing apparatus based on the eighth address;

requesting by the second information processing apparatus to the fourth information processing apparatus an address corresponding to a user of the first information processing apparatus which is a communication partner;

supplying the fifth address from the fourth information processing apparatus to the second information processing apparatus in response to the request;

acquiring the fifth address in the second information processing apparatus, and accessing the first information processing apparatus based on the fifth address.

9. An information processing apparatus connected to a first network, connected to a second network via a first address translation apparatus for address translation, and connected to a third network, the information processing apparatus for performing communication with a first other information processing apparatus connected to the second network via a second address translation apparatus for address translation, the information processing apparatus comprising:

supply means for supplying first and second packets to first and second addresses of a second other information processing apparatus connected to the second network via the first address translation apparatus to request an address on the second network corresponding to the information processing apparatus;

first acquisition means for acquiring third and fourth packets including third and fourth addresses on the second network corresponding to the information processing apparatus and supplied from the second other information processing apparatus based on the first and second packets supplied from the supply means;

prediction means for predicting a fifth address on the second network corresponding to the information processing apparatus by using the third and fourth addresses included in the third and fourth packets acquired through the first acquisition means, the fifth address being used when the first other information processing apparatus is accessed, whereby the prediction of the fifth address is performed for each communication between the first information processing apparatus and the first other information processing apparatus and comprises calculating a difference between the third and fourth addresses and adding the difference to global address port information received from the second other information processing apparatus after reception of the third and fourth addresses from the second other information processing apparatus.

10. The information processing apparatus as claimed in claim 9, wherein the supply means supplies the second packet in succession to the first packet.

11. The information processing apparatus as claimed in claim 9, wherein:

the second other information processing apparatus includes a third other information processing apparatus connected to the second network and having the first address, and a fourth other information processing apparatus connected to the second network and having the second address;

the supply means supplies the first packet to the third other information processing apparatus and supplies the second packet to the fourth other information processing apparatus; and the first acquisition means acquires the third packet from the third other information processing apparatus and the fourth packet from the fourth other information processing apparatus.

12. The information processing apparatus as claimed in claim 9, wherein the first to the fourth addresses each include an IP address and a port number.

13. The information processing apparatus as claimed in claim 9, wherein the prediction means predicts the fifth address by calculating a difference value between the fourth address and the third address and adding the difference value to the fourth address.

14. The information processing apparatus as claimed in claim 9, further comprising:

first request means for requesting that a third other information processing apparatus supply the fifth address predicted by the predicting means and register the fifth address, the third information processing apparatus being connected to the second network for managing addresses on the second network of the information processing apparatus and the first other information processing apparatus;

second request means for requesting a sixth address predicted by the first other information processing apparatus and registered in the third other information processing apparatus, the sixth address being an address on the second network of the first other information processing apparatus;

third acquisition means for acquiring the sixth address supplied from the third other information processing apparatus based on the second request means; and third request means for requesting opening of communications to the address on the second network of the first other information processing apparatus, the address of the first other information processing apparatus being set based on the sixth address acquired by the third acquisition means.

15. The information processing apparatus as claimed in claim 14, wherein the third requesting means requests the opening of communications by supplying a fifth packet for requesting the opening of communications with the first other information processing apparatus from a plurality of addresses on the first network of the information processing apparatus to a plurality of addresses of the second address translation apparatus, the plurality of addresses being consecutive starting from the fifth address.

16. The information processing apparatus as claimed in claim 14, wherein the third requesting means requests the opening of communications by supplying a fifth packet for requesting the opening of communications with the first other information processing apparatus from a plurality of addresses on the first network of the information processing apparatus to a plurality of addresses of the second address translation apparatus, the plurality of addresses being every second address and being consecutive from the fifth address.

17. The information processing apparatus as claimed in claim 14, wherein the third requesting means requests the opening of communications by supplying a fifth packet for requesting the opening of communications with the first other information processing apparatus from a plurality of addresses on the first network of the information processing apparatus to each address of mutually different address groups of a plurality of address groups on the second network of the second address translation apparatus, the plurality of address groups each having a plurality of consecutive addresses and one address between each address group, the first address group having the fifth address as a start address.

18. The information processing apparatus as claimed in claim 14, wherein the third requesting means requests the opening of communications by supplying a fifth packet for requesting the opening of communications with the first other information processing apparatus from a plurality of addresses on the first network of the information processing apparatus to each address of mutually different address groups of a plurality of address groups on the second network of the second address translation apparatus, the plurality of address groups each having a plurality of consecutive addresses, the first address group having the fifth address as a start address.

19. The information processing apparatus as claimed in claim 14, further comprising:

master-slave judging means for determining whether the information processing apparatus is a master for controlling communications with the first other information processing apparatus or a slave, wherein the third request means requests opening of communications on the basis of an algorithm selected based on the determination by the master-slave judging means.

\* \* \* \* \*